US010032195B2

(12) United States Patent
Abbassi et al.

(10) Patent No.: US 10,032,195 B2
(45) Date of Patent: Jul. 24, 2018

(54) SYSTEM, METHOD AND COMPUTER PROGRAM PRODUCT FOR PROVIDING A FARE ANALYTIC ENGINE

(71) Applicants: Navid Abbassi, Herndon, VA (US);
John M. Murphy, Leesburg, VA (US);
Senthil Nagarajan, Ashburn, VA (US);
David Peart, Leesburg, VA (US)

(72) Inventors: Navid Abbassi, Herndon, VA (US);
John M. Murphy, Leesburg, VA (US);
Senthil Nagarajan, Ashburn, VA (US);
David Peart, Leesburg, VA (US)

(73) Assignee: AIRLINE TARIFF PUBLISHING COMPANY, Dulles, VA (US)

(*) Notice: Subject to any disclaimer, the term of this patent is extended or adjusted under 35 U.S.C. 154(b) by 462 days.

(21) Appl. No.: 13/801,959

(22) Filed: Mar. 13, 2013

(65) Prior Publication Data
US 2014/0278590 A1 Sep. 18, 2014

(51) Int. Cl.
*G06Q 30/02* (2012.01)
*G06F 17/30* (2006.01)
(Continued)

(52) U.S. Cl.
CPC ... *G06Q 30/0283* (2013.01); *G06F 17/30958* (2013.01); *G06Q 50/14* (2013.01); *G06Q 10/02* (2013.01)

(58) Field of Classification Search
CPC .... G06Q 30/0283; G06Q 50/14; G06Q 10/02; G06F 17/30958
(Continued)

(56) References Cited

U.S. PATENT DOCUMENTS 4,862,357 A * 8/1989 Ahlstrom ............... G06Q 10/02
705/6
6,307,572 B1 * 10/2001 DeMarcken ........... G06Q 10/02
715/703
(Continued)

OTHER PUBLICATIONS

You-Wei Cheah, "Quality, retrieval and analysis of provenance in large scale data", published by Indiana University, Feb. 2014 (Year: 2014).*
(Continued)

*Primary Examiner* — Brian M Epstein
*Assistant Examiner* — Omar Zeroual
(74) *Attorney, Agent, or Firm* — ATFirm PLLC; Ralph P. Albrecht

(57) ABSTRACT

An exemplary embodiment of a system, method and/or computer program product for creating a fare analytic database, may include: receiving, by at least one processor, fare(s) and fare related data; and creating a graph database of the fare(s) and fare related data; where the creating may include: creating one or more node(s) of the graph database representing at least one component of the fare and fare related data; creating one or more relationship(s) between a plurality of the nodes; and applying at least one property to the node(s) and the relationship(s). A fare analytic engine may further incorporate the database, and the engine may process queries traversing the database for fare and fare related data; and functional programming methods may be used to generate Boolean byte code routines from fare restrictions, according to exemplary embodiments disclosed.

33 Claims, 25 Drawing Sheets

(51) Int. Cl.
*G06Q 50/14* (2012.01)
*G06Q 10/02* (2012.01)

(58) Field of Classification Search
USPC .............................................. 705/5
See application file for complete search history.

(56) References Cited

U.S. PATENT DOCUMENTS

| | | | | |
|---|---|---|---|---|
| 6,375,808 B1* | 4/2002 | Tsuda | ..................... | C01B 7/195 203/35 |
| 6,609,098 B1* | 8/2003 | DeMarcken | ........... | G06Q 10/02 705/400 |
| 7,340,402 B1* | 3/2008 | DeMarcken | ...... | G06F 17/30716 705/5 |
| 7,346,520 B2* | 3/2008 | Etzioni | .................. | G06Q 10/02 705/1.1 |
| 7,974,863 B2 | 7/2011 | Etzioni | | |
| 8,161,048 B2* | 4/2012 | Procopiuc | ......... | G06F 17/30312 707/737 |
| 8,195,486 B2* | 6/2012 | Berthaud | ............... | G06Q 10/02 705/400 |
| 8,566,143 B2 | 10/2013 | Etzioni | | |
| 8,566,151 B2* | 10/2013 | Baggett | .................. | G06Q 10/02 705/14.1 |
| 8,577,720 B2* | 11/2013 | Baggett | .................. | G06Q 10/02 705/14.1 |
| 8,589,211 B2* | 11/2013 | Berthaud | ............... | G06Q 10/02 705/1.1 |
| 8,615,422 B1* | 12/2013 | Alkasimi | ........... | G06Q 30/0206 705/7.35 |
| 8,615,425 B2* | 12/2013 | Baggett | .................. | G06Q 10/02 705/14.1 |
| 2003/0125994 A1* | 7/2003 | Jaehn | ..................... | G06Q 10/02 705/5 |
| 2007/0198307 A1* | 8/2007 | Crean | .................... | G06Q 10/02 705/5 |
| 2007/0198309 A1* | 8/2007 | Crean | .................... | G06Q 10/02 705/5 |
| 2008/0167907 A1* | 7/2008 | Marcken | ................ | G06Q 10/02 705/5 |
| 2008/0167973 A1* | 7/2008 | De Marcken | ..... | G06F 17/30902 705/5 |
| 2008/0168093 A1* | 7/2008 | De Marcken | ..... | G06F 17/30457 |
| 2008/0270254 A1* | 10/2008 | Patoureaux | ........... | G06Q 10/02 705/5 |
| 2012/0123909 A1* | 5/2012 | Kamenov | .............. | G06Q 10/02 705/27.1 |
| 2012/0284063 A1* | 11/2012 | Almonte | ................ | G06Q 50/14 705/5 |
| 2014/0278590 A1* | 9/2014 | Abbassi | ............. | G06Q 30/0283 705/5 |

OTHER PUBLICATIONS

International Search Report and Written Opinion of the International Search Authority for Application No. PCT/US14/25130, dated Aug. 27, 2014.
PCT/US2014/25130, Mar. 13, 2014, Published.

* cited by examiner

400

EXEMPLARY BUSINESS BASED DATA
E.G.,- FARES DATA,
-FARE RESTRICTIONS DATA,
-ROUTING RESTRICTIONS DATA,
-CURRENCY CONVERSION RATES DATA,
-SCHEDULES DATA,
-TAXES DATA,
-FACILITY CHARGES DATA,
-GEOGRAPHIC INFORMATION,
-ANCILLARY CHARGE DATA,
(E.G., BRANDED FARES DATA,
CARRIER IMPOSED FEES DATA,
BAGGAGE CHARGES DATA,
TICKETING FEES DATA,
OPTIONAL SERVICE FEES DATA,
(E.G., MEAL, ENTERTAINMENT, SEAT ASSIGNMENT, ETC.)
ETC.

EXEMPLARY FARES DATA
E.G., - SPECIFIED FARE,
- CONSTRUCTED FARE,
- FARE BY RULE FARE,
ETC.

EXEMPLARY FARES DETAILED DATA
EG., - MARKET,
- TRAVEL DATES,
-TICKET DATES,
-AMOUNT,
-CARRIER,
-TRIP TYPE,
-FARE CLASS,
ETC.

EXEMPLARY FARE RELATED DATA
E.G.,- FARE RESTRICTION RULES DATA,
-FOOTNOTES DATA,
-ROUTING RESTRICTIONS DATA,
-TAXES DATA,
-CURRENCY CONVERSION RATES DATA,
-SCHEDULES DATA,
-FACILITY CHARGES DATA,
-GEOGRAPHIC INFORMATION DATA,
-ANCILLARY CHARGES DATA,
ETC.

FIG. 4A

| Pricing Unit | Fare Selection Rule | Directionality Examples | |
|---|---|---|---|
| | | Travel | Fare Selected |
| One Way (OW) | Fares are selected in direction of travel. | NYC → LAX | NYC → LAX |
| Round Trip (RT) | Fares are selected in the direction of travel. | NYC ⇄ LAX | NYC ⇉ LAX |
| Circle Trip (CT) | Exception: Fares selected on the last fare component are opposite the direction of travel. | NYC → LAX, LAX → CHI, CHI → NYC | NYC → LAX, NYC → CHI (last fare opposite) |
| Origin Open Jaw (OOJ) | | NYC → LAX, WAS → NYC | NYC → LAX, NYC ← WAS |
| Double Open Jaw (DOJ) | | WAS → LAX, WAS ← SFO | WAS → LAX, WAS → SFO |
| Turnaround Open Jaw (TOJ) | | NYC → LAX, SFO → NYC | NYC → LAX, NYC → SFO |

FIG. 7A

| Pricing Unit | Domestic Fare Selection Rule | Directionality Examples | |
|---|---|---|---|
| | | Direction of Travel | Direction of Fare Selection |
| One Way (OW) | Fares are selected in direction of travel. | SYD → MEL | SYD → MEL |
| Round Trip (RT) | Fares are selected in the direction of travel. | SYD ⇄ MEL | SYD ⇄ MEL |
| Circle Trip (CT) | Exception: Fares selected on the last fare component are opposite the direction of travel. | SYD → MEL, BNE | SYD → MEL, BNE |
| Origin Open Jaw (OOJ) | | SYD → MEL, BNE | SYD → MEL, BNE |
| Double Open Jaw (DOJ) | | SYD → MEL, BNE → ADL | SYD → MEL, BNE → ADL |
| Turnaround Open Jaw (TOJ) | | SYD → MEL, ADL | SYD → MEL, ADL |
| | International Fare Selection Rule | | |
| International Pricing Unit | Fare selection is dictated by IATA resolutions. | SYD → SIN, BNE | SYD → SIN, BNE |

FIG. 7B

SYSTEM, METHOD AND COMPUTER PROGRAM PRODUCT FOR PROVIDING A FARE ANALYTIC ENGINE

BACKGROUND OF THE INVENTION

Field of the Invention

Embodiments of the present invention relate generally to pricing engines, and more particularly to travel, or cargo shipment pricing engines.

Discussion of the Related Art

Conventionally, various systems have existed for analyzing travel or cargo fares data and fare-related data. One example environment may include air passenger fare and fare related data. Fare and fare related data may include, e.g., but is not limited to, fares, fare restriction data, routing restriction data, currency conversion rate data, schedule data, tax data, facility charge data, geographic information, and ancillary data. Such air passenger fare and fare related data is published and available on a subscription basis from Airline Tariff Publishing Company (ATPCO) of Dulles, Va., USA, assignee of the present invention. A portion of the disclosure of this patent document contains material to which a claim for copyright is made. Various copyrighted materials may be included herein, with annotation ©ATPCO 2013, and ATPCO reserves its rights in such copyrighted subject matter. The copyright owner has no objection to the facsimile reproduction by anyone of the patent document or the patent disclosure, as it appears in the Patent and Trademark Office patent file or records, but reserves all other copyright rights whatsoever.

A conventional pricing system may be used to produce one or more itineraries and prices by selecting suitable travel units from databases containing geographic, scheduling and/or pricing information. In the airline industry, for example, fundamental travel units may include "flights" (sequences of regularly scheduled takeoffs and landings assigned a common identifier) and "fares" (prices published by airlines for travel between two points). The term "itinerary" may refer to a sequence of flights on particular dates and the term "pricing solution" may refer to a combination of fares and itineraries.

A pricing query may typically include, e.g., an origin (O), a destination (D), time constraints, and may include additional information such as, e.g., but not limited to, a passenger profile and/or travel preferences. A pricing system may respond to a pricing query and may return a list of one or more possible itineraries including a combination of a flight with a price.

A pricing system may expend considerable computing resources responding to a pricing query. It is not uncommon for a pricing system to spend more than 30 seconds responding to an pricing query, even for a relatively straightforward round-trip query departing and returning from a specific airport on a specific date. Any delay may be undesirable for a user of the system.

Pricing Systems may use specialized techniques to review fare offerings, whether published or unpublished (i.e., specially offered fares not normally available), across a number of different vendors (including, e.g., airline, hotel, or car rental companies, etc.) and may return results to a user in a ranked order based on one or more parameters or attributes a customer has requested, such as, e.g., but not limited to, by price, etc. Each vendor's computer system may allow fare search engines to determine which of the vendor's fares are available for a given date and itinerary being considered, and fare search engines may sort and select best alternatives in response to a query. The objective of traditional fare search processing is to find the best fare offers available in a relevant marketplace.

The processing of example air travel related pricing requests is a difficult problem to solve efficiently and requires simultaneous scrutiny of many factors that span, e.g., but not limited to, flight schedules, availability, published fares, rule restrictions, complex business logic, and carrier exceptions, etc. The order in which variables are analyzed has evolved with varying degrees of success while continuously emphasizing the need for more efficient techniques for processing requests.

The vast array of fares and fare related rules business data presents a data processing challenge. Conventional systems emphasize a sequence of origination destination pairs formed from schedules or fares. Large volumes of such travel and/or cargo fare and fare related data that must be directly accessed, cross-referenced, or traversed in processing a database query to process a specific transaction presents a substantial data processing challenge.

It would therefore be advantageous to provide improved techniques to more efficiently process travel, cargo, and the like, pricing requests.

Conventional pricing system methods and systems have various shortcomings. What is needed is an improved system and method that overcomes the various shortcomings of conventional solutions.

SUMMARY OF VARIOUS EXEMPLARY EMBODIMENTS OF INVENTION

Various exemplary embodiments of a system, method and computer program product for providing an improved fare analytic engine application, system, method and/or computer program product as is set forth in detail herein.

According to one exemplary embodiment, a computer implemented method, system, and/or computer program product executable on a computer processor may include, according to an exemplary embodiment, a method of creating a fare analytic database may include, e.g., but not be limited to: a) receiving, by at least one processor, at least one fare and at least one fare related data; and b) creating, by the at least one processor, a graph database of the at least one fare and the at least one fare related data; where the creating may include: i. creating, by the at least one processor, at least one node of the graph database representing at least one component of the at least one fare and the at least one fare related data; ii. creating, by the at least one processor, at least one relationship between a plurality of the at least one nodes; and iii. applying, by the at least one processor, at least one property to the at least one node and the at least one relationship.

According to one exemplary embodiment, the method may further include c) maintaining, by the at least one processor, the fare and the fare related data in the graph database may include at least one of: i. adding, by the at least one processor, new at least one fare and new at least one fare related data; ii. deleting, by the at least one processor, the at least one fare and the at least one fare related data; and/or iii. updating an existing of the at least one fare and the at least one fare related data.

According to one exemplary embodiment, the method may include where the creating of the (b) may further include: iv. generating, by the at least one processor, at least one executable byte code routine for at least one of: the at least one relationship, the at least one node, and/or the at least one property, of the fare related data component of the graph database.

According to one exemplary embodiment, the method may include where the creating of the (b) may further include: v. regenerating, by the at least one processor, the at least one executable byte code routine for at least one of: the at least one relationship, the at least one node, and/or the at least one property, of the fare related data component of the graph database.

According to one exemplary embodiment, the method may include where (c) may further include iv. generating and/or regenerating, by the at least one processor, the at least one executable byte code routine for at least one of: the at least one relationship, the at least one node, and/or the at least one property, of the fare related data component of the graph database.

According to one exemplary embodiment, the method may include where the receiving of the a) may include: where the at least one fare and the at least one fare related data may include at least one of: fare restriction data; fare discount data; fare surcharge data; facility charge data; routing restriction data; tax data; currency conversion rate data; scheduling data; geographic information; ancillary data; and/or fare data.

According to one exemplary embodiment, the method may include where the receiving the at least one fare and/or the at least one fare related data may include: receiving airline fare related data, and where the at least one fare and/or the fare related data may include at least one of: at least one rule data; and/or footnote data.

According to one exemplary embodiment, the method may include where the receiving of the a) may include: where the at least one fare and the at least one fare related data may include at least one of: at least one fare data may include at least one of: at least one specified fare; at least one constructed fare; and/or at least one fare by rule fare; at least one fare restriction data may include at least one of: an advance purchase restriction, a minimum stay restriction, a maximum stay restriction, a seasonal restriction, a blackout and/or non-blackout restriction, a point of sale restriction, a rule, a rule override, a footnotes, and/or a fare by rule; at least one footnotes data; at least one routing restriction data may include at least one geographic route data; at least one tax data; at least one currency rate conversion data; at least one schedule data; at least one facility charge data; at least one geographic data; at least one optional service fee data; and/or at least one ancillary data may include at least one of: additional legroom requirement, cancellation rights, carrier imposed fees, and/or additional bags.

According to one exemplary embodiment, the method may include where the creating of the (b) may include: creating a relationship between a given fare and fare related data of the given fare, which may include: associating with the at least one fare and/or the at least one fare related data may include at least one of: at least one fare data; at least one fare restriction data; at least one routing restriction data; at least one tax data; at least one fare discount data; at least one fare surcharge data; at least one facility charge data; at least one currency conversion rate data; at least one scheduling data; at least one geographic information data; and/or at least one ancillary data.

According to one exemplary embodiment, the method may include where the creating the relationship between the given fare and the fare related data of the given fare, where the fare related data may include airline fare related data, and where the at least one fare restriction data may include at least one of: at least one rule data; at least one fare by rule; and/or at least one footnote data.

According to one exemplary embodiment, the method may include where the at least one airline fare related data may include at least one of: at least one fare data; at least one routing restriction data; at least one constructed fare data may include at least one of: at least one fare add-on; and/or at least one constructed data table may include at least one of: at least one tariff; at least one carrier; at least one fare class; and/or at least one zone; at least one directory data may include at least one of: at least one geography data may include at least one of: at least one city; at least one country; at least one zone; and/or at least one area; at least one air carrier code and/or description data; at least one airline tariff publishing (ATP) tariff translation; at least one fare class data; and/or at least one carrier city fare class (CCF) data; at least one currency conversion rate data may include at least one of: a neutral unit of construction (NUC); at least one passenger facility charge data; at least one answer table may include at least one of: a frequent flyer account; a reservation booking code (RBC); and/or a bank identification number (BIN); and/or at least one ancillary data may include at least one of: at least one branded fare; at least one carrier imposed fee; at least one baggage charge; at least one optional service fee, may include at least one of: at least one meal, at least one entertainment, and/or at least one seat assignment; and/or at least one ticketing fee.

According to one exemplary embodiment, the method may include where the generating may include: where the generating the at least one executable byte code routine may include: implementing at least one applicable data restriction using at least one functional programming technique; and evaluating at least one Boolean response for each of the at least one executable byte code routine.

According to one exemplary embodiment, the method may include where the regenerating may include: where the regenerating the at least one executable byte code routine may include: implementing at least one applicable data restriction using at least one functional programming technique; and evaluating at least one Boolean response for each of the at least one executable byte code routine.

According to one exemplary embodiment, the method may include where the creating of the b) may include: creating, by the at least one processor, the fare and the fare related data in the graph database may include at least one of: i. adding, by the at least one processor, new at least one fare and new at least one fare related data may include at least one of: a. creating at least one additional of the at least one node; b. creating at least one additional of the at least one relationship; and/or c. creating at least one additional of the at least one property.

According to one exemplary embodiment, the method may include where the maintaining of the c) may include: the maintaining, by the at least one processor, the fare and the fare related data in the graph database may include at least one of: i. where the adding, by the at least one processor, the new at least one fare and the new at least one fare related data may include at least one of: a. creating at least one additional of the at least one node; b. creating at least one additional of the at least one relationship; and/or c. creating at least one additional of the at least one property; ii. where the deleting, by the at least one processor, the at least one fare and the at least one fare related data may include at least one of: a. breaking the at least one relationship between a pair of the at least one node; and/or b. deleting the at least one node; and/or iii. where the updating the existing of the at least one fare and the at least one fare related data may include at least one of: a. breaking the at least one relationship between a pair of the at least one nodes; b. creating the at least one relationship; and/or c. updating the at least one property.

According to one exemplary embodiment, the method may include where the updating of the (c)(iii) may include: maintaining a history of the fare and/or the fare related data may include: updating by 'down dating' the existing of the at least one fare and/or the at least one fare related data due to an introduction of at least one replacement of the at least one fare and/or the at least one fare related data.

According to one exemplary embodiment, the method may further include c) implementing a fare analytic engine using the fare analytic database, may include: i) receiving at least one query for the at least one fare and the at least one fare related data; ii) parsing the at least one query; iii) traversing the graph database for the at least one query to obtain at least one result; and iv) providing the at least one result in response to the at least one query.

According to one exemplary embodiment, the method may include where the implementing may include: interrogating the graph database may include laying logic over the graph database for handling at least one query.

According to one exemplary embodiment, the method may include where the receiving the at least one query of (c)(i) may include at least one of: receiving at least one valid itinerary request; receiving at least one organization request; and/or receiving at least one market request.

According to one exemplary embodiment, the method may include where the receiving the at least one organization request may include receiving at least one transportation organization request, where the transportation organization may include at least one of: a shipping line; a sea carrier; an air carrier; a rail operator; a space line; a rental line; and/or an automobile leasing line.

According to one exemplary embodiment, the method may include where the receiving the at least one query of (c)(i) may include at least one of: receiving a request for applying at least one filter of the at least one result; and/or receiving a request for sorting at least one sort of a plurality of the at least one result.

According to one exemplary embodiment, the method may include where the providing the at least one result of the (c)(iii) may include at least one of: providing at least one pricing solution; providing at least one fare; providing at least one fare in a market; providing at least one fare and/or fare related data; providing at least one fare and/or fare related data in a market; and/or providing no fare.

According to one exemplary embodiment, the method may include where the fare analytic engine may include where the at least one query may include at least one of: at least one shopping search request; at least one pricing request; at least one booking request; at least one repricing request; at least one reissue request; at least one fare management request; at least one revenue management request; at least one revenue accounting request; at least one fare audit request; at least one auditing request; at least one fare analysis request; at least one fare reporting request; and/or at least one fare monitoring request.

According to one exemplary embodiment, the method may include where the at least one fare may include at least one of: a passenger fare; an air passenger fare; a commercial air passenger fare; a private air passenger fare; a space travel passenger fare; a cruise line passenger fare; a rail passenger fare; a bus fare; a hovercraft fare; a transportation fare; a cargo fare; a commercial air cargo fare; a private air cargo fare; a space travel cargo fare; a space travel fare; a cruising and/or sea cargo fare; a rail cargo fare; a transportation fare; and/or a manned and/or unmanned fare.

According to one exemplary embodiment, the method may include where the fare may include at least one air passenger fare.

According to one exemplary embodiment, the method may include where the fare may include air fare.

According to yet another exemplary embodiment, a system, method and/or a computer program product may include, e.g., but may not be limited to, a method of performing a dynamic fare based pricing query from at least one computer against a graph database, may include, e.g., but not limited to: a. receiving, by at least one computer processor, the dynamic fare based pricing query for at least one fare and at least one fare related data using the graph database; b. traversing the graph database, by the at least one computer processor, to match the dynamic fare based pricing query to applicable fare and fare related data to identify at least one candidate fare; c. applying, by the at least one computer processor, at least one fare restriction data for the at least one fare and fare related data to the at least one candidate fare to obtain a result; and d. providing the result in response to the dynamic fare based pricing query.

According to one exemplary embodiment, the method may include where the at least one fare may include at least one fare type which may include at least one of: i. a published fare type; ii. a constructed fare type; and/or iii. a fare by rule fare type.

According to one exemplary embodiment, the method may include where the (c) may include: i. returning a Boolean from at least one executable byte code routine for each of the at least one fare restriction data for applicability of the at least one fare restriction data to the at least one candidate fare.

According to one exemplary embodiment, the method where the method may further include at least one of: c. applying, by the at least one computer processor, any applicable construction add-on data to the fare, if the fare is determined to be a constructed fare; and/or d. applying, by the at least one computer processor, fare combinability rules for the dynamic fare based pricing query, if the dynamic fare based pricing query is determined to be a request other than a point-to-point query.

According to another exemplary embodiment, a system, method and/or computer program product may include, e.g., but not limited to, validating, by at least one computer processor, a fare record from routing information of the fare record based upon at least one itinerary, where the validating may include: a. removing, by the at least one computer processor, a need to deal with an actual location, carrier data of an itinerary, and routing, and analyzing a fare record from a format perspective; b. converting, by the at least one computer processor, routing information from an ATPCO Routings subscription file feed to a defined format; c. converting, by the at least one computer processor, a path of travel from the itinerary query to the same format; d. applying, by the at least one computer processor, a pattern matching algorithm on a formatted itinerary against the fare record's routing information to determine a match; and e. returning, by the at least one computer processor, a boolean for whether the match was successful and/or not.

According to another exemplary embodiment, an exemplary system may include, e.g., but may not be limited to, maintaining a fare analytic database may include: at least one memory; and at least one processor coupled to the at least one memory, where the at least one processor is adapted to: receive at least one fare and at least one fare related data; and create a graph database of the at least one fare and the at least one fare related data, where the at least one processor is adapted to: create at least one node of the graph database representing at least one component of the at least one fare and the at least one fare related data; create at least one relationship between a plurality of the at least one nodes; and apply at least one property to the at least one node and the at least one relationship.

According to one exemplary embodiment, an exemplary computer program product embodied on a computer accessible medium, may include program logic, which when the program logic is executed on at least one computer processor may perform a method which may include, e.g., but not be limited to: a) receiving, by the at least one computer processor, at least one fare and at least one fare related data; and b) creating, by the at least one computer processor, a graph database of the at least one fare and the at least one fare related data; where the creating may include: i. creating, by the at least one computer processor, at least one node of the graph database representing at least one component of the at least one fare and the at least one fare related data; ii. creating, by the at least one computer processor, at least one relationship between a plurality of the at least one nodes; and iii. applying, by the at least one computer processor, at least one property to the at least one node and the at least one relationship.

According to one exemplary embodiment, an exemplary method may include a method of maintaining a fare analytic database, which may include, e.g., but may not be limited to: a) receiving, by at least one processor, at least one fare and at least one fare related data; and b) maintaining, by the at least one processor, the fare and the fare related data in the graph database may include at least one of: i. adding, by the at least one processor, a new at least one fare and a new at least one fare related data; ii. deleting, by the at least one processor, the at least one fare and the at least one fare related data; and/or iii. updating an existing of the at least one fare and the at least one fare related data.

Further features and advantages of the invention, as well as the structure and operation of various exemplary embodiments of the invention, are described in detail below with reference to the accompanying drawings.

BRIEF DESCRIPTION OF THE DRAWINGS

The foregoing and other features and advantages of the invention will be apparent from the following, more particular description of an embodiment of the invention, as illustrated in the accompanying drawings wherein like reference numbers generally indicate identical, functionally similar, and/or structurally similar elements. The left most digits in the corresponding reference number indicate the drawing in which an element first appears.

FIG. 4A depicts an exemplary fare data and fare related data exemplary data model for an exemplary but not limiting airline passenger fare environment, according to an exemplary embodiment;

FIG. 4I depicts an exemplary data application automated rules overview process for an exemplary fare data and fare related data exemplary graph database for an exemplary but not limiting airline passenger fare environment, according to an exemplary embodiment;

FIG. 7A depicts an exemplary illustration of an example United States/Canada air passenger exemplary embodiment of exemplary travel itinerary types, according to an exemplary embodiment; and FIG. 7B depicts an exemplary illustration of an example International air passenger exemplary embodiment of exemplary travel itinerary types, according to an exemplary embodiment.

DETAILED DESCRIPTION OF EXEMPLARY EMBODIMENTS OF THE INVENTION

Figure 1A:
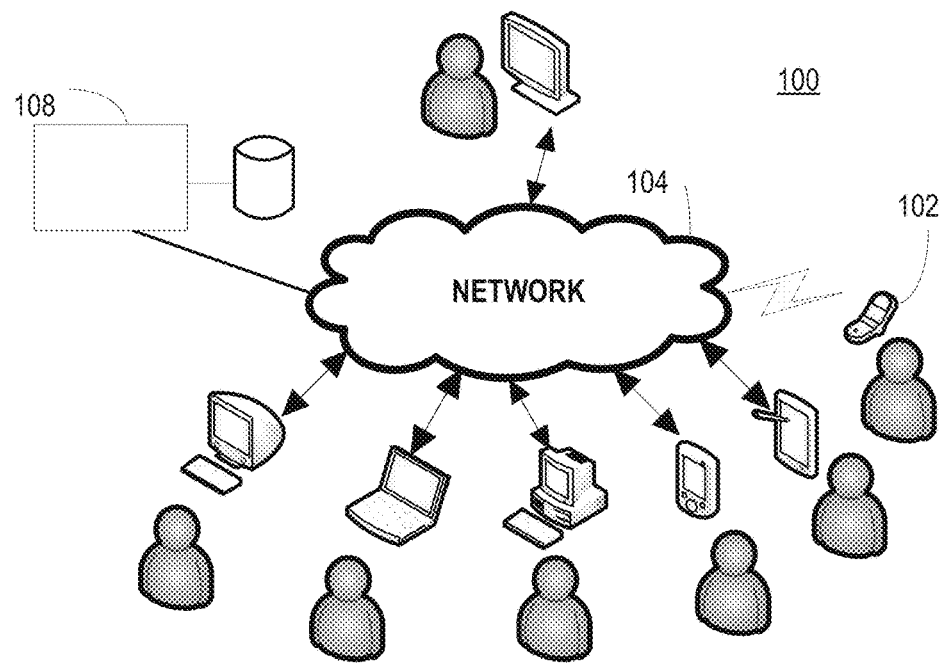
FIG. 1A depicts an exemplary view of an exemplary embodiment of an exemplary heterogeneous client device environment coupled to an exemplary network system adapted to provide a fare analytic engine database and/or query and response application system architecture environment using a plurality of heterogeneous computing and/or communication devices coupled together and to exemplary server devices, in a exemplary distributed networked system architecture, according to an exemplary embodiment.

Various exemplary embodiments of the invention are discussed in detail below. While specific exemplary embodiments are discussed, it should be understood that this is done for illustration purposes only. Exemplary means example for purposes of this application, and various embodiments need not include all features as described herein. A person skilled in the relevant art will recognize that other components and configurations can be used without parting from the spirit and scope of the invention.

An introductory glossary of terms used herein is provided as an example for an exemplary embodiment of an example airline passenger industry example, but the claimed invention is not limited to application in only the example industry, according to an exemplary embodiment.

| GLOSSARY OF TERMS | |
|---|---|
| TERM | DEFINITION |
| ACCOMPANIED PASSENGER | The passenger traveling at the fare being validated who is required to travel with another passenger. |
| ACCOMPANYING PASSENGER | The passenger who is traveling with the passenger on the fare being validated. |
| ACTION (for validation) | The data within this field will be used as data storage, measurement of provisions, or for later matching/ticket issuance. These fields are processed after a match is made to the record. |
| ADD-ON | An amount used only with specified/published fares for the construction of constructed/unpublished fares. (Also referred to as an arbitrary or proportional fare.) |
| ADULT | A person who has reached his/her 12th birthday as of the date of commencement of travel. |
| AREA | IATA divides the world into three Areas, also known as Traffic Conferences (TC). These Areas are:<br>Area 1 - Western Hemisphere<br>Area 2 - Europe, Africa, Middle East<br>Area 3 - Asia, Pacific |

-continued

GLOSSARY OF TERMS

| TERM | DEFINITION |
| --- | --- |
| ASSEMBLY POINT | A point in the itinerary where the entire qualifying group assembles and commences transportation as a group. |
| ATPCO DOMESTIC FARE PRODUCT | Fares published within the US/CA or between US and Canada. This also includes travel between US Virgin Islands and Puerto Rico and US/CA. |
| ATPCO INTERNATIONAL FARE PRODUCTS | Fares involving travel between 2 or more sovereign states or travel within a sovereign state other than US/CA and between US and Canada (Including ATPCO All Fares data). |
| AUTOMATED TICKET MACHINE | Ticketing kiosk machine. |
| CATO | Consolidated Airline Ticket Office. |
| CHILD | A person who has reached his or her second birthday but not his or her twelfth birthday as of the date of commencement of travel from the journey origin. |
| CIRCLE TRIP (Two Components) (Subcategory 102 - ATPCO US/CA Fares) | From point A to point B and back to point A on two different carriers, or on the same carrier but different fare classes, or different carriers and the same or different fare classes. At least one segment must be half of a roundtrip fare. |
| CIRCLE TRIP (More than Two) (Subcategory 103 - ATPCO US/CA Fares) | From point A to point B to point C and can be to point X back to point A on the same or different carriers, and on the same or different fare classes. At least one segment must be half of a round-trip fare. NOTE: where X equals any number of points. |
| CIRCLE TRIP Subcategory 103 - Intl Fares) | Travel from a point and return thereto by a continuous, circuitous air route, using applicable half round-trip fares. Circle Trip includes journeys comprising of two fare components which do not meet the conditions of the round trip definition; provided that where no reasonable direct scheduled air route is available between two points, a break anywhere in the circle between two fare construction points may be traveled by any other means of transportation without prejudice to the circle trip. |
| CITIZEN | A person who has citizenship of a given country, either by birth or naturalization (as also called national). |
| CODING CONVENTIONS | A set of manual standards established to provide consistency in coding the data . . . (A Coding Convention is not an actual programming edit.) |
| COMBINATION | Whenever two or more one-way or round-trip or half-round-trip fares are used and shown separately in a fare calculation. |
| CONSTRUCTED | IATA term for unspecified through fares created by the use of add-on amounts, or two or more fares shown as a single amount in a fare calculation. (ATPCO also refers to this as unpublished.) |
| DATA TABLE STRING OR 'STRING' | A series of 1 to 200 data table numbers and the relational indicators contained on the recurring segment of the Record 2 |
| DATA TABLE SET OR 'SET' | A series of data tables within the string between a THEN data table to the next THEN data table or ELSE data table. |
| DATA TABLE SUBSET OR 'SUBSET' | A series of data tables in the string that can stand alone to validate the fare component. Generally this is equal to one Record 3 table when tables are strung with OR. It can also be a group of tables which constitute a unit of thought when there is an AND relational indicator. Subsets include the following situations: THEN, AND THEN (When the next table is OR and there is no IF condition) THEN, IF THEN, AND, IF THEN, IF, AND THEN, AND, IF, AND ELSE, AND OR ELSE |
| DESTINATION | Ultimate stopping place of the journey as shown on the ticket. ATPCO Note: When the word destination is used in a fare rule, general rule, or Rule 2, it will be necessary to determine the carrier's own definition. |

GLOSSARY OF TERMS

| TERM | DEFINITION |
|---|---|
| DIRECT FLIGHT | Any service of transportation with a single flight number making no, one or multi intermediate stops, including change of gauge/funnel and nonstop flights. |
| DIRECTIONAL FARE | Fares that are published with a directional indicator (either on the fare record or footnote). Directional fares are usually international. |
| DIRECTIONALITY TAG 1 | A tag used on the Record 1 or 2 to indicate that the Record 3 provision applies from Location 1 to Location 2. |
| DIRECTIONALITY TAG 2 | A tag used on the Record 1 or 2 to indicate that the Record 3 provision applies from Location 2 to Location 1. |
| DIRECTIONALITY TAG 3 | A tag used on the Record 1 or 2 to indicate that the Record 3 provision applies for travel originating in Location 1. |
| DIRECTIONALITY TAG 4 | A tag used on the Record 1 or 2 to indicate that the Record 3 provision applies for travel originating in Location 2. |
| DOMESTIC | Within a sovereign state/a single country. |
| ENCODED | Data within an automated file, the term encoded rules is frequently used as a description of the Automated Rules Subscription product. |
| END-ON-END (Subcategory 104 - US/CA Fares) | Combination of Priceable Units at fare combination points (including an A-B-A of one-way fares combined between the same points). |
| END-ON-END (Subcategory 104 - Intl Fares) | Combination two or more, one-way fares, or Priceable Units, at a fare break point. (Not applicable to combinations between the same points.) |
| FARE | ATPCO fare record or can be used to describe published tariff fare amount. |
| FARE BREAK POINT | Terminal points of a fare component (these are also termed fare construction points.) |
| FARE CLASS | The one to eight character identification of the fare. |
| FARE CLASS RECORD | The record that contains the same information as is found in a fare class application. It specifies Booking Codes, Fare Type, Ticketing Codes, Passenger Type, Season Type, Day Type. (Record 1.) |
| FARE COMPONENT | A portion of a journey or itinerary between two consecutive fare break points. |
| FARE DESTINATION | The ultimate point of the pricing unit. |
| FARE FAMILY | A method of identifying multiple fare classes in a single entry. In the Category ID, the Fare Class field can be coded with a hyphen to mean all fare classes that contain these characters. |
| FARE ORIGIN | The initial point of a pricing unit. |
| FARE SELECTION | The process by which the subscriber or GDS/CRS determines which of the ATPCO fare records are applicable to the itinerary; a prerequisite of this process is the determination of the primary portion for each fare component.. |
| FARE TYPE | Groups similar types of fares, a symbolic identification of the characteristics of a fare class. (See Appendix B.) |
| FLIGHT COUPON | The portion of a ticket that contains particular points between which the coupon is good for carriage. May cover single or multiple legs of a flight, may even contain entire journey. |
| FLIGHTS | The specific flight number or number range that applies for the fares. |
| GATEWAY | The last point of departure or first point of arrival within a geographic locale as specified below: (Note there is an implied hierarchy in the following descriptions.)<br>a. When traveling between Areas 1, 2, or 3, the last point of departure/first point of arrival in that area.<br>b. When traveling between zones within an area, the last point of departure/first point of arrival in that zone (not applicable to travel between zones within the United States).<br>c. When traveling between countries within a zone, the last point of departure in one country and the first point arrival in another country.<br>NOTE: Gateway hierarchy applies to fare components or pricing units depending upon category application. When travel crosses multiple IATA areas, such as NYC-BOM via PAR (Area 1 to Area 3 via Area 2), |

GLOSSARY OF TERMS

| TERM | DEFINITION |
|---|---|
| | the departure from Area 1 (NYC) and the arrival in Area 3 (BOM) are considered the gateways. The intermediate via points in Area 2 are not (PAR), unless further modified by a Gateway TSI in combination with Geographic Location (such as Gateway Europe). |
| GREAT CIRCLE MILES (GCM) | The calculation of the mileage between two points by use of each location's longitude and latitude. |
| TRIP FARE (US/CA Fares) | 1. (US/CA fares) Half of a round-trip fare. A one-way fare is never considered a half-round-trip fare.<br>2. (International fares) Half of a round-trip (Tag 2) fare or a one-way (Tag 1) fare doubled and halved. Half of a specified/published or constructed/unpublished round trip normal or special fare. Additionally, the one-way normal may be considered to be a half-round-trip normal fare. If a one-way special fare may be doubled to establish a round-trip special fare, the one-way special fare may be considered to be a half-round-trip special fare.<br>A one-way Tag 1 fare doubled and halved may be considered to be a half-round trip-fare, but it is never considered to be a Tag 2 fare.<br>A half-round-trip fare is never a one-way (Tag 3) fare that cannot be doubled. |
| HALF ROUND-TRIP FARE (Intl Fares) | Half of a specified/published, constructed/unpublished, round-trip normal or special fare. Additionally, the one-way normal may be considered to be a half-round-trip normal fare. If a one-way special fare is doubled to establish a round-trip special fare, the one-way special fare may be considered to be a half round-trip special fare. Therefore:<br>A half round trip fare may be a one-way fare doubled and halved, or, half of a round-trip fare.<br>A half round trip fare is never a one-way fare (Tag 3) that cannot be doubled. |
| HIGHER INTERMEDIATE POINT (HIP) | A city between the origin and destination of the through international fare component that has a higher fare |
| HIP TYPE CODES | HIP type codes<br>1. O, Origin - Intermediate. The HIP application applies from the origin of the fare component to any ticketed point(s) within the fare component being assessed.<br>2. D, Intermediate - Destination. The HIP application applies from a ticketed point to the fare component destination of the fare component being assessed.<br>3. I, Intermediate - Intermediate. The HIP application applies between any two ticketed points within the fare component being assessed. |
| INBOUND TRAVEL | 1. (non-directional fares) All fare components within the pricing unit that occur after the point of turnaround (after the furthest geographical fare break point.)<br>2. (directional fares) All fare components within the pricing unit that are selected in the opposite direction of the passenger's travel. |
| INTERLINE | The transfer of services from one carrier to a different carrier, can include transferring between the services of the primary carrier to another carrier. |
| INTERMEDIATE POINT | A ticketed point between the terminal points of the Fare Component. |
| INTERNATIONAL | Travel between any two or more sovereign states. |
| ITINERARY | All points of planned travel. |
| JOURNEY | Entire ticket/itinerary (All points on a ticket.) |
| KEY MATCH | The basic information needed to uniquely identify a record for data maintenance purposes, such as record or table number. |
| LEG | A service of transportation between two consecutive scheduled intermediate stops on any given flight. |
| LOCALE | 1. A geographic point.<br>2. A specific location identified as a city, state, country, zone, or area. Can in some instances include airports. |
| MAIN CATEGORY | A description of the category of the rule that controls the requirement. |

-continued

| GLOSSARY OF TERMS | |
|---|---|
| TERM | DEFINITION |
| MARKETING CARRIER | The carrier code that will appear on the flight coupon of the ticket (typically used for code share). |
| MATCH | The data that is used to determine if the record or table is applicable. |
| MIRROR IMAGE | (Subcategory 102, International fares) A round-trip pricing unit consisting of two fare components, half of a round trip (Tag 2 fare) using the same Tariff/Carrier/Rule/Fare class code on both components, and where no differing mileage and/or HIP surcharges exist on the pricing unit. |
| MPM (MAXIMUM PERMITTED MILEAGE) | The maximum number of miles that may be traveled for a fare component without incurring a mileage surcharge. |
| MULTI-STOP | A service of transportation with a single flight number making 2 or more intermediate stops. |
| NATIONAL | A person who has citizenship of a given country, either by birth or naturalization Also called citizen. |
| NON-DIRECTIONAL FARE | Fares that are published without a directional indicator (either on the fare record or footnote). Non-directional fares are usually domestic. |
| NONSTOP FLIGHTS | A service of transportation on the same flight number without any intermediate stops (stops includes gauge and funnel flights.) |
| ONLINE | The transferring from different flights services on the same carrier, or the transferring of services on the primary carrier only. |
| OPEN JAW (Subcategory 101 - ATPCO US/CA fares) | 1. For 'turnaround open jaw' the outward point of arrival and the inward point of departure are different. At least one segment must be half of a round-trip fare.<br>2. For 'origin open jaw' the outward point of departure and the inward point of arrival are different. At least one segment must be half of a round-trip fare.<br>3. For 'single open jaw' either the outward point of arrival and the inward point of departure are different, or the outward point of departure and the inward point of arrival are different. At least one segment must be half of a round-trip fare.<br>4. For 'open jaw' either the outward point of arrival and the inward point of departure are different, or the outward point of departure and the inward point of arrival are different. At least one segment must be half of a round-trip fare.<br>5. For 'double open jaw' both the outward point of arrival and the inward point of departure are different, and the outward point of departure and the inward point of arrival are different. At least one segment must be half of a round-trip fare. |
| OPEN JAW (Subcategory 101 - ATPCO INTL fare product) | Using applicable half round trip fares:<br>1. For 'turnaround open jaw', the outward point of arrival and the inward point of departure are different.<br>2. For 'origin open jaw', the outward point of departure and the inward point of arrival are different.<br>3. For 'single open jaw', either the outward point of arrival and the inward point of departure are different, or the outward point of departure and the inward point of arrival are different.<br>4. For 'double open jaw' both the outward point of arrival and the inward point of departure are different, and the outward point of 'departure and the inward point of arrival are different.<br>5. For 'open jaw', any of the above may apply. |
| ORIGIN | Initial starting place of the journey as shown on the ticket. |
| ORIGINATING | The starting point of the pricing unit associated with a locale. |
| OUTBOUND TRAVEL | 1. (non-directional fares) All fare components within the pricing unit prior to the point of turnaround (prior to the furthest geographical fare break point).<br>2. (directional fares) All fare components that are selected in the direction of the passenger's travel. |
| OVERWATER | Applies when crossing a water mass within Area 1. When validating overwater travel, processing will determine the end points of a sector (coupon). Both end points must be within Area 1. When one end point is within the continental United States/Canada and the |

GLOSSARY OF TERMS

| TERM | DEFINITION |
|---|---|
| | other end point is outside continental United States/Canada, this is considered overwater travel. This definition applies specifically for sectors between the following points: Between Continental US/CA and Hawaii Between US/CA/Hawaii/Alaska and Puerto Rico/Virgin Islands Between Alaska and Hawaii |
| OWNING CARRIER | The carrier who owns or publishes the fare. Also called publishing carrier. |
| PERMANENT RESIDENT | A person legally living in a given country. Also called resident. |
| POINT OF TURNAROUND | Farthest geographical fare break point on the pricing unit, measured from pricing unit origin; not applicable on a one way pricing unit. Also called turnaround. |
| PRICING UNIT | A one-way fare that is qualified in its own terms independent of any other fare component. 2. Combination of two or more fare components where one or more of the components is dependent upon all of the others to qualify for autopricing. (Also called priceable unit.) |
| PRICING SOLUTION | A combination of fares that is considered as a possibility for a desired charge for a passenger. |
| PRICING UNIT | A one-way fare that is qualified in its own terms independent of any other fare component. Combination of two or more fare components where one or more of the components is dependent upon all of the others to qualify for autopricing. (Also called priceable unit.) |
| PRIMARY PORTION OF TRAVEL | A portion of travel of a fare component that determines the carrier's fare that will be selected for the entire fare component. (Determination of primary portion may vary by CRS.) |
| PROVISION | Information attached to a fare requiring validation. |
| PUBLISHED | ATPCO term for published round trip or one-way fares on the ATPCO fare record. (ATPCO also refers to this as 'Specified'.) |
| PUBLISHING CARRIER | The carrier who owns or publishes the fare. Also called owning carrier. |
| QUALIFYING CATEGORY | The conditional category that contains the information that must be met for the main category to be validated. |
| RBD | The Reservation Booking Designator/Booking code that can or must be used. |
| RECURRING SEGMENT | A portion of a record that may be repeated. The recurring segment is preceded by a counter indicating how many times the recurring portion occurs. The use of recurring segments results in a variable length depending on the number of the recurring segments that are included in the record. |
| RESIDENT | A person legally living in a given country. Also called permanent resident. |
| RESOLVE | The process of matching one ATPCO record to other ATPCO records to build a complete association to the ATPCO fare. |
| ROUND THE WORLD (RTW) Intl fares | (Subcategory 103, International fares) Travel from the point of origin and return thereto which involves only one crossing of the Atlantic Ocean and only one crossing of the Pacific Ocean. Note that a single round-the-world fare component does not validate against Subcategories 102 or 103 (validation is only against Sub-category 104 to determine if End-on-End is required). See also Combinations (Category 10). |
| ROUND TRIP (US/CA fares) | 1. (Subcategory 102, US/CA fares) (data application) From point A to point B and return to point A on the same tariff, same carrier, same rule, and same round-trip fare class code. Note that if carriers wish to restrict the route of travel on the fares, then this can be done via the Routing Map and/or Category 4. See also combinations. |
| ROUND TRIP (Subcategory 102 - Intl fares) | 2. (Subcategory 102, International fares, excluding round-the-world fares) (data application) From point A to point B and return to point A using two fare components only, for which the applicable half-round-trip fare for each component, measured from point A, is the same for the routing traveled. Exception: If fares |

GLOSSARY OF TERMS

| TERM | DEFINITION |
|---|---|
| | differ through class/season/day of week or carrier variation, it is still a round-trip. Note that after processing, if the results show a different HIP (Higher Intermediate Point) and/or a different mileage surcharge has been applied on fare component(s) in the pricing unit, then the above pricing solution would be considered a Circle Trip. See also combinations. |
| RULE TYPE | A code that identifies the type of every rule in every tariff. These types are:<br>F = Fare Rule (Rule governs published fares)<br>G = General Rule (Rule governs other rules)<br>N = IATA Rule (International -- applies to all carriers). Proposal to be eliminated<br>R = Fare by Rule (Rule governs unpublished fares such as Seamen, Children, Family Plan, etc.) |
| SATELLITE TICKET PRINTER | Remote ticketing printer, a ticketing printer that is off-site. |
| SATO | Scheduled Airline Ticket Office. |
| SEASON TYPE | A code that identifies the fare as applying during a specific type of season, such as High, Low, or Basic. |
| SECONDARY PORTION OF TRAVEL | A portion of travel of a fare component that is not determined as primary portion of travel. |
| SECTOR | In international fares, a portion of a journey covered by a single flight coupon. Also called segment. |
| SEGMENT | In domestic US/CA fares, a portion of a journey covered by a single flight coupon. Also called sector. |
| SPECIFIED | IATA term for round-trip or one-way fares published in a Tariff Conference Resolution. Also called published.) |
| STANDBY | 1. Passengers who are holding tickets on standby fares that do not allow them to make reservations;.<br>2. Passengers on a waiting list awaiting an available seat. |
| STATUS CODES | Codes that indicate whether a reservation is confirmed (e.g. waitlisted = WL). |
| STOPOVER | Occurs when a passenger breaks the journey at an intermediate point within the fare component and is not scheduled to depart on the day of arrival within (the time defined in a carrier's tariff) of arrival if there is no connection on the day of arrival. Usually 4 hours for domestic travel and 24 hours for international. |
| TAG 1 | 1. (domestic US/CA fares) A one-way fare.<br>2. (international fares) A one-way fare that may be doubled and halved (can be used in one way, round trip, circle trip, and open jaw pricing units). |
| TAG 2 | 1. (domestic US/CA fares) A published round-trip fare.<br>2. (international fares) A published round-trip fare (may only be used in round trip, circle trip, or open jaw pricing units). |
| TAG 3 | (international fares) A one-way fare that may not be doubled and halved (may only be used on one-way pricing units). |
| TARIFF | ATPCO tariff number and/or name. Geographic areas of the world are assigned tariff number and names. Fares for markets within that geographic area are distributed with the assigned tariff number. |
| TARIFF NAME | See tariff number. |
| TARIFF NUMBER | Geographic areas of the world are assigned tariff number and names. Fares for markets within that geographic area are distributed with the assigned tariff number. |
| TERMINAL POINTS | Fare break point; the ends of a fare component. Typically used when a fare has not yet been assessed for the fare component. |
| THROUGH FARE | A fare applicable for travel between two consecutive fare break points via an intermediate points. A through fare can be a Published/Specified fare or a Constructed/Unpublished fare. |
| TICKETED POINTS | Point shown in the "good for passage" section of the passenger's ticket. Can be a connection, stopover, or fare break point. |
| TICKETING CODE | A code used to replace the fare class code on the ticket when it is issued and possibly on the fare display. |

-continued

| GLOSSARY OF TERMS | |
|---|---|
| TERM | DEFINITION |
| TICKETED POINT MILEAGE | The number of miles between pairs of cities as published in the Ticketed Point Mileage Manual. |
| TRANSATLANTIC | Transportation between the Area 1 and Area 2 or Area 1 and Area 3 via the Atlantic Ocean. |
| TRANSBORDER | Transportation between the 50 US states, including the District of Columbia and Canada. |
| TRANSFER | A change from the services of one carrier to another service of the same carrier (online) or to the services of another carrier (interline). |
| TRANSFERS - MAXIMUM NUMBER | The maximum number of transfers permitted for the one-way or round-trip fare. When fares are combined the number of transfers permitted for the combination of fares within the same tariff, carrier and rule unless otherwise noted. |
| TRANSOCEANIC | Transatlantic or transpacific travel. |
| TRANSPACIFIC | Transportation between Area 1 and Area 2 or Area 1 and Area 3 via the Pacific Ocean. |
| TRIP | A portion of an itinerary between two consecutive fare break points (used in domestic tariffs). Also called fare component. |
| TSI (TRAVEL SEGMENT INDICATOR) | Codes that define a specific portion(s) of travel; these codes may be used alone or in combination with Geographic Locales to specify the application of a provision. |
| TURNAROUND | Farthest geographical fare break point on the pricing unit, measured from pricing unit origin. (Not applicable on a one way pricing unit.) Same as 'point of turnaround'. |
| UNPUBLISHED FARE | ATPCO term for fares constructed by adding specified and add-on amounts together. Also called constructed. |
| VIA POINT | An intermediate point between two terminal points of a fare component. |
| VALIDATING CARRIER | The carrier whose ticket stock was used to issue the ticket. This carrier is commonly the holder of the money for the ticket. Also called plating carrier. |
| VOLUNTARY CHANGES | A change in the ticketed itinerary that the passenger requested where there is a replacement itinerary and the ticket is reissued/revalidated. Passengers who wish to standby for a flight are not included in this definition. |
| VOLUNTARY CANCELLATION | A cancellation of a ticketed itinerary that the passenger requested where there is no replacement itinerary and the ticket is refunded or discarded (no value). Does not include lost tickets. |
| WAITLIST | List established when there are no more readily available spaces; names awaiting seat availability. |

Table 1 sets forth an overview of additional exemplary terms and exemplary, but nonlimiting, general definitions for various travel related itinerary terms, according to an exemplary embodiment.

TABLE 1

| Term | Definition | | |
|---|---|---|---|
| Circle Trip (2 Components) | From point A to point B and return to point A using two fare components only. At least one fare component must be priced using half of a round trip fare. | | |
| Circle Trip (More than 2 components) | Travel on a single pricing unit from a point and return thereto by a continuous, circuitous route, using applicable half round trip fares. At least one fare component must be priced using half of a round trip fare. | | |
| End-on-End | Combination of pricing units that are shown separately on the ticket that need not have a common fare break point. End-on-End includes A-B-A combinations. | | |
| Half Round Trip | Half of a round trip fare. A one way fare is never considered a half round trip fare. | | |
| One Way | From point A to point B | | |
| Open Jaw | Turnaround Open Jaw = | The outward point of arrival and the inward point of departure are different. | |
| | Origin Open Jaw = | The outward point of departure and the inward point of arrival are different. | |

TABLE 1-continued

| Term | Definition | |
|---|---|---|
| | Single Open Jaw = | Either, the outward point of arrival and the inward point of departure are different, or, the outward point of departure and the inward point of arrival are different. |
| | Double Open Jaw = | Both the outward point of arrival and the inward point of departure are different, and, the outward point of departure and the inward point of arrival are different. |
| | Open Jaw = | Any of the above. |
| Round Trip | | From point A to point B and return to point A |

The reader is directed to FIGS. 7A and 7B for an exemplary illustration of an example United States/Canada air passenger exemplary embodiment, and International air passenger exemplary embodiment, respectively, to further illustrate an exemplary travel itinerary as may be used to illustrate the information of Table 1, for an exemplary travel itinerary, for which a query may be made to an exemplary fare analytic database and/or fare analytic engine to obtain a response to the query following traversal of an exemplary fare analytic graph database, according to an exemplary embodiment.

According to an exemplary embodiment, a method of constructing and maintaining a fare analytic graph database is set forth.

Overview of Exemplary Embodiments

An exemplary fare analytic database system and pricing service, according to an exemplary embodiment of the present invention, may include a multi-platform app, application program, or applet, which may enable users to receive a response to a query. According to an exemplary embodiment, the fare analytic database may be implemented as a graph database, such as, e.g., but not limited to, Neo4j, and querying the database may include traversing the graph database with a graph database query tool such as, e.g., but not limited to, Cypher.

FIG. 1A depicts an exemplary view of an exemplary embodiment of an exemplary heterogeneous client device environment coupled to an exemplary network system adapted to provide a network-based fare analytic database and pricing engine system architecture environment including a plurality of computing and/or communication devices coupled together in a distributed networked system architecture 100, according to an exemplary embodiment.

An exemplary computer system platform executing an exemplary software application program, which may reside, in an exemplary embodiment, on an exemplary user's client computing and/or communications device 102, and/or on a server 108 in interactive communication over an exemplary network 104 with the user's client computing device 102 in a client/server, hierarchical, terminal server, or peer-to-peer fashion, may include, but is not limited to, a computing or communications device, desktop/laptop computers, tablet computers, personal digital assistant, telephony, smartphone, mobile device, mobile phone, wireless device, tablet, personal digital assistant, handheld and the like, which may in an exemplary embodiment, be the device capable of providing user display or other output and receiving input from user interactive selections or queries/requests, via any of various well known heterogeneous input hardware/software integrated devices, for creation of a graph database, and/or queries of the graph database via the user computing device. According to an exemplary embodiment, various versions of the exemplary software program, which may be, e.g., but not limited to, a browser based application, an application program, a JAVA virtual machine, a database query application, a database management system, an applet, an app, an iOS app, an Android app, a Windows 7/8/n+ app, a standalone application program, a browser-based user interface, an Internet-browser-based interface, a JAVA applet, among various other embodiments as will be apparent to those skilled in the art, and as discussed further below with reference to FIGS. 1A-5, according to various exemplary embodiments.

In an exemplary embodiment, data structures and/or database architectures may be depicted for illustration purposes, but are intended as examples, to be exemplary, but nonlimiting, and are provided to assist in ensuring the claimed inventions are sufficiently enabling to persons having ordinary skill in the relevant art. Various other embodiments may also be used, and examples are not intended, and likely are not exhaustive. Exemplary, but not limiting browser-based interactive interfaces, or an application or applet, such as, e.g., a toolbar, a browser based toolbar, an applet, or other application program that may be provided in any of various well known ways, such as, e.g., but not limited to, an Internet browser-based toolbar, a JAVA applet, an ANDROID application, a Windows 7 or Windows 8, etc. application program, an iPOD, iPhone, or iPAD application, a MAC OS/X application, an iOS application, or the like, etc., may be used to provide various aspects of the applications set forth and contemplated within the claimed inventions, according to an exemplary embodiment.

Figure 1B:
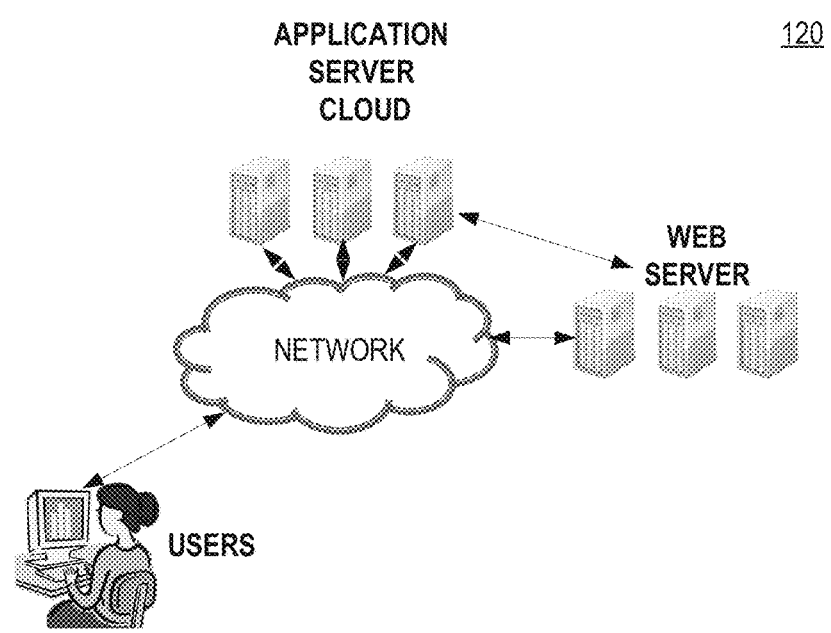
FIG. 1B depicts an exemplary embodiment of an exemplary, but not limited, fare analytic engine database and/or query and response application system, method and/or computer program product, system architecture high level diagram, according to an exemplary embodiment coupling together a plurality of application servers, and/or web servers by an exemplary cloud-based architecture network to a plurality of example user devices, according to an exemplary embodiment.

FIG. 1B depicts an exemplary embodiment of a fare analytic engine database and/or query and response application system, system architecture high level diagram 120, according to an exemplary embodiment coupling a plurality of user devices together to a plurality of web server and/or application server devices by an exemplary cloud-based architecture network or other network architecture, according to an exemplary embodiment.

According to an exemplary embodiment an exemplary cloud/network system and software, or a remote client server topology, a world wide web based (WWW) internet browser based application, and/or the like application may be provided. Users as shown in diagram 120 may access applications, in an exemplary embodiment via a network illustrated by the cloud, which may include, for example web server(s) such as, e.g., but not limited to, domain name servers (DNS) servers capable of domain name resolution, and hyper text markup language (HTML), JAVA applications, and/or extensible markup language (XML) implemented interactive applications, as a service offering may be implemented, and may allow, e.g., but not limited to, interactive client to remote server device interaction in well known matters via various well known network protocols such as the internet protocol (IP) and the transmission control protocol (TCP), as well as any well known network stack implementing the various communications layers of the OSI model for standard communication between two or more computing devices. According to an exemplary embodiment, many exemplary commercial cloud service providers and/or private networks and/or virtual private networks, may be used to host an application, if not a separate server one may use a cloud based offering such as, e.g., but not limited to, Amazon, Rackspace, Microsoft and/or many others as will be apparent to those skilled in the art, offering such capabilities, or alternatively application service providers (ASPs), software as a service (SAAS) providers, etc., according to an exemplary embodiment.

Figure 1C:
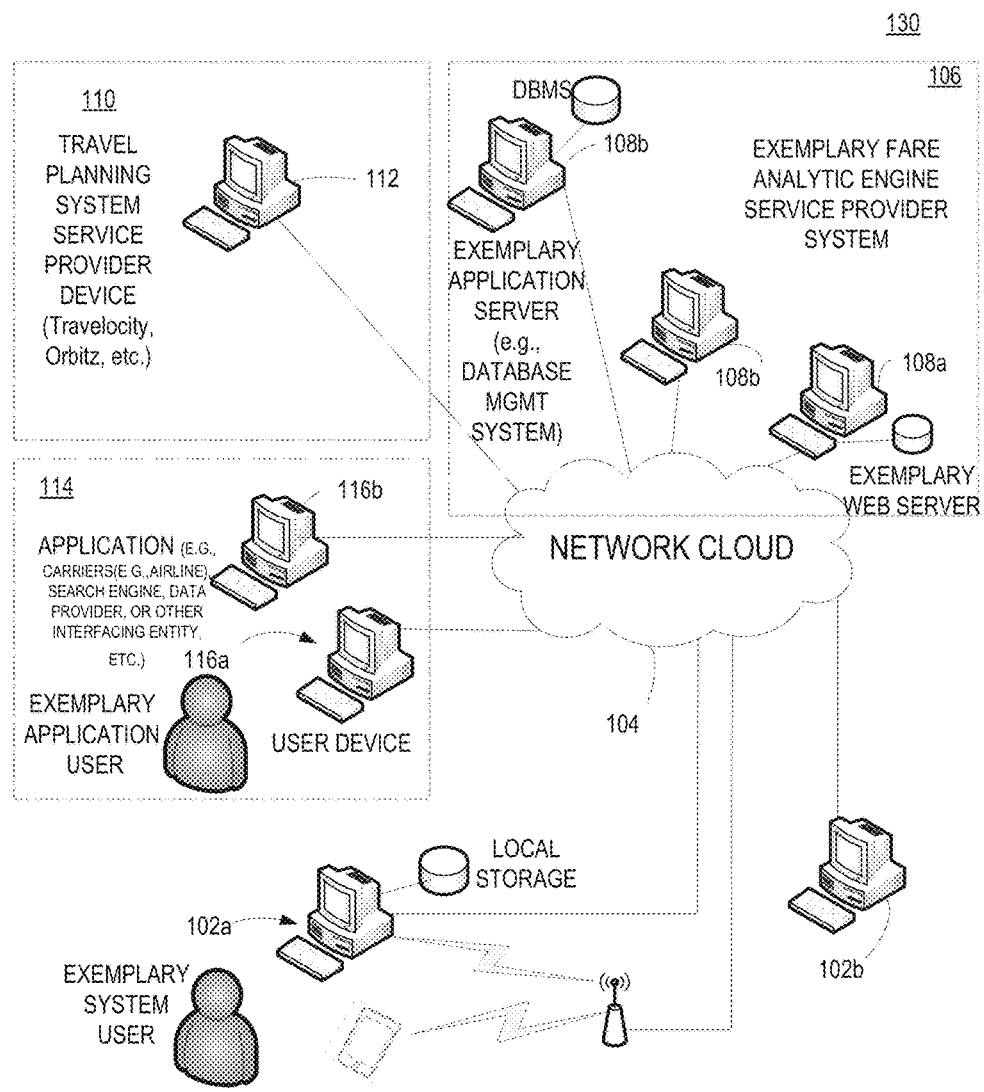
FIG. 1C depicts an exemplary embodiment of an exemplary system architecture illustrating an exemplary distributed user and service provider network environment for providing an exemplary embodiment of a fare analytic database and/or engine and/or query and response application service provider system distributed network architecture environment, according to one exemplary embodiment.

FIG. 1C depicts an exemplary embodiment of an exemplary system 130 illustrating an exemplary user and service provider network environment for providing an exemplary embodiment of a fare analytic engine database and/or query and response application service provider system distributed network environment, according to an exemplary embodiment. Diagram 130 of FIG. 1C illustrates an exemplary user devices 102a, 102b (collectively referred to as 102, e.g., a personal computer (PC), or smartphone, among other devices as illustrated in FIG. 1A above, etc.) by which a user may access a network 104 to gain access to other network resources, according to an exemplary embodiment. According to an exemplary embodiment, the user device 102 may communicate via network 104 to other user devices 102 via any of various communications applications such as, e.g., but not limited to, browser based applications, search engines, query tools, electronic mail systems, or social networks, collectively applications 114, 116, database management systems 106, 108, and/or travel planning systems 110, 112 as illustrated including application service provider 114 device 116 and/or travel planning system service provider 110 device 112 also coupled to network 104, according to an exemplary embodiment. According to various embodiments, the user devices 102 may also access an exemplary fare analytic database and fare analytic engine system service provider 106, which as illustrated may include service provider user device 108b as may be used to create and manage a database, and/or to handle, e.g., pricing of fares, and responding to queries, etc., and/or traversing the database processing queries. An exemplary travel planning system 110 may actually use the fare engine to schedule travel or other services, and may process financial transactions to, e.g., but not limited to, a bank and/or credit card service, etc. base on the fare calculated via the fare analytic database and fare analytic engine, according to various exemplary embodiments. As shown, the user devices 102 may access the exemplary fare analytic engine service provider system 106, via, e.g., but not limited to, a browser-based internet application, or other means, as will be apparent to those skilled in the art, such as, via, e.g., but not limited to, the illustrated web server 108a, which may perform such functions as providing load balancing and/or security, and/or a firewall for the service provider 106, as well as may then serve access to one or more application servers, such as, e.g., but not limited to, servers, which may include a database management system (DBMS) such as, e.g., but not limited to, a relational database, and/or a graph database, according to an exemplary embodiment, or other database management system, or other application software system, according to an exemplary embodiment. Further, as illustrated, other devices of users such as, e.g., but not limited to, application service provider devices, or other devices 116a, 116b (collectively 116), may be used to access data subscribed from the fare analytic engine service provider 106 systems 108, for application based embodiments, and may be downloaded onto and/or interactively accessed via, the appropriate user device, as discussed below, which when executed may accept queries, for example, as may be used in one exemplary embodiment.

Figure 1D:
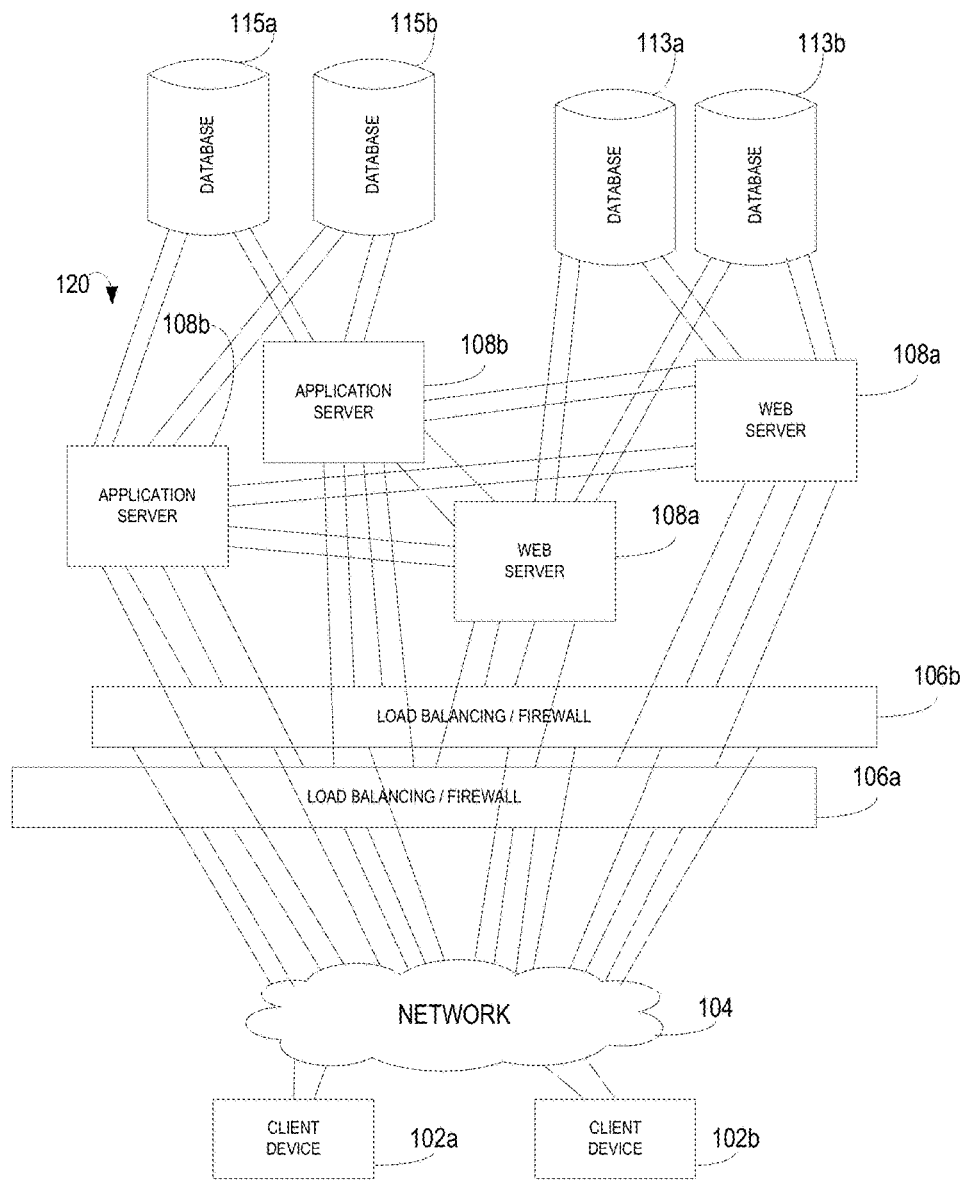
FIG. 1D depicts an exemplary embodiment of an exemplary system illustrating an exemplary backend fare analytic engine database and/or query and response application service provider system and/or distributed network environment, including optional fault tolerant components, according to one exemplary embodiment.

FIG. 1D depicts an exemplary embodiment of diagram 140 of an exemplary system illustrating an exemplary fare analytic engine database and/or query and response application service provider system and/or distributed network environment. FIG. 1D illustrates an exemplary overview of an exemplary system for creating and maintaining a fare analytic graph database, and for receiving and processing queries that traverse the fare analytic graph database, providing a fare analytic engine as may be used in an exemplary environment according to various exemplary embodiments of the present invention. FIG. 1D depicts an exemplary embodiment of a high level system block diagram 140 that can be used to provide an exemplary system for providing a query and response engine according to an exemplary embodiment of the present invention.

The high level system block diagram 140 of FIG. 1D may include, in an exemplary embodiment, users interacting with browsers on client devices 102a, or 102b (collectively 102), respectively. Browsers can be, e.g., but not limited to, application software programs executing on computer workstations or other computer processor based devices 102 (including mobile devices such as, e.g., but not limited to, communication devices, phones, smartphones, tablets, and/or computer tablets), which may be coupled via a network 104 (in wireline and/or wireless fashion) to other devices, as shown, in an exemplary embodiment. Workstations 102 can be coupled via a network 104 such as, e.g., but not limited to, an internet, and intranet, or another type of network. In an exemplary embodiment network 104 may include the global Internet. Network 104 may provide access for client devices 102 to gain access to, e.g., but not limited to, one or more application servers 108b, 120, such as, e.g., but not limited to, a database management system (DBMS) including, e.g., but not limited to, database 115a, 115b. According to an exemplary embodiment, the DBMS may include a graph database 115 as discussed further herein. Although a client server topology is discussed any of various other well-known types of communications topologies may also be used such as, e.g., but not limited to, point-to-point, peer-to-peer, cloud-based, software as a service (SAAS), browser-based, hierarchical, distributed, and/or centralized, etc. The application server 108b, 120 can manage one or more databases (collectively 115). In an exemplary embodiment, the application server 108b,120 can access an exemplary database(s) 115, e.g., a relational database having a plurality of data records, where in an exemplary embodiment, each data record may have one or more fields, or a graph database including one or more nodes, relations, and properties, etc. It will be apparent to those skilled in the art, that each database 115a, 115b can be part of a larger database, or could be broken into a plurality of separate subdatabases. In an exemplary embodiment of the present invention, search results can include a plurality of records obtained from the database 115 that meet search criteria included in a search query. Network 104 may be coupled to any of various well known components such as, e.g., but not limited to, one or more load balancing devices or firewall devices 106a, 106b (collectively 106), web server(s) 108, application server(s) 110, routers, gateways, physical layer devices, data link layer devices, and/or network layer devices, etc.

As illustrated, web servers 108 and application servers 108(b) may be coupled to one another via one or more network(s) 104. Although network 104 is shown, in an exemplary embodiment, as being downstream of load balancing devices 106, it is also possible to have a network upstream of load balancing devices 104, coupling, e.g., but not limited to, application server(s) 108b, web server(s) 108a, and/or database(s) 115, and 113, respectively, as well as other client or other server devices (not shown), local and/or remote from the depicted exemplary devices, etc. Exemplary client devices 102 are depicted downstream over an exemplary network(s) 104 from the server devices, but could easily be elsewhere in the network topology, e.g., inside, or outside a firewall. It is also important to note that network 104 is represented in cloud metaphor schematic, but various well known network devices including various well-known star-based, bus-based, or other well known network topologies may also be represented by exemplary network(s) 104.

A user interacting with a browser on workstation 102a can access the exemplary backend fare analytic engine database and/or query and response application service provider system and/or distributed network environment's database management system 108, in an exemplary embodiment by traversing several intervening networks using well known communications protocols such as, e.g., but not limited to, transmission control protocol/internet protocol (TCP/IP). Specifically, in an exemplary embodiment, the workstation 102a can be coupled via exemplary network(s) 104 including, e.g., but not limited to, a public and/or private network, and/or the global Internet to any of various exemplary website system(s), in this exemplary case, web server(s) 108a, and/or application server(s) 108b (collectively 108), which may include any of various hosting systems such as, e.g., but not limited to, a domain system, a domain name server (DNS), a domain controller system, etc. Website or webserver system 108a in an exemplary embodiment can be, e.g., but not limited to, the Fare Analytic Engine System Service Provider website available from Airline Tariff Publishing Company (www.atpco.net) of Dulles, Va. USA. The website system 110 can include, in an exemplary embodiment, an exemplary firewall 106 coupled to, or in addition to, or integrated with, a load balancer 106a, 106b (which could alternatively run on a general purpose computer such as, e.g., web server 108a, application server 108b, etc. Load balancer 106 can be coupled to an exemplary web server 108a, and application server 108b. Web servers 108a, can be mesh coupled to one or more application servers 108b, via hardware and/or software system solutions, according to an exemplary embodiment, or via another network 104 (not shown). Each server 108, may include, e.g., but not limited to, or be coupled to, one or more database(s) 113, 115. Web server(s) 108a, and application servers 108b in an exemplary embodiment, can perform load balancing functions by transferring user application requests/queries to one or more of the application servers 108b. Queries from workstations 102 over an exemplary browser may be routed via web server 108a to application server 108b to traverse the database 115, and results of the exemplary requests/queries from traversing database 115 can be transferred from application servers 108b through web servers 108a through the network 104 back to workstation 102.

The portal application program and/or links to the portal, may be integrated and/or embedded into other well known collaborative applications, and/or apps, and/or social networking environments or applications such as, e.g., but not limited to, Facebook, LinkedIn, LotusLive, Microsoft Exchange/Sharepoint, GoogleTalk, GoogleVoice, Skype, Facetime, Google+, and/or video teleconferencing, Voxeo, SalesForce.com, CRM systems, etc., and/or other network environments, social media environments, communications environments, and/or collaborative environments.

Any illustration of exemplary fixed images, and/or exemplary arrangements of the exemplary browser and/or query portal included herein are merely exemplary, but nonlimiting, as video means, audio means (e.g., by voice recognition), and/or a combination of audio/video streams and/or other content may also be used to enable efficient user interaction, according to various exemplary embodiments.

Exemplary Graph Database Overview

A graph database uses graph structures with nodes, edges, and properties to represent and store data. By definition, a graph database is any storage system that provides index-free adjacency. This means that every element contains a direct pointer to its adjacent element and no index lookups are necessary. An example graph database that may be used in implementing various embodiments of the present invention may include Neo4j (www.neo4j.org), available from Neo Technology, Inc., of 111 E 5th Avenue, San Mateo, Calif. 94401, USA, a graph database originally designed in Sweden, and is used by many companies to implement complex graph databases including, e.g., but not limited to, Mozilla and Cisco, etc.

Graph databases are based on graph theory. Graph databases employ nodes, properties, and edges. Nodes are somewhat similar in nature to objects in object-oriented programming.

Nodes may represent entities one may wish to track such as, e.g., but not limited to, people, businesses, accounts, or in the case of travel, origins and destinations.

Properties are pertinent information that relate to nodes and/or relationships.

Edges are lines that connect nodes to nodes, or nodes to properties. Edges represent the relationship between two nodes or nodes and properties. Important information is stored in the edges. Meaningful patterns emerge when one examines connections and interconnections of nodes, properties, and edges (relationships).

A graph database may be used for data structured as a graph. Graph databases may take on an be named by their a shape or logical topologies. Various named graphs may include, e.g., but not limited to, a diamond, a butterfly, a star, a bull, a franklin, a robertson, a horton, and/or a hal-janko, etc., among other shaped graph databases.

Graph databases have various advantages over relational database management systems (RDBMSs) and are especially useful for complex, highly connected data. For example, unlike an RDBMS, the entire data set size does not affect query time of a graph database. You query a graph database by traversing the graph. An example graph query language is Cypher available from Neo4j, which provides a pattern-matching query language, allows for declarative grammar with clauses (like SQL), permits aggregation, ordering, limits, and allows creating, reading, updating and deleting aspects of the graph database.

Examples of various exemplary graph databases may include, e.g., but not limited to, Neo4j, AllegroGraph, ArangoDB, Bigdata, BrightstarDB, DEX (available from Sparsity Technologies), Filament, GraphBase (available from FactNexus), Graphd (available from Freebase), Horton (available from Microsoft Corporation), HyperGraphDB, InfiniteGraph, InfoGrid, jCoreDB Graph, OpenLink Virtuoso, Oracle Spatial and Graph (available from Oracle Corporation), OrientDB, OQGraph, R2DF, ROIS, sones GraphDB (funded by Deutsche Telekom), Titan (developed by Aurelius), and VertexB, etc. Various distributed graph processing offerings exist from various well known software vendors. Various application programming interfaces (APIs) are available such as, e.g., but not limited to, Blueprints available from TinkerPop, etc., and various graph query/programming languages are also available from various vendors including e.g., but not limited to, Cypher available from Neo4j, Pacer, Pipes, etc.

Exemplary Embedded Graph Database Architecture

Figure 1E:
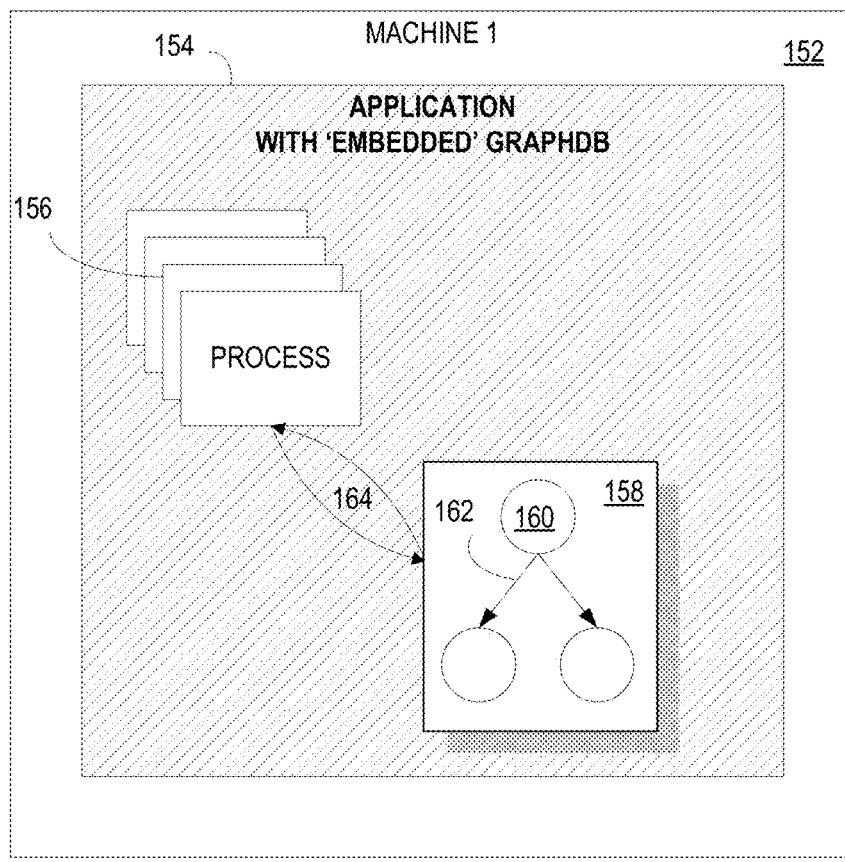
FIG. 1E depicts an exemplary embedded embodiment of an exemplary graph database system illustrating an exemplary graph database architecture as may be used in an fare analytic engine database and/or query and response application service provider system, according to one exemplary embodiment.

FIG. 1E depicts an exemplary diagram 150 illustrating an exemplary embedded embodiment of an exemplary graph database system illustrating an exemplary graph database architecture as may be used in an fare analytic engine database and/or query and response application service provider system, according to one exemplary embodiment.

In an exemplary embodiment, an exemplary machine 1 152 may include an exemplary application 154 with an exemplary embedded graph database (graphdb) 158 which may include, e.g., but not limited to, one or more processes 156 for querying or traversing 164 a graph 158 which may include, e.g., but not limited to, a plurality of nodes (circles) 160, and relationships (arrows) 162, and properties associated with both the nodes and relationships (not labeled). According to one exemplary embodiment, the database may be embedded as part of a java virtual machine (jvm).

Exemplary Server Graph Database Architecture

Figure 1F:
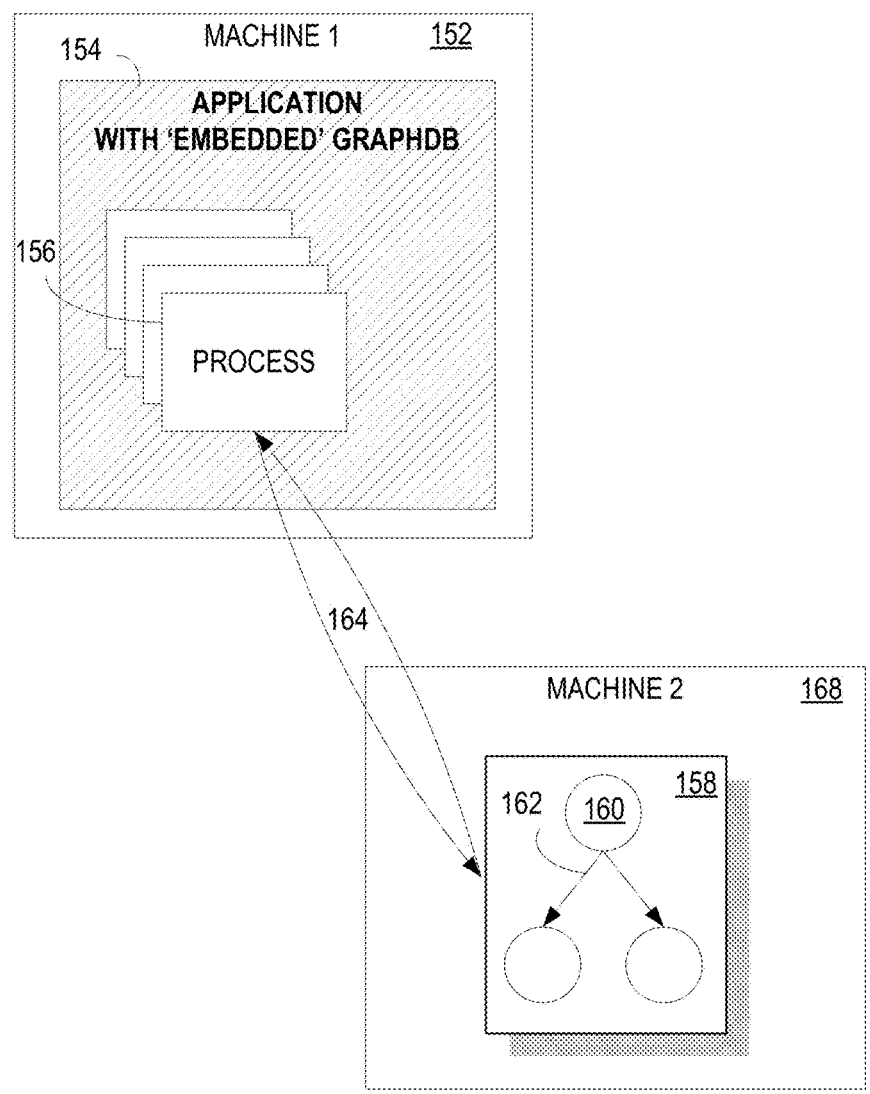
FIG. 1F depicts an exemplary server embodiment of an exemplary graph database architecture including an exemplary embedded graph database system being accessed by another exemplary system illustrating another exemplary graph database architecture as may be used in an fare analytic engine database and/or query and response application service provider system, according to one exemplary embodiment.

FIG. 1F depicts an exemplary diagram 166 illustrating an exemplary server embodiment of an exemplary graph database architecture including an exemplary embedded graph database system being accessed by another exemplary system illustrating another exemplary graph database architecture as may be used in an fare analytic engine database and/or query and response application service provider system, according to one exemplary embodiment.

In an exemplary embodiment, an exemplary machine 1 152 may include an exemplary application with an exemplary embedded graph database (graphdb) which may include, e.g., but not limited to, one or more processes for querying or traversing a graph. According to an exemplary embodiment, access to the exemplary graph database may be provided on a second machine 2 168. The exemplary graph database 158 may include, e.g., but not limited to, a plurality of nodes (circles) 160, and relationships (arrows) 162, and properties associated with both the nodes and relationships (not labeled). According to one exemplary embodiment, the database may be embedded as part of a java virtual machine (jvm).

Exemplary Clustered Graph Database Architecture

Figure 1G:
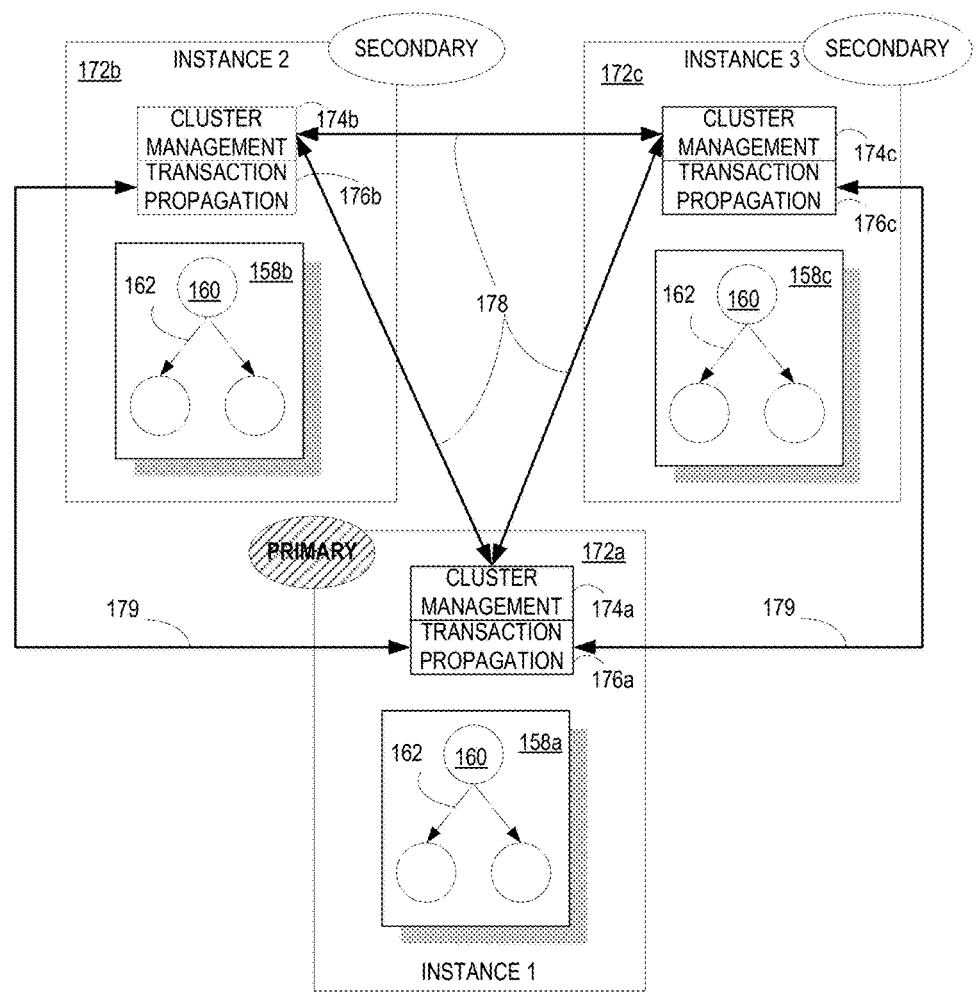
FIG. 1G depicts an exemplary clustered embodiment of an exemplary graph database architecture including an exemplary clustered graph database system (parent, master, mother and/or primary, etc., system) being accessed by other exemplary graph database systems (child, slave, daughter, or secondary, etc., systems) including exemplary cluster management components and exemplary transaction propagation components illustrating another exemplary graph database architecture as may be used in an fare analytic engine database and/or query and response application service provider system, according to one exemplary embodiment.

FIG. 1G depicts an exemplary diagram 170 illustrating an exemplary clustered embodiment of an exemplary graph database architecture including an exemplary clustered primary graph database system 158a (parent, master, and/or mother, etc. system) being accessed or clustered 178 with and by exemplary secondary graph database systems 158b, 158c (child, slave, and/or daughter, etc., systems) including exemplary cluster management components 174a, 174b, 174c (collectively 174) and exemplary transaction propagation components 176a, 176b, 176c (collectively 176) illustrating another exemplary graph database architecture as may be used in an fare analytic engine database and/or query and response application service provider system, according to one exemplary embodiment. Transaction propagation is represented by arrows 179 between transaction propagation components 176. See for example, http://docs.neo4j.org/chunked/milestone/ha-architecture.html.

In an exemplary embodiment, an exemplary cluster may include an exemplary primary instance 1 172a which may also be referred to as, a parent, master, and/or mother instance, and one or more secondary instances 2, 3, which may be a child, slave, or daughter, instance to the first instance 1. As illustrated, each instance 172 of the exemplary clustered database 158 may further include cluster management components, which may be used to manage the plurality of instances 172. As further illustrated, the exemplary clustered database 158 may further include transaction propagation components 176a, which may be used to assist in propagating transactions during, e.g., but not limited to, traversal by a query of the graph across a plurality of instances, according to an exemplary embodiment. The clustered graph database instances 172 may include, e.g., but not limited to, one or more processes for querying or traversing a graph 158. The exemplary graph database may include, e.g., but not limited to, a plurality of nodes (circles) 160, and relationships (arrows) 162, and properties (not labeled) associated with both the nodes and relationships. According to one exemplary embodiment, the database may be embedded as part of a java virtual machine (jvm).

Exemplary Embedded Clustered Graph Database Architecture

Figure 1H:
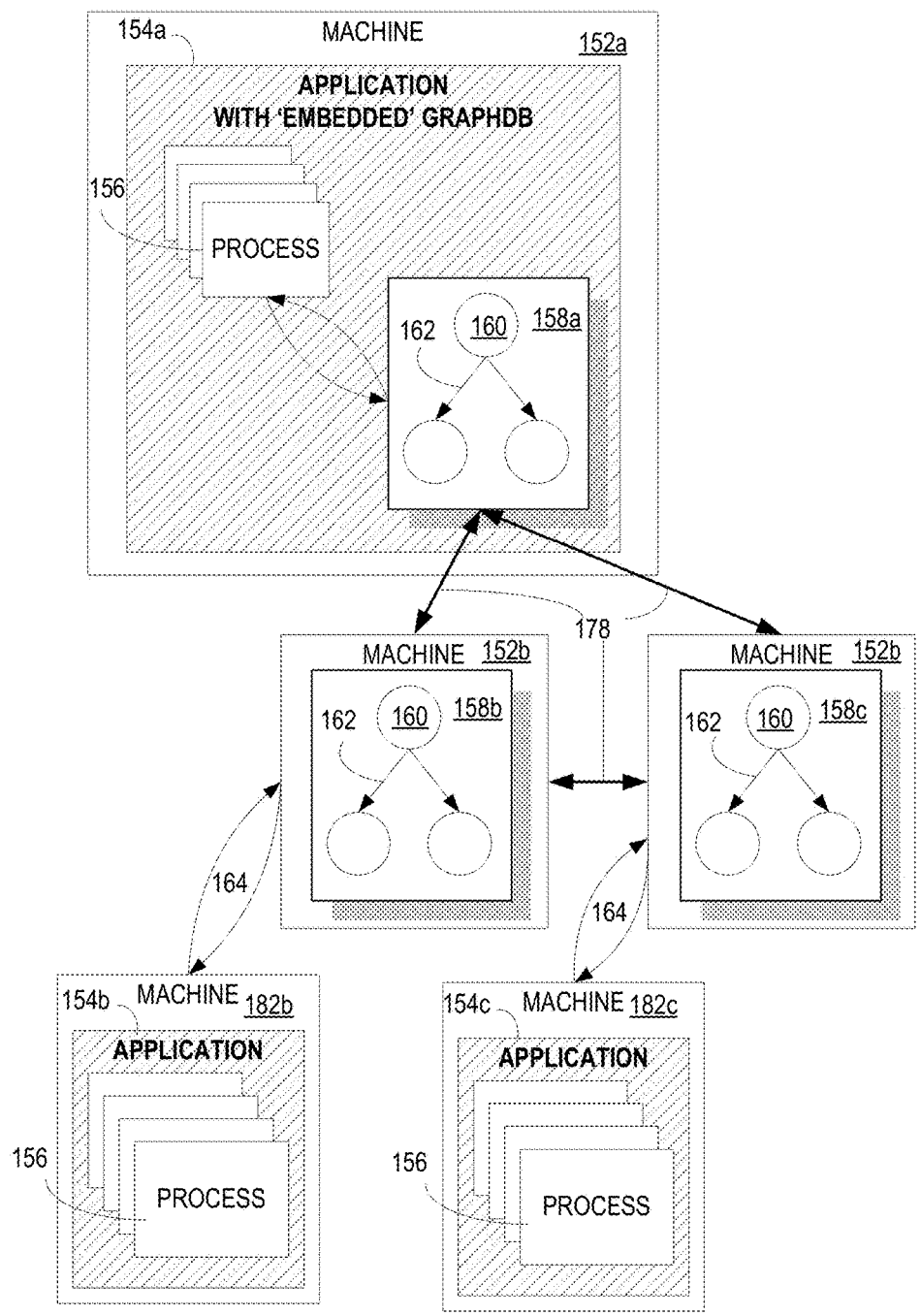
FIG. 1H depicts an exemplary embedded clustered embodiment of an exemplary graph database architecture including an exemplary embedded clustered graph database system (parent, master, mother and/or primary, etc., system) being accessed by other exemplary graph database systems (child, slave, daughter, or secondary, etc., systems) including exemplary cluster management components and exemplary transaction propagation components illustrating another exemplary graph database architecture as may be used in an fare analytic engine database and/or query and response application service provider system, according to one exemplary embodiment.

FIG. 1H depicts an exemplary diagram 180 illustrating an exemplary embedded clustered embodiment of an exemplary graph database architecture including an exemplary embedded first clustered graph database system 152a being accessed by exemplary second graph database systems including clustering functionality 178 illustrating another exemplary graph database architecture as may be used in an fare analytic engine database and/or query and response application service provider system, according to one exemplary embodiment.

In an exemplary embodiment, an exemplary embedded clustered embodiment may include an exemplary plurality of clustered machine 152a, 152b, 152c, wherein each clustered machine 152a, 152b, 152c, may be accessed by an exemplary application 154a, 154b, 154c with processes 156, to access 164 embedded cluster graph database 158a, 158b, 158c. The plurality of exemplary processes 156 are adapted for querying or traversing 164 the embedded clustered database, in an exemplary embodiment. Various other machines 182b, 182c, as shown may each include one or more applications 154b, 154c with one or more processes 156b, 156c, which may interact with the clustered database 158b, 158c to allow such other machines 182b, 182c to traverse 164 the embedded clustered database 158, in an exemplary embodiment. The exemplary embedded clustered database may further include cluster management components (not shown), which may be used to manage the plurality of machines, in an exemplary embodiment. The exemplary clustered database may further include transaction propagation components (not shown), which may be used to assist in propagating transactions during, e.g., but not limited to, traversal by a query of the graph across a plurality of instances, according to an exemplary embodiment. The embedded clustered graph databases may include, e.g., but not limited to, one or more processes for querying or traversing a graph. The exemplary graph database may include, e.g., but not limited to, a plurality of nodes (circles) 160, and relationships (arrows) 162, and properties associated with both the nodes and relationships. According to one exemplary embodiment, the database may be embedded as part of a JAVA virtual machine (JVM).

Functional Programming

In computer science, functional programming is a programming paradigm that treats computation as the evaluation of mathematical functions and avoids state and mutable data. Functional programming emphasizes application of functions, in contrast to the imperative programming style, which emphasizes changes in state. Functional programming has roots in lambda calculus, a formal system developed in the 1930s to investigate computability, the Entscheidungs problem, function definition, function application, and recursion. Many functional programming languages can be viewed as elaborations on the lambda calculus.

In practice, the difference between a mathematical function and the notion of a function used in imperative programming is that imperative functions can have side effects that may change the value of program state. Because of this, functions lack referential transparency, i.e. the same language expression can result in different values at different times depending on the state of the executing program. Conversely, in functional code, the output value of a function depends only on the arguments that are input to the function, so calling a function f twice with the same value for an argument x will produce the same result f(x) both times. Eliminating side effects can make it much easier to understand and predict the behavior of a program, which is one of the key motivations for the development of functional programming.

Functional programming is a style of programming which models computations as the evaluation of expressions. In functional programming, programs are executed by evaluating expressions, in contrast with imperative programming where programs are composed of statements which change global state when executed. Functional programming typically avoids using mutable state. Functional programming generally may require that functions be first-class, which means that the functions are treated like any other values and can be passed as arguments to other functions or may be returned as a result of a function, according to an exemplary embodiment. Being first-class also may mean that it may be possible to define and manipulate functions from within other functions, according to an exemplary embodiment. Special attention may need to be given to functions that reference local variables from their scope, according to an exemplary embodiment. If such a function may escape its block after being returned from it, the local variables must be retained in memory, as they might be needed later when the function is called, according to an exemplary embodiment. Often it is difficult to determine statically when those resources can be released, so it may be necessary to use automatic memory management, according to an exemplary embodiment.

Recursion may be heavily used in functional programming as it is the canonical and may often be the only way to iterate. Functional language implementations may often include tail call optimization to ensure heavy recursion does not consume excessive memory.

Various examples of benefits of functional programming, according to an exemplary embodiment may include, e.g., but are not limited to, functional programming (rather than imperative programming) has been known to provide better support for structured programming. To make a program structured it may be necessary to develop abstractions and split the program into components which may interface to one other with those abstractions. Functional languages may aid in enabling interface of components by making it easy to create clean and simple abstractions. Functional programming makes easy abstracting out a recurring piece of code by creating a higher-order function, which may make the resulting code more declarative and comprehensible.

Functional programs may further, often be shorter and easier to understand than imperative program counterparts. Since various studies have shown that the average programmer's productivity in terms of writing lines of code is more or less the same for any programming language, this may translate to higher productivity of developers, and the processes of debugging and maintenance.

Functional programming languages, especially purely functional ones such as, e.g., but not limited to, Hope, have largely been emphasized first in academia. Prominent functional programming languages such as, e.g., but not limited to, Common Lisp, Scheme, ISLISP, Clojure, Racket, Erlang, OCaml, Haskell, Scala and F# have been used in industrial and commercial applications by a wide variety of organizations. Functional programming is also supported in some domain-specific programming languages like R (statistics), Mathematica (symbolic and numeric math), J, K and Q from Kx Systems (financial analysis), XQuery/XSLT (XML) and Opal. Widespread domain-specific declarative languages like SQL and Lex/Yacc use some elements of functional programming.

Exemplary Pricing Engine Overview

Figure 2:
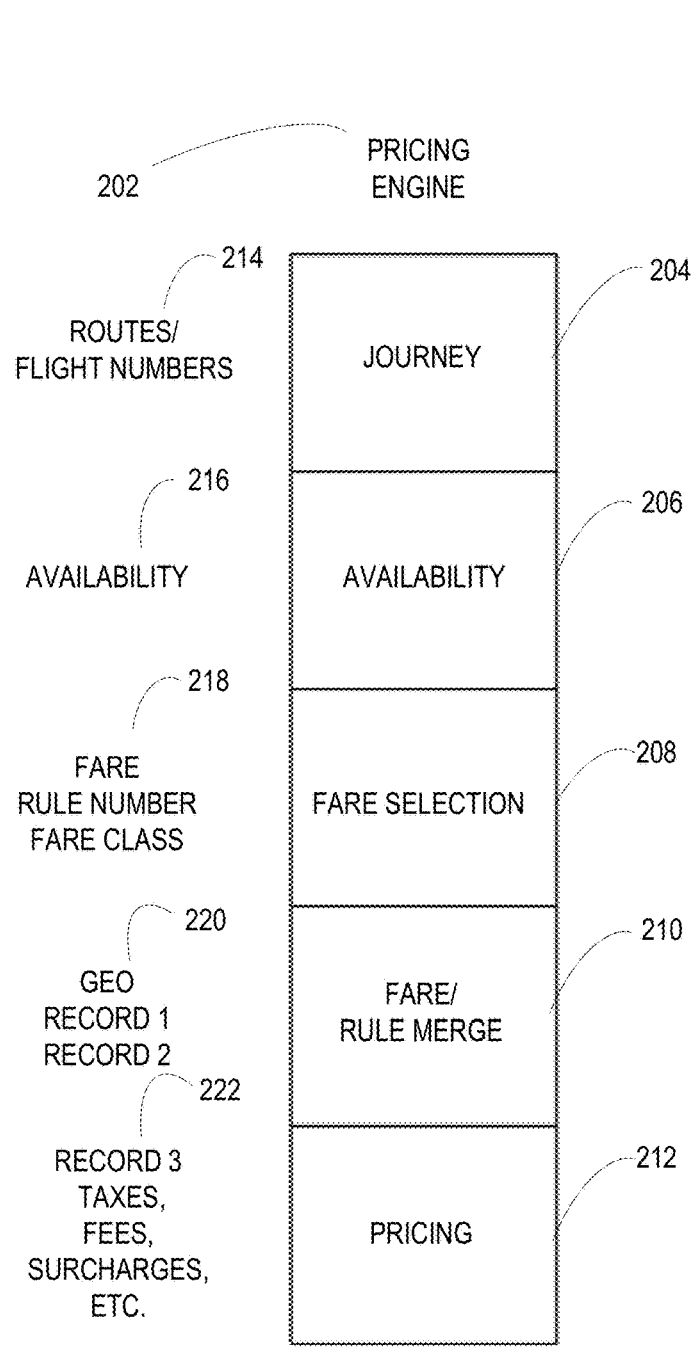
FIG. 2 depicts an exemplary embodiment of an exemplary pricing engine application system architecture, according to one exemplary embodiment.

FIG. 2 depicts an exemplary embodiment of an exemplary pricing engine application system architecture, according to one exemplary embodiment. FIG. 2 depicts an exemplary embodiment of a diagram 200 illustrating an exemplary pricing engine architecture, according to an exemplary embodiment.

A pricing engine is a powerful search and calculation tool which may process fares and fare related data (e.g., associated rules and ancillary data) to return accurate pricing results in response to pricing queries in real-time.

FIG. 2 depicts in diagram 200 an exemplary pricing engine pricing complex 202, which represents an exemplary, but nonlimiting example serial process complex, which may execute a series of transactions from top to bottom to obtain an exemplary priced order for, e.g., but not limited to, a complex travel fares such as, e.g., but not limited to, a passenger fare; an air passenger fare; a commercial air passenger fare; a private air passenger fare; a space travel passenger fare; a cruiseline passenger fare; a rail passenger fare; a bus fare; a hovercraft fare; a transportation fare; a cargo fare; a commercial air cargo fare; a private air cargo fare; a space travel cargo fare; a space travel fare; a cruising cargo fare; a rail cargo fare; a transportation fare; or a manned or unmanned fare. The example serial process complex of the pricing engine 202 can be tweaked in various ways to expedite answers, according to various exemplary embodiments, using caching, high speed access databases, algorithms, and hardware and software technologies, according to exemplary embodiments.

In an exemplary embodiment, the exemplary pricing engine 202 may include an exemplary journey server 204, which may be fed with flight schedule information, e.g., flight numbers, flight times, arrival terminals, a travel itinerary from a travel planning system, or the like.

In 204, the exemplary journey server may use the origination (O) and destination (D) information to identify various permutations of physical flights between the O and D. The business logic in the journey server 204 component responsibility may include, when in receipt of an itinerary, from a departure location (origin) to an arrival location (destination), determining all the permutations and combinations of ways to take the passenger or cargo from the departure location to the arrival location. Permutations of paths or journeys determined or identified may include e.g., but not limited to, physical flights, direct, nonstop, connecting flights, and for connecting flights, connection times (traversing between terminals, etc.), and arrival and departure times, minimums, maximums, e.g., you can't expect a passenger to connect at an airport greater than 4 hours or is considered a stop over rather than a connection. Thus, the output of journey 204 is a set of physical flights and connections to get a person from location A to location B. In 204, a set of routes and flight numbers for the physical flights and/or connections between the origin and destination are prepared, provided, and/or outputted. From 204, pricing engine 202 may continue with 206, which is provided a set of physical flights from the O to the D by the journey server 204.

In 206, each physical flight provided by the journey server 204 may be reviewed by an availability component or server 206, which may receive the set of physical flights and connections and may review availability of the various fare booking classes or "buckets." For example, each flight has a plurality of booking classes, such as, e.g., but not limited to, first class, business, economy, premium economy, leisure, etc. Some buckets are physical characteristics, e.g., limited number of seats (e.g., first class, or business, etc.), or others may have to do with similar physical seats that may be broken into differently priced classes of tickets (e.g., not all economy may be priced the same, some may be heavily discounted for leisure travel, but may have many restrictions such as, e.g., advance booking, restrictions against changing the booking, etc.) For example, a flight could even, e.g., but not limited to, 6, 7, 8 or more booking classes even within economy for, e.g., leisure travelers, advanced ticket, over weekend, blackouts, and other restricted booking classes, etc. For every flight in the set of physical flights coming out of journey 204, availability of buckets must be determined to figure out if there are available seats or tickets of the booking class/bucket on the flight, and these "availability buckets" (also known as reservation booking designators (RBDs)) are, or collectively may be referred to as, availability 216, may then be provided to the fare selection 208 of the pricing engine. Availability may be determined in a variety of ways, which may include, e.g., but not limited to, real time messaging to an airline host system, (e.g., an airline inventory control system), one may make use of a caching capability (which may be refreshed periodically, etc.), perform an availability calculator (whereby an airline shares its algorithm with an entity to determine whether the airline will give up a seat for a given price, or request).

In 208, fare selection 208 may receive the availability 216 and may receive what types of fares are available on the flights and may then go through ATPCO.net fare data to determine what fares are available for that particular bucket. An airline may have a number of fares for trips across the country, and the fares are not necessarily related to the physical flights. The airline may have a fare, but may include various restrictions. For example, one may begin with a flight from location A to location B (e.g., Washington D.C. to Los Angeles, Calif.) with an open ended fare, and the fare may have a number of restrictions (e.g., only good for flight originating from a certain airport, e.g., Dulles only, or the flight is only good if it has a single connection, or 2 connections, etc.). Thus fare selection 208 allows making a selection of a base fare that are applicable for a given journey, but may not necessarily be related to the journey component, if you came up with a connection. Some fares between A and B may allow you to have connections and the fare may go through other connection locations (C). Other fares may not permit connections, and multiple fares could be combined to get from location A to location B, e.g., one fare from A to C, and a second fare from C to B, and may assemble the fares together. Thus, fare selection 208 may involve assembling one or more fares and may determine matches to identify fares for the available flights for which the querying traveler's inputted data meets the fare restriction rules. For example, one purchaser might want a nonstop flight, and the system would have to find fares that meet that requirement. A fare may have restrictions and may only be available with no connections, other fares might permit one or more connections. The fare selection 208 uses the fare, rule number and fare class and may provide the fare, rule number and fare class to fare/rule merge 210 of the exemplary pricing engine 202.

In Fare/Rule Merge 210, this component is the process by which the system may take the base fare, and may merge it with an appropriate set of restrictions. Historically, fare restriction data was reused via a scheme/process. Fare/Rule Merge 210 of the pricing engine may receive a fare from fare selection and may check whether the requirements of the itinerary of the purchaser fit the restrictions of a given fare by merging the fare with its applicable list of restrictions and checking for matches, on this particular date of purchase, for a particular date of departure travel, and for a particular date of return travel. The system may get a list of restrictions, and the system may interrogate the list of restrictions to make sure that the fare selected is in fact applicable to the particular itinerary, and if it passes the test then that particular fare may be provided in response to a given itinerary fare query. The restrictions could be based on e.g., but not limited to, geography, dates, other restrictions, etc. Other restrictions are provided in FIG. 4A below. The fares and the rules are merged together by determining whether the restrictions are met and then may provide the fares that meet the exemplary sequences or segments of restrictions, in response to the query. In one exemplary embodiment, a sequence or segment may be geography based, etc. The applications do not repeat information since the legacy programs were developed during a time, when computer resources were much more constrained, and much of the restriction data was therefore, historically reused, rather than repeated. In the exemplary fare/rule merge 210 the geography, and record 1 and record 2 220 (discussed further with reference to FIG. 4B, below) may be reviewed to derive a rule number based on geography, dates, and based on all of the various robust categories of restrictions, including, e.g., but not limited to, stopovers, parent/child, if flying out of a particular airport, or arriving at a different airport, etc. The fare/rule merge may interrogate the fare to discern if the itinerary query qualifies for/meets all the restrictions, such as, e.g., but not limited to, a 7 day advance purchase, or stay over Saturday. ATPCO and the airlines together use a system that reuses the sequence of the restriction, to avoid repeating restrictions. From fare/rule merger 210, the pricing engine 202 may provide merged fare and rule to pricing 212.

In pricing 212, this portion or component of the pricing engine 202 may come up with a final price for a flight. The pricing 212 may take and add all the additional fees, such as, e.g., but not limited to, exemplary additional costs 222, which may include, e.g., adding taxes, fees, surcharges, etc., related to the flight itinerary, including any local taxes based on the departure, stopover/connections, and destination locations, passenger facility charges, fees associated with the airports, etc., any surcharges which may be dependent on stopovers, etc. After 212, the pricing engine may produce, store, and/or output a final priced fare offering. At this point the information may be used for various applications, including, e.g., but not limited to, providing to sell a ticket, In 212, record 3 222 may be reviewed, including, e.g., but not limited to, the so-called footnotes and record 3 of FIG. 4B. By adding any additional surcharges and ancillary charges, currency rate conversions, taxes, etc., to the fare, a final priced itinerary is then ready to be purchased once complete. The exemplary pricing engine process may vary, and is often tweaked from time to time, and need not be performed as a serial process, although as described herein, an exemplary embodiment, the process is described as a serial one.

Exemplary Fare Analytic Engine Overview

Figure 3:
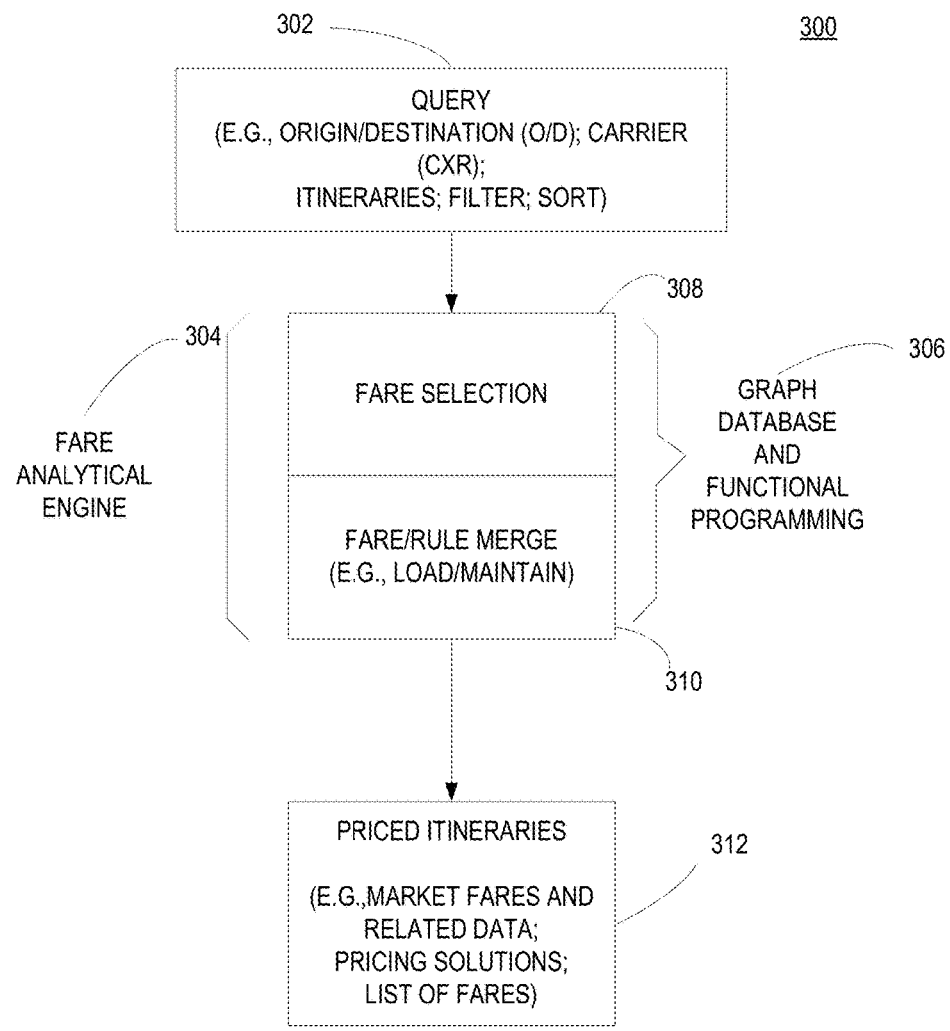
FIG. 3 depicts an exemplary embodiment of an exemplary fare analytic engine application system architecture.

FIG. 3 depicts diagram 300 of an exemplary embodiment of an exemplary fare analytic engine application system architecture 300. Various exemplary situations may be used such as, e.g, but not limited to, a shopping or travel request. In that exemplary situation, an itinerary may be provided, including various parameters, an airline, a cabin, dates, perhaps with some flexibility, plus one knows the date at which the, booking cabin classes, etc. In 302, an example query may be provided which may include, e.g., but not limited to, an origin/destination (O/D), a carrier (CXR), itineraries, filters, sorts). The itinerary may provide, e.g., preferences such as 1 stop, 2 stop, nonstop, etc., a particular airline, a return date, a specific time for departure or arrival, the date of travel, the current date of when the reservation is being booked, any frequent flier status, cabin preferences such as, e.g., first class, business, economy, etc., to the fare analytical engine 304. The fare analytical engine 304, according to an exemplary embodiment, may include fare selection 308 and fare/rule merge of 310. The fare analytical engine 304 may select fares, and may do so by looking at the market that is involved, determining if the fare is effective on that date, and may use the fare data and may use the fare class (may have hints to just pull the first class fares or economy fares), and gathers a long list of all the possible fares, and then in fare/rule merge 310 it applies the restriction data (e.g., min stays such as, staying a minimum number of days stay, or a stay over a weekend, advance purchase, etc.) and may determine by going through all the restrictions and compares the input request, and throws out fares that do not meet given restrictions. The fare analytical engine may receive reservation booking designators (RBDs) also known as the "availability buckets." This means fare selection 308 may receive an itinerary with physical flights and availability already determined, and then may determine the fares and applies (merges) the restrictions to the fares to provide a list of possible flights meeting the restrictions to 312. In one embodiment, the fare/rule merge 310 may also apply taxes and fees to provide priced itineraries 312 as output. The output may be referred to as a priced itinerary 312. According to an exemplary embodiment, the fare analytic engine may expeditiously provide fares that meet the restrictions.

According to one embodiment, the fare analytic engine may include fare selection 308 and fare/rule merge 310 and may implement these functions as a graph database and with functional programming 306 to optimize and provide expeditious delivery of results to a pricing query or request. The exemplary use as described of the exemplary fare graph database and functional programming may optimize the process of providing a response to a pricing request to perform the fare analytic engine function and provide a response to the query, as quickly as possible. The fare analytic engine 304 may take the market and dates and goes through the fare class data, determining the applicable fares, by taking a list of fare tariff information and applying the exemplary fare restrictions such as, e.g., but not limited to, "minimum stay," etc., and may apply the rest of the fare restrictions and may arrive at an optimized list to be provided/stored/output, as quickly as possible.

In another embodiment, the fare analytic engine may provide the possible flights to priced itineraries 312, which may apply the fees and surcharges to the fare to provide the market fares and related data, providing pricing solutions, and a list of fares for providing in response to the original query.

Fare and Fare Related Data—Data Model

FIG. 4A depicts an exemplary fare data and fare related data exemplary data model for an exemplary but not limiting airline passenger fare environment, according to an exemplary embodiment.

FIG. 4A depicts a data model 400 including exemplary fare and fare related data and categories of data. The categories are not intended to be limiting, but are rather provided as examples, such as, e.g., but limited to, exemplary business based data, such as, e.g., but not limited to, fares data, fare restrictions data, routing restrictions data, currency conversion rates data, schedules data, taxes data, facility charges data, geographic information, ancillary charge data including, e.g., but not limited to, branded fares data, carrier imposed fees data, baggage charges data, ticketing fees data, optional service fees data including, e.g., meal, entertainment, seat assignment, etc., and the like, etc.

Exemplary fare data record 412 may be an ATPCO fare record (origin, destination, dates, amounts, carrier, airline involved, trip, roundtrip, and pointers to any restrictions). The pointers may point to a fare class code 416, or a footnote code 414. From the exemplary fareclass code 416, one may derive, based on the fare class code, what may be referred to as a "rule number." The rule number may direct to sequences for all the various categories of restrictions that may or may not apply to the current situation. One may or may not find matching records for restriction categories. The footnotes side is a simplified version of fares, which may be further simplified. The fareclass side is a more robust than the footnote side. Record 3 may represent a data table, which may implement the intention of the company that put the fare in the market. In an exemplary embodiment, each REC 2 420 may point to an exemplary string of approximately 200 REC 3 422 strings. A logical construct of if/then/or may be provided in one or more tables. The bottom of the construct is where the logic is actually implemented. An exemplary fare type may include, e.g., but is not limited to, specified fare data, constructed fare data, fare by rule data, etc. According to an exemplary embodiment, a fare may be constructed according to various methods as discussed below, e.g., with reference to FIG. 4G, for example. FIG. 4H below details an embodiment of an exemplary fare by rule process according to an exemplary embodiment which may in an exemplary embodiment determine whether a calculated or specified fare and may process according to an exemplary embodiment.

Exemplary fares detailed data may include, e.g., but not limited to, one or more of, a market, a travel date, a ticket date, an amount, a carrier, a trip type, a fare class, etc., according to an exemplary embodiment. An exemplary fare may include a base fare data, such as, e.g., but not limited to, one-stop, non-stop, n-stops, carriers such as, e.g., airlines, etc. An exemplary fare may vary by cabin classes such as, e.g., but not limited to, booking class data, i.e., first class, business class, economy class, leisure class, advanced purchase, etc., etc.

Exemplary fare related data may include, e.g., but not limited to, fare restriction rule(s) data, footnote(s) data, routing restriction data, tax(es) data, currency conversion rate(s) data, geographic information data, ancillary charge(s) data, etc.

Fare and Fare Related Data—Graph Database Data Model

Figure 4B:
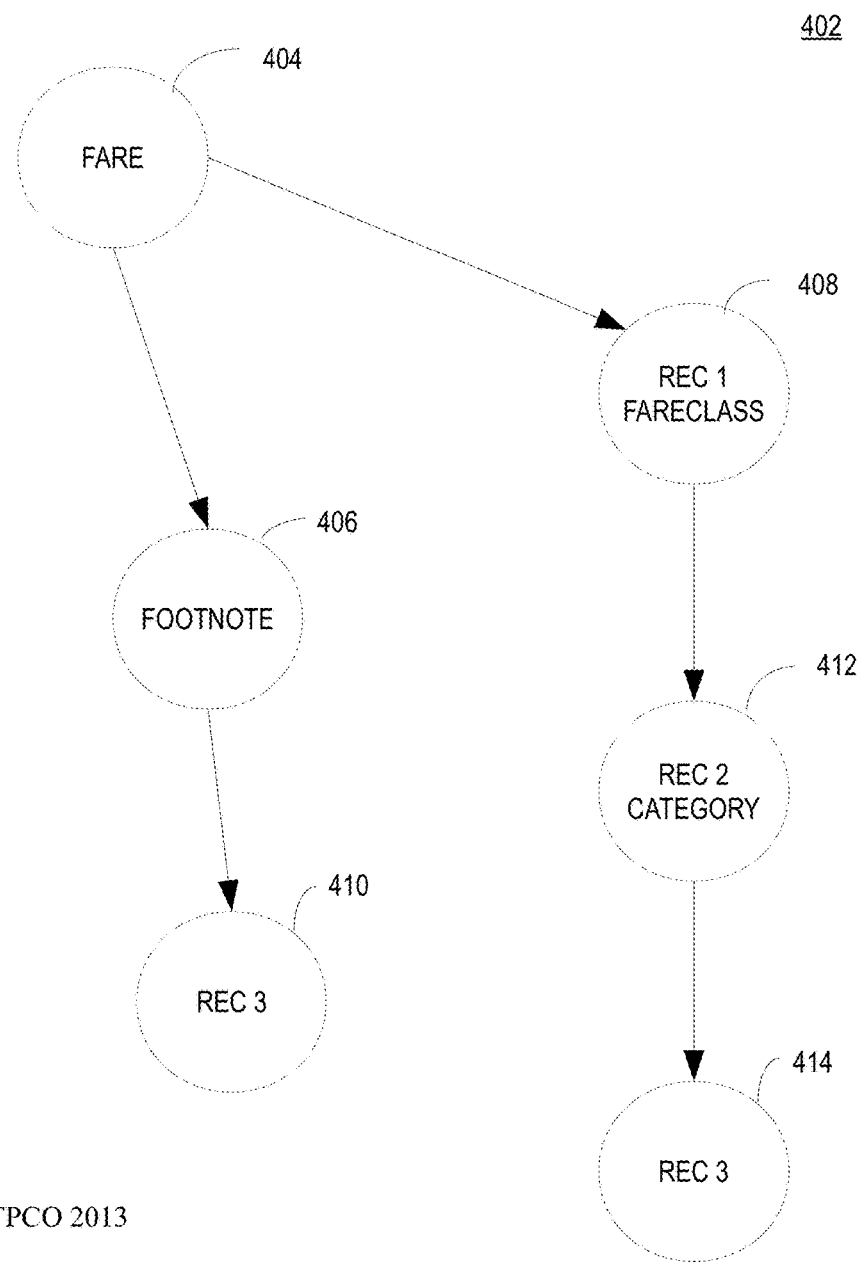
FIG. 4B depicts an exemplary fare data and fare related data exemplary graph database data model for an exemplary but not limiting airline passenger fare environment, according to an exemplary embodiment.

FIG. 4B depicts an exemplary diagram 402 illustrating an exemplary fare data and fare related data exemplary graph database data model for an exemplary, but not limiting, airline passenger fare environment, according to an exemplary embodiment.

FIG. 4B illustrates an exemplary graph database data model including a fare 404, which may represent, in an exemplary embodiment, an ATPCO fare record including fare and price with origin, destination, carrier (airline), trip type (oneway, roundtrip) and pointers to 406 and 408, according to an exemplary embodiment.

The footnote 406 side may include a simplified version of automated restrictions based on dates and other data, according to an exemplary embodiment. The footnote 406 may use record 3 (REC 3) 410 to arrive at a result in response to a fare query, according to an exemplary embodiment.

The rules side record 1 (REC 1) fareclass 408, according to an exemplary embodiment, may derive a rule number based on the fareclass code, and the rule number may point to different sequences based on, e.g., but not limited to, geography, dates, and/or various other categories such as, e.g., but not limited to, flight application, stop overs, various categories of restrictions, etc. From record 1 (REC 1) fareclass 408, record 2 (REC 2) category 412 may be derived, and then record 3 (REC 3) 414 data table restrictions may be derived, according to an exemplary embodiment.

Exemplary Fare Graph Database Construction

Figure 4C:
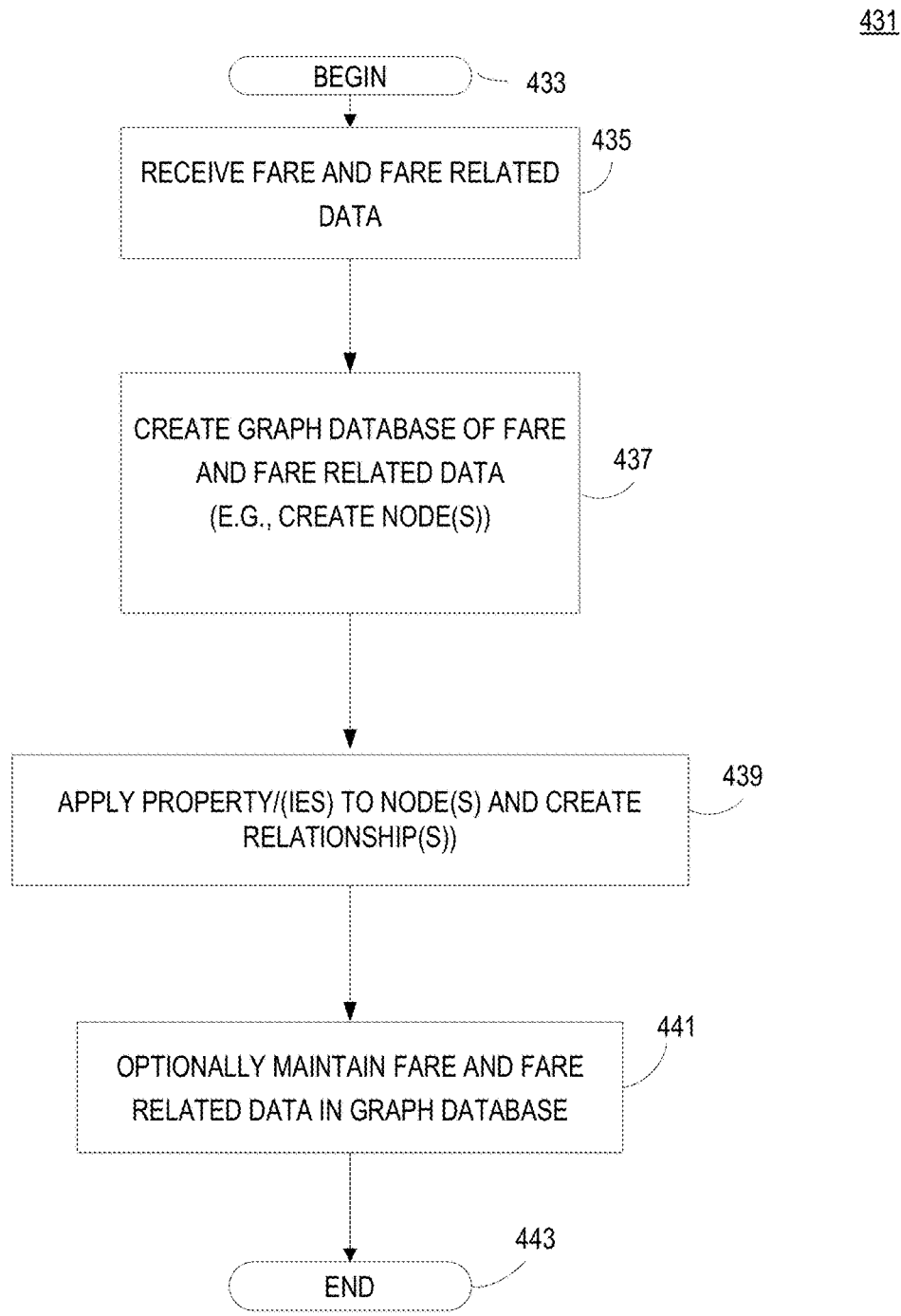
FIG. 4C depicts an exemplary high level process flow diagram of an exemplary system, method and/or computer program product illustrating an exemplary process of generating an exemplary fare analytic database, according to an exemplary embodiment.

FIG. 4C depicts an exemplary high level process flow diagram 431 of an exemplary system, method and/or computer program product of an exemplary embodiment. The flow diagram 431 may begin with 433 and may continue immediately with 435, according to an exemplary embodiment.

In 435, flow diagram 431 may receive fare and fare related data, according to an exemplary embodiment. From 436, flow diagram 431 may continue with 437, according to an exemplary embodiment.

In 437, flow diagram 431 may create a graph database of fare and fare related data including, e.g., but not limited to, creating one or more nodes, creating one or more relationships, and applying one or more properties to the nodes and relationships, according to an exemplary embodiment. From 437, flow diagram 431 may continue with 439, according to an exemplary embodiment.

In 439, one or more property or properties may be applied to one or more nodes and relationships may be created, and alternatively, properties may be applied to relationships, according to an exemplary embodiment. From 439, flow diagram 431 may continue with 441, according to an exemplary embodiment.

In 441, flow diagram 431 may optionally maintain fare and fare related data in the graph database, according to an exemplary embodiment. From 441, flow diagram 431 may continue with 443.

In 443, according to an exemplary embodiment, flow diagram 431 may immediately end, according to an exemplary embodiment.

Figure 4D:
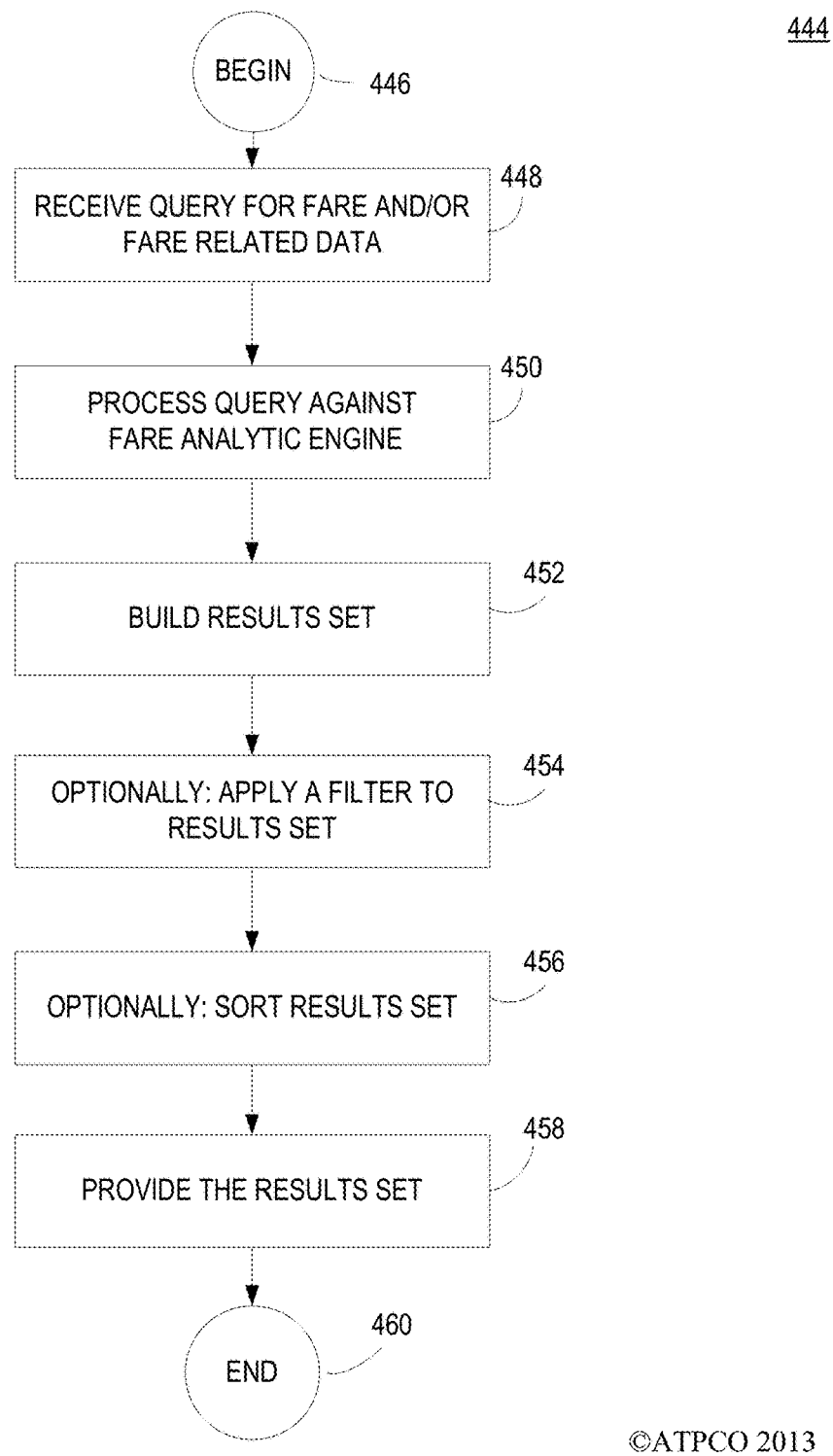
FIG. 4D depicts an exemplary high level process flow diagram of an exemplary system, method and/or computer program product illustrating an exemplary process of processing an exemplary fare analytical engine query using an exemplary fare analytic database, according to an exemplary embodiment.

FIG. 4D depicts an exemplary high level process flow diagram 444 of an exemplary system, method and/or computer program product illustrating an exemplary process flow of processing an exemplary fare analytical engine query using an exemplary fare analytic database, as described further herein, according to an exemplary embodiment. The flow diagram 444 may begin with 446 and may continue immediately with 448, according to an exemplary embodiment.

In 448, flow diagram 444 may receive a query for a fare and/or fare related data, according to an exemplary embodiment. According to an exemplary embodiment, the fare and/or fare related data may reside in an exemplary fare analytic graph database, and may be queried using any of various well known query tools, such as, e.g., but not limited to, a graph database query tool such as, e.g., but not limited to, Cypher, available from Neo4J. From 448, flow diagram 444 may continue with 450, according to an exemplary embodiment.

In 450, flow diagram 444 may process the received query against a fare analytic database and/or fare analytic engine, according to an exemplary embodiment. According to an exemplary embodiment, the query may be processed, using any of various well known techniques, by, e.g., but not limited to, traversing the graph database, such traversal may be accomplished, according to an exemplary embodiment by using a query tool such as, e.g., but not limited to, Cypher. From 450, flow diagram 444 may continue with 452, according to an exemplary embodiment.

In 452, flow diagram 444 may begin to build a results set, according to an exemplary embodiment. From 452, flow diagram 444 may continue with 454, according to an exemplary embodiment.

According to an exemplary embodiment, 450 and/or 452, alone or combination, is discussed further below with reference to FIG. 4F as detailing an exemplary embodiment.

In 454, flow diagram 444 may optionally perform further processing such as, e.g., but not limited to, applying a filter to the results set, etc., according to an exemplary embodiment. From 454, flow diagram 444 may continue with 456, according to an exemplary embodiment.

In 456, flow diagram 444 may optionally perform further processing such as, e.g., but not limited to, sorting the results set, etc., according to an exemplary embodiment. From 456, flow diagram 444 may continue with 458, according to an exemplary embodiment.

In 458, flow diagram 444 may optionally perform further processing such as, e.g., but not limited to, providing the results set, etc., according to an exemplary embodiment. For example, the results set may be provided as output, according to one exemplary embodiment. According to another exemplary embodiment, the results set may be returned to the device from which the query was received, etc. According to an exemplary embodiment, the results set may be outputted, and/or stored, according to an exemplary embodiment, or forwarded to another application program, for example. From 458, flow diagram 444 may continue with 460, according to an exemplary embodiment.

In 460, flow diagram 444 may, according to an exemplary embodiment, immediately end.

Figure 4E:
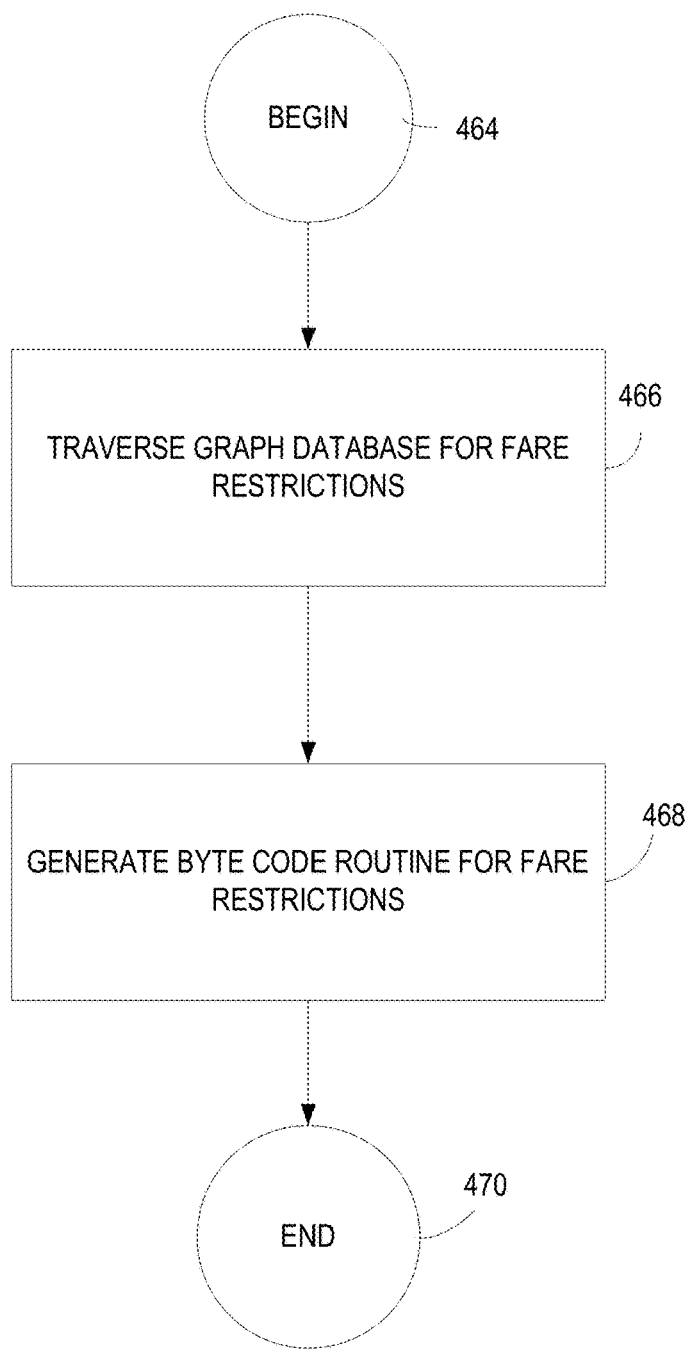
FIG. 4E depicts an exemplary high level process flow diagram of an exemplary system, method and/or computer program product illustrating traversing an exemplary fare analytic graph database to generate exemplary fare restrictions, according to an exemplary embodiment.

FIG. 4E depicts an exemplary high level process flow diagram 462 of an exemplary system, method and/or computer program product illustrating traversing an exemplary fare analytic graph database to generate exemplary fare restrictions, according to an exemplary embodiment. The flow diagram 462 may begin with 464 and may continue immediately with 466, according to an exemplary embodiment.

In 466, flow diagram 462 may traverse the graph database for exemplary fare restrictions, according to an exemplary embodiment. According to an exemplary embodiment, the fare and/or fare related data residing in the exemplary fare analytic graph database, may be traversed and/or queried using any of various well known graph database query tools to identify particular fares and restrictions based on a given query. From 466, flow diagram 462 may continue with 468, according to an exemplary embodiment.

In 468, flow diagram 462 may generate byte code routine(s) for fare restrictions, according to an exemplary embodiment. Byte code routine data may be boolean data, according to an exemplary embodiment. 468, according to an exemplary embodiment, many be further detailed as discussed below, with reference to FIGS. 6A and 6B, according to an exemplary embodiment. From 468, flow diagram 462 may continue with 470, according to an exemplary embodiment.

In 470, flow diagram 462 may, according to an exemplary embodiment, immediately end.

Bytecode Interpreters

There is a spectrum of possibilities between the computer programming processes of "interpreting" and "compiling," depending on the amount of analysis performed before the program is executed, according to an exemplary embodiment. For example, Emacs Lisp may be compiled to bytecode, which is a highly compressed and optimized representation of the Lisp source, but is not machine code (and therefore not tied to any particular hardware), according to an exemplary embodiment. This "compiled" code may then be interpreted by a bytecode interpreter (which itself may be written in C, for example), according to an exemplary embodiment. The compiled code in this case is machine code for a virtual machine, which is implemented not in hardware, but rather in the bytecode interpreter, according to an exemplary embodiment. A virtual machine (VM) may include a simulation of a machine (abstract or real) that may be usually different from the target machine (upon which the machine is being simulated). Virtual machines may be based on specifications of a hypothetical computer or emulate the computer architecture and functions of a real world computer, according to an exemplary embodiment. The same approach may be used with the Forth code used in Open Firmware systems: the source language is compiled into "F code" (a bytecode), which may then be interpreted by a virtual machine, according to an exemplary embodiment.

Bytecode

Bytecode, also known as portable code (p-code), is a form of instruction set designed for efficient execution by a software interpreter. Unlike human-readable source code, bytecodes may be compact numeric codes, constants, and references (normally numeric addresses) which may encode the result of parsing and semantic analysis of things like type, scope, and nesting depths of program objects, according to an exemplary embodiment. Bytecodes therefore may allow much better performance than direct interpretation of source code, according to an exemplary embodiment.

The name bytecode stems from instruction sets which have one-byte opcodes followed by optional parameters. Intermediate representations such as bytecode may be output by programming language implementations to ease interpretation, or may be used to reduce hardware and operating system dependence by allowing the same code to run on different platforms, according to an exemplary embodiment. Bytecode may often be either directly executed on a virtual machine (i.e. interpreter), or may be further compiled into machine code for better performance, according to an exemplary embodiment.

Since bytecode instructions may be processed by software, the bytecode routines or instructions may be arbitrarily complex, but are nonetheless often akin to traditional hardware instructions; virtual stack machines are the most common, but virtual register machines have also been built. Different parts may often be stored in separate files, similar to object modules, and may be dynamically loaded during execution, according to an exemplary embodiment.

A bytecode program may be executed by parsing and directly executing the instructions, one at a time, according to an exemplary embodiment. This kind of bytecode interpreter may be very portable. Some systems, called dynamic translators, or "just-in-time" (JIT) compilers, may translate bytecode into machine language as necessary at runtime, making the virtual machine hardware-specific, but not losing the portability of the bytecode itself. For example, Java and Smalltalk code may be typically stored in bytecoded format, which may then be JIT compiled to translate the bytecode to machine code before execution. Compilation may introduce a delay before a program is run, when bytecode is compiled to native machine code, but may improve execution speed considerably compared to direct interpretation of the source code—normally by several magnitudes of performance, according to one exemplary embodiment. Google's V8 and Dart VM do direct translation of source code to JITed machine code without a bytecode intermediary, according to another exemplary embodiment.

According to an exemplary embodiment, because of a performance advantage, many language implementations may execute a program in two phases, first compiling the source code into bytecode, and then passing the bytecode to the virtual machine. Therefore, according to an exemplary embodiment, there are virtual machines for Java, Python, PHP, Forth, and Tcl, among others, etc. The implementation of Perl and Ruby 1.8 work instead by walking an abstract syntax tree representation derived from the source code, according to an exemplary embodiment.

Figure 6A:
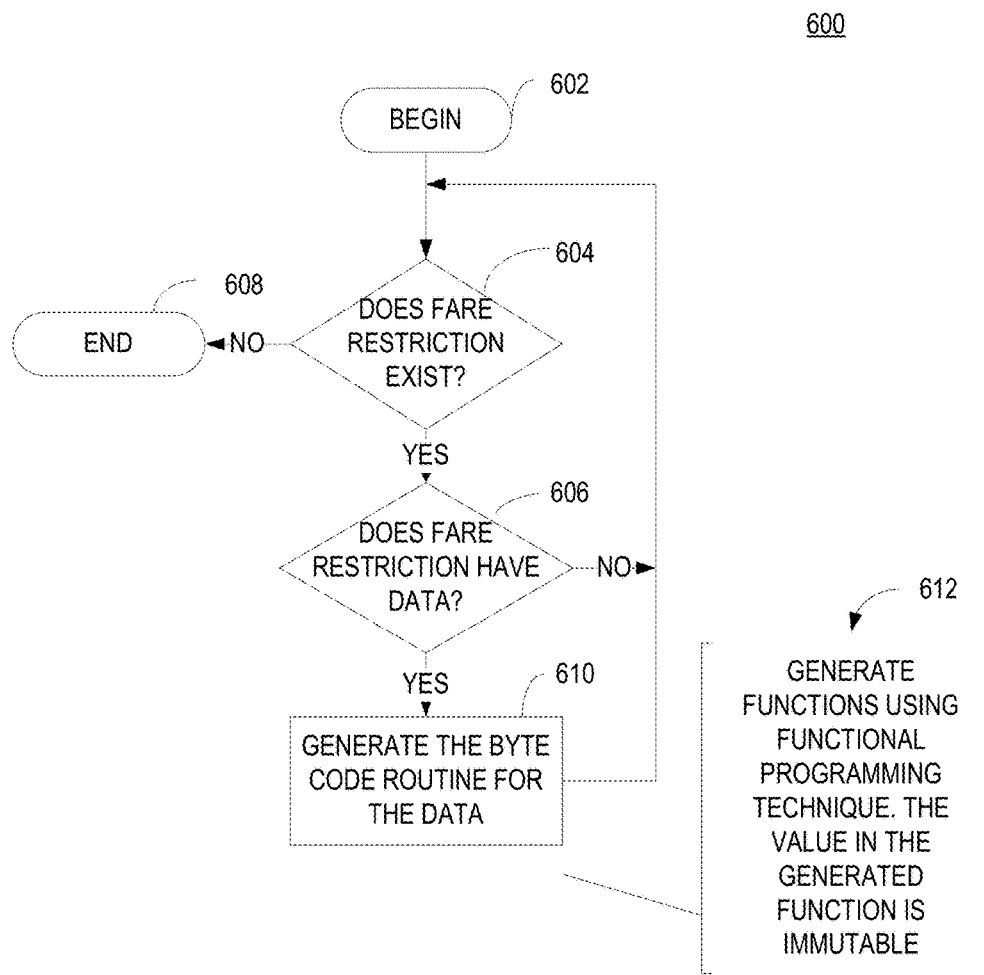
FIG. 6A depicts an exemplary process flow diagram illustrating an exemplary process of generating exemplary byte code routine for exemplary fare restrictions as an exemplary embodiment of a portion of FIG. 4E, according to an exemplary embodiment.

FIG. 6A is discussed here as it follows as an exemplary embodiment of an alternative portion 468 of FIG. 4E, illustrating an exemplary embodiment of an exemplary process to generate an exemplary byte code routine. FIG. 6A depicts an exemplary process flow diagram 600 illustrating an exemplary process of generating an exemplary byte code routine for exemplary fare restrictions as an exemplary embodiment of a portion of FIG. 4E, according to an exemplary embodiment. Flow diagram 600 of FIG. 6A may begin with 602, and may continue immediately with 604, according to an exemplary embodiment.

In 604, flow diagram 600 may determine whether a fare restriction exists, according to an exemplary embodiment. From 604, flow diagram 600 may continue with 606 if it is determined that a fare restriction exists, or alternatively may proceed with 608, if it is determined that no fare restriction exists, according to an exemplary embodiment.

In 606, flow diagram 600 may determine whether a given fare restriction has data, according to an exemplary embodiment. From 606, flow diagram 600 may continue with 610 if it is determined that the given fare restriction does have data, or alternatively may proceed with 604, if it is determined that the given fare restriction has no data, and may upon determining that no further fare restriction exists, may end with 608, according to an exemplary embodiment.

In 610, according to an exemplary embodiment, flow diagram 600 may generate the byte code routine for the given fare restriction data determined to exist in 606. From 610, flow diagram 600 may continue with 604 to determine if any further fare restrictions exist, or if not, then to proceed to end 608, according to an exemplary embodiment.

In 612, as illustrated, the generation of byte code routine of 610 for the fare restriction data of 606 may include generate functions using functional programming technique(s), according to an exemplary embodiment. According to an exemplary embodiment, the value in the generated function may be immutable.

In 608, flow diagram 600 may immediately end, according to an exemplary embodiment.

Figure 6B:
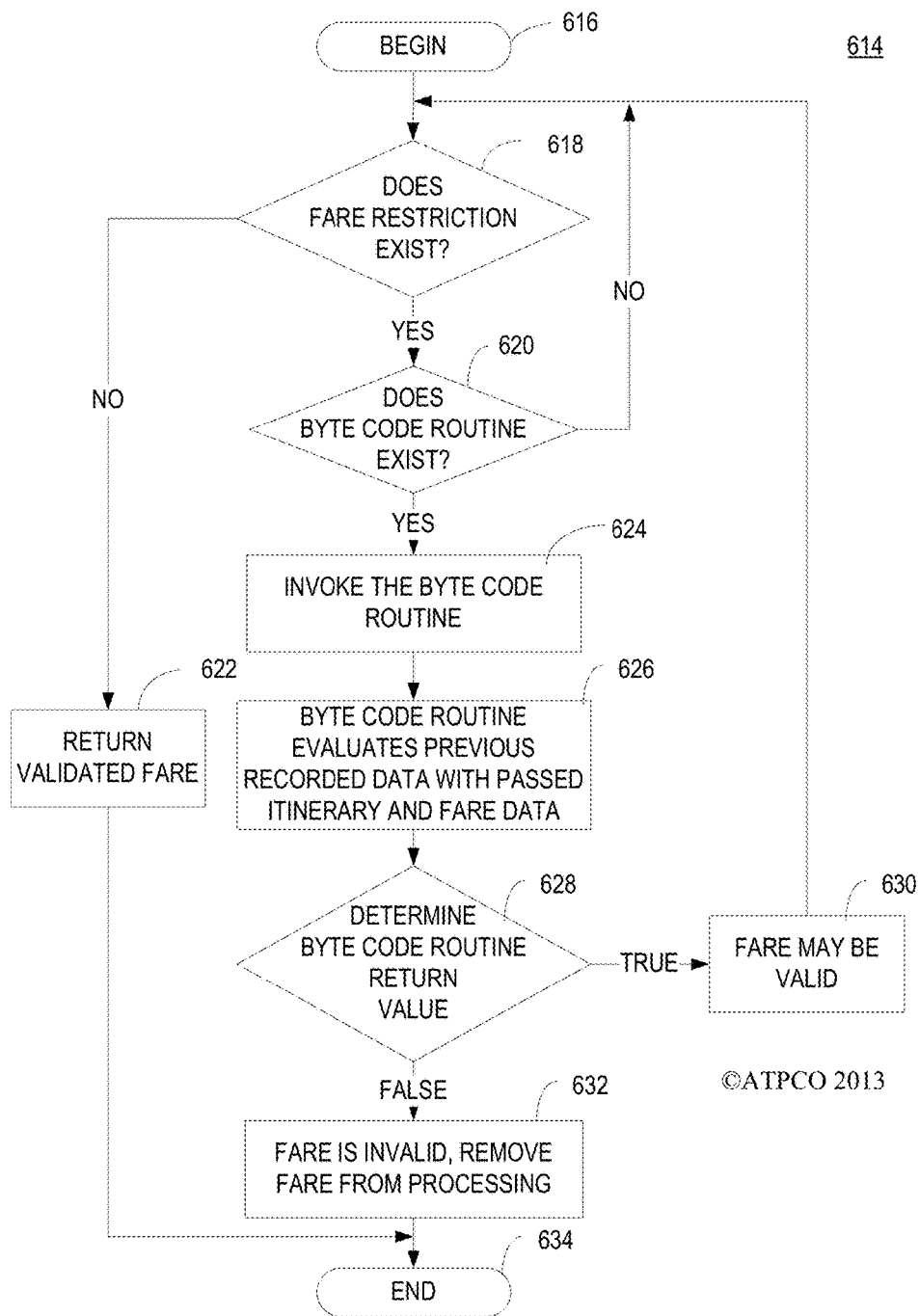
FIG. 6B depicts an exemplary process flow diagram illustrating an exemplary more detailed exemplary process of generating exemplary byte code routine for exemplary fare restrictions as an exemplary embodiment of a portion of FIG. 4E, according to an exemplary embodiment.

FIG. 6B is discussed here as it follows as an exemplary embodiment of an alternative portion 468 of FIG. 4E of an exemplary process of executing an exemplary byte code routine, according to an exemplary embodiment. FIG. 6B depicts an exemplary process flow diagram 614 illustrating an exemplary more detailed exemplary process of generating exemplary byte code routine for exemplary fare restrictions as an exemplary embodiment of a portion of FIG. 4E, according to an exemplary embodiment.

Flow diagram 614 of FIG. 6B may begin with 616, and may continue immediately with 618, according to an exemplary embodiment.

In 618, flow diagram 614 may determine whether a fare restriction exists, according to an exemplary embodiment. From 618, flow diagram 614 may continue with 620 if it is determined that a fare restriction exists, or alternatively may proceed with 622, if it is determined that no fare restriction exists, according to an exemplary embodiment.

In 620, flow diagram 614 may determine whether a given byte code routine exists, according to an exemplary embodiment. From 620, flow diagram 614 may continue with 624 if it was determined that a given byte code routine exists, or if it was determined that the given byte code routine does not exist, then flow diagram 614 may continue with 618.

In 622, flow diagram 614 may return a validated fare, according to an exemplary embodiment. From 622, flow diagram 614 may continue with 634, according to an exemplary embodiment.

In 624, flow diagram 614 may invoke the byte code routine that was previously determined to exist, according to an exemplary embodiment. From 624, flow diagram 614 may continue with 626, according to an exemplary embodiment.

In 626, flow diagram 614, the byte code routine, which was invoked, may evaluate previously recorded data with passed itinerary and fare data, according to an exemplary embodiment. From 626, flow diagram 614 may continue with 628, according to an exemplary embodiment.

In 628, flow diagram 614 may determine a byte code routine return value, according to an exemplary embodiment. From 628, flow diagram 614 may continue with 630 if the byte code routine boolean value is true, and if it was determined that the byte code routine boolean return value is false, then flow diagram 614 may continue with 632.

In 630, flow diagram 614, the fare may be determined to be possibly valid, according to an exemplary embodiment. From 630, flow diagram 614 may continue with 618, according to an exemplary embodiment.

In 632, flow diagram 614, it may be determined that the fare is invalid, and therefore the fare may be removed from processing, according to an exemplary embodiment. From 632, flow diagram 614 may continue with 634, according to an exemplary embodiment.

In 634, flow diagram 614, may immediately end, according to an exemplary embodiment.

Figure 4F:
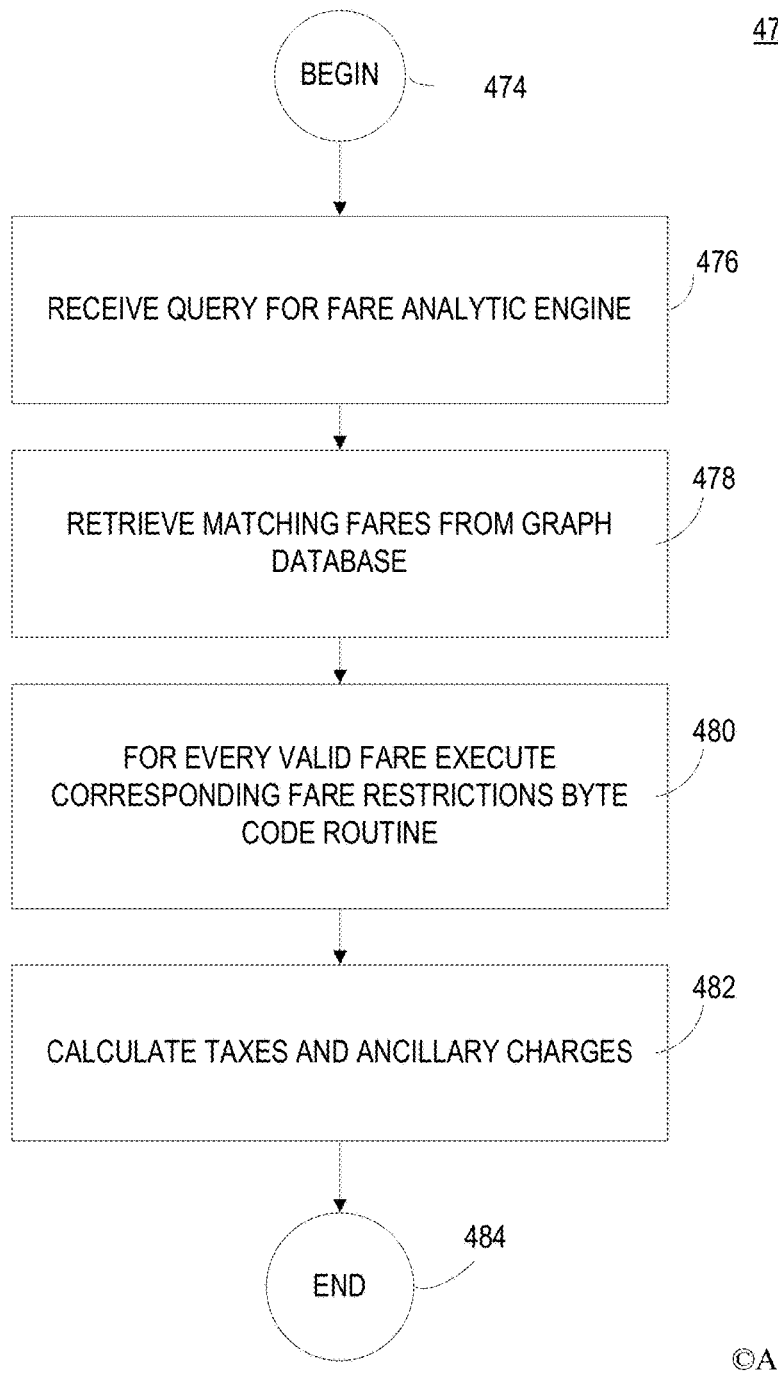
FIG. 4F depicts an exemplary process flow diagram of an exemplary system, method and/or computer program product illustrating a more detailed exemplary portion of the exemplary fare analytic engine query process of FIG. 4D of processing the exemplary fare analytic engine query using an exemplary fare analytic database, according to an exemplary embodiment.

FIG. 4F depicts an exemplary process flow diagram 472 of an exemplary system, method and/or computer program product illustrating a more detailed exemplary portion representing an exemplary embodiment of 450 and 452 of the exemplary fare analytic engine query process as described above with reference to an exemplary embodiment of FIG. 4D of processing the exemplary fare analytic engine query using an exemplary fare analytic database, according to an exemplary embodiment.

FIG. 4F sets forth an exemplary, but nonlimiting flow diagram 472 illustrating an exemplary query process flow, by which a query to obtain a fare may be processed and responded to by an exemplary computer processor, as described elsewhere herein, which may begin with 474 and may continue immediately with 476, according to one exemplary embodiment.

In 476, an exemplary embodiment of flow diagram 472 may illustrate receiving a query for an exemplary fare analytic engine, according to an exemplary embodiment. From 476, flow diagram 472 may continue with 478, according to an exemplary embodiment.

In 478, an exemplary embodiment of flow diagram 472 may illustrate retrieving matching fares from an exemplary graph database, as described elsewhere herein (at, e.g., but not limited to, with reference to FIGS. 4J and 4K, etc.), according to an exemplary embodiment. From 478, flow diagram 472 may continue with 480, according to an exemplary embodiment.

In 480, an exemplary embodiment of flow diagram 472 may illustrate for every valid fare, executing corresponding fare restrictions byte code routine, as described elsewhere herein (at, e.g., but not limited to, with reference to FIGS. 6A and 6B, etc.), according to an exemplary embodiment. From 480, flow diagram 472 may continue with 482, according to an exemplary embodiment.

In 482, an exemplary embodiment of flow diagram 472 may illustrate that exemplary taxes, and/or ancillary charges, and/or other fees and/or charges, may optionally be further calculated, and/or added to the calculated valid fares, according to an exemplary embodiment. According to an exemplary embodiment, exemplary fare and/or fare related data may include, e.g., but not limited to, exemplary fares illustrated in FIG. 4A, among others as may be added and/or removed from time to time by regulators, carriers, and/or governmental agencies, etc., according to an exemplary embodiment. From 482, flow diagram 472 may continue with 484.

In 484, flow diagram 472 may immediately end, according to an exemplary embodiment.

Exemplary Fare Construction Process

Figure 4G:
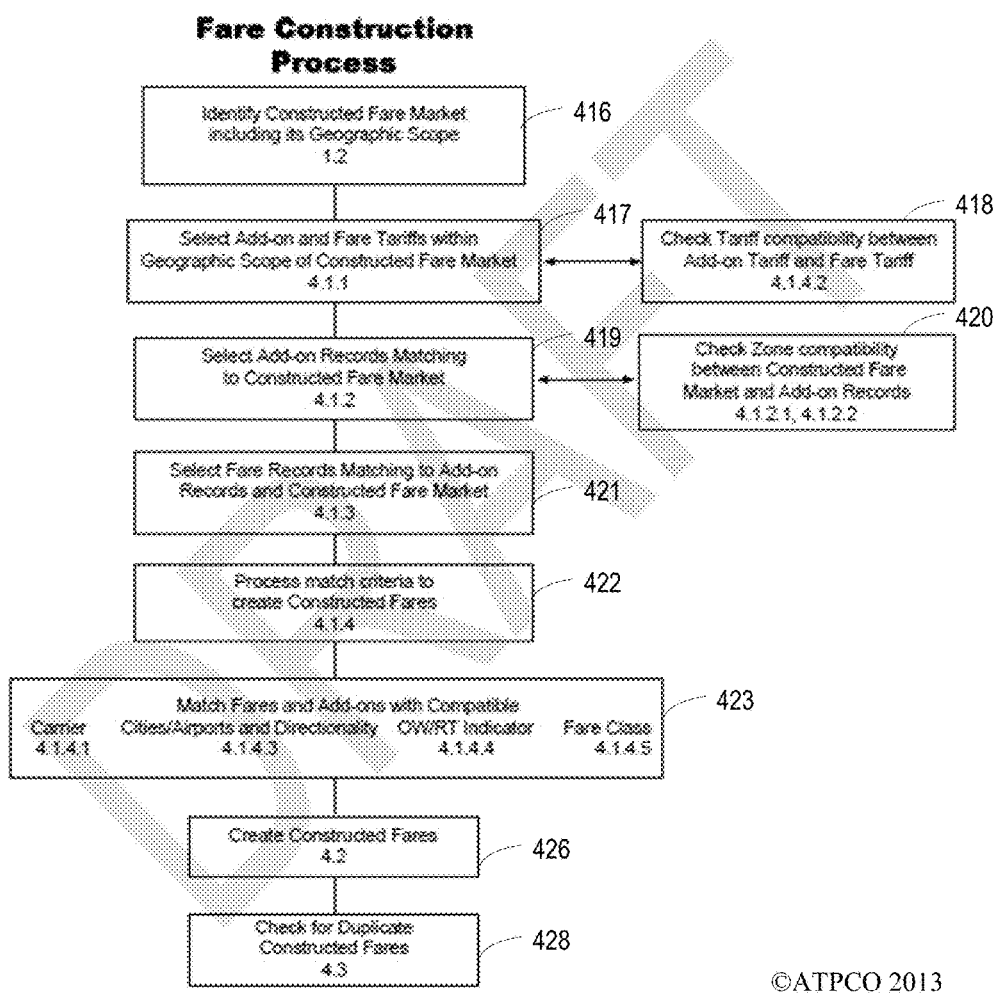
FIG. 4G depicts an exemplary fare construction process for an exemplary fare data and fare related data exemplary graph database data model for an exemplary but not limiting airline passenger fare environment, according to an exemplary embodiment.
Figure 4H:
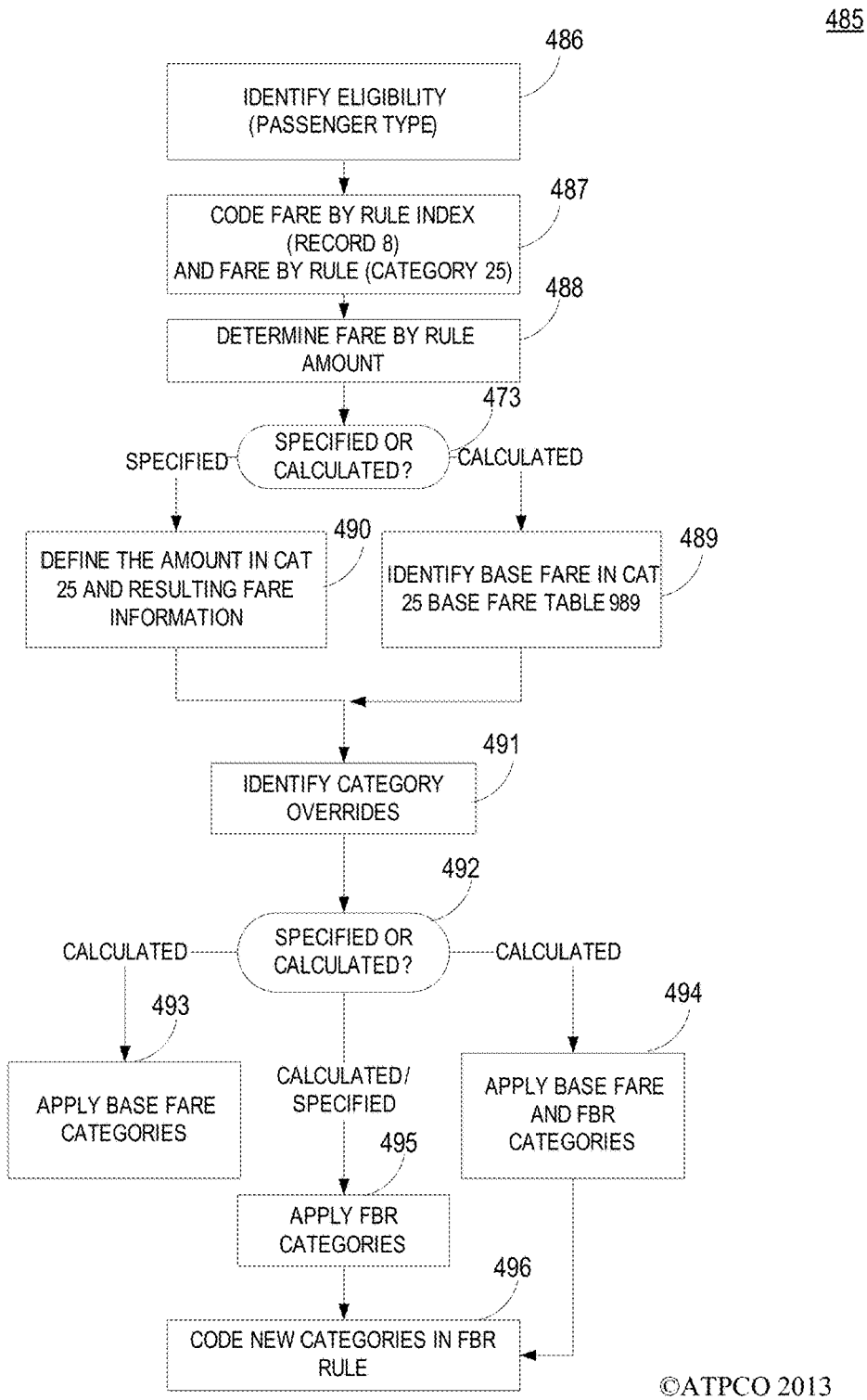
FIG. 4H depicts an exemplary fare by rule automated rules process for an exemplary fare data and fare related data exemplary graph database data model for an exemplary but not limiting airline passenger fare environment, according to an exemplary embodiment.
Figure 41:
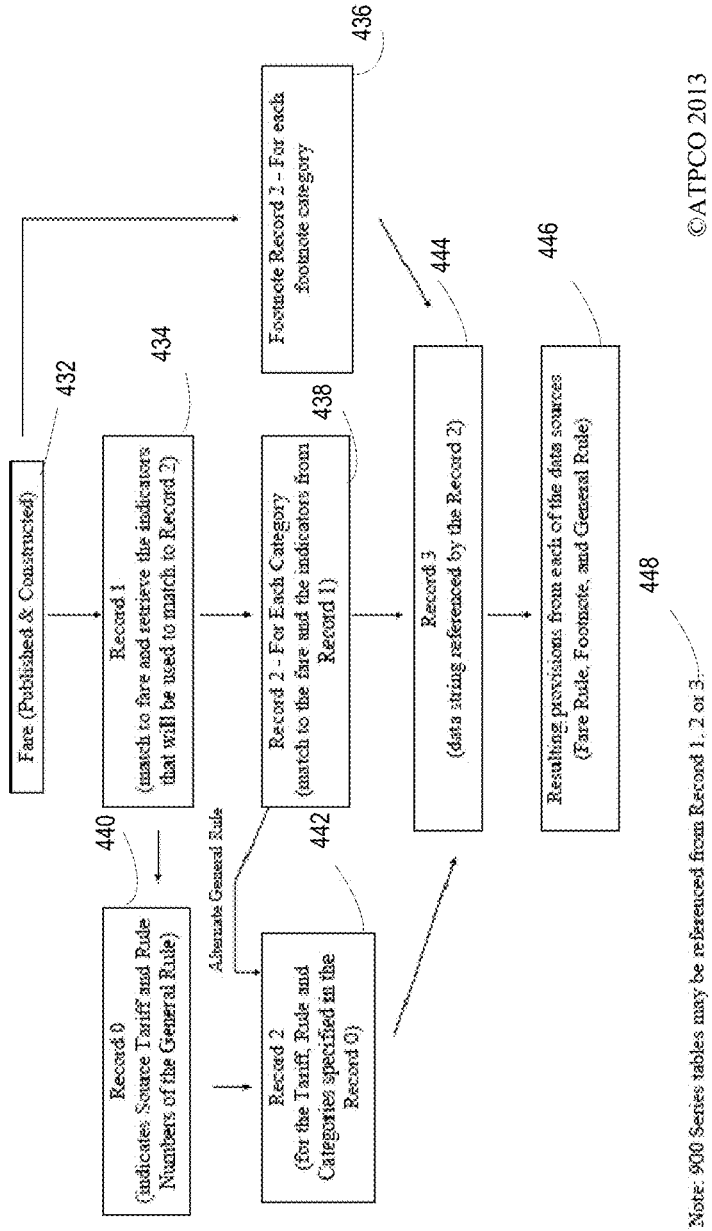

FIG. 4G depicts an exemplary fare construction process flow diagram 415, for an exemplary fare data and fare related data exemplary graph database data model for an exemplary but not limiting airline passenger fare environment, according to an exemplary embodiment.

As depicted in flow diagram 415, the fare construction process may begin with 416.

In 416, fare construction process flow diagram 415 may begin by identifying a constructed fare market, including a geographic scope, according to an exemplary embodiment. From 416, flow diagram 415 may continue with 417, according to an exemplary embodiment.

In 417, the fare construction process 415 may select an add-on and fare tariffs within a geographic scope of constructed fare market, according to an exemplary embodiment. From 417, flow diagram 415 may continue with 418 and/or 419, according to an exemplary embodiment.

In 418, fare construction process flow diagram 415 may check tariff compatibility between an add-on tariff and fare tariff, according to an exemplary embodiment. From 418, flow diagram 415 may continue with 417, according to an exemplary embodiment.

In 419, fare construction process flow diagram 415 may select an add-on tariff records matching to constructed fare market, according to an exemplary embodiment. From 419, flow diagram 415 may continue with 421, according to an exemplary embodiment.

In 421, fare construction process flow diagram 415 may select fare records matching to add-on records and constructed fare market, according to an exemplary embodiment. From 421, flow diagram 415 may continue with 422, according to an exemplary embodiment.

In 422, fare construction process flow diagram 415 may process match criteria to create constructed fares, according to an exemplary embodiment. From 422, flow diagram 415 may continue with 423, according to an exemplary embodiment.

In 423, fare construction process flow diagram 415 may match fares and add-ons with one or more compatible carrier(s), city/cities/airport(s) and directionality, one way/round trip (OW/RT) indicator, and/or fare class, according to an exemplary embodiment. From 423, flow diagram 415 may continue with 426 according to an exemplary embodiment.

In 426, fare construction process flow diagram 415 may create constructed fares, according to an exemplary embodiment, From 426, flow diagram 415 may continue with 428, according to an exemplary embodiment.

In 428, as illustrated, fare construction flow diagram 415 may check for duplicate constructed fares, according to an exemplary embodiment. From 428, according to an exemplary embodiment, flow diagram 415 may end.

Data Application—Constructed Fares—Overview:

This document describes airline passenger industry standard principles of constructing a fare, according to an exemplary embodiment. The business rules defined may encompass the processes to produce accurate Constructed Fares, according to an exemplary embodiment. However, the layout of the construction business rules in this document does not imply processing order, according to an exemplary embodiment.

A Constructed Fare, according to an exemplary embodiment, may include the combination of one or two Add-on amounts and a Fare amount, according to an exemplary embodiment. The travel industry, according to an exemplary embodiment, may use fare construction as a tool to create fares between two locations without having to publish fares for each possible combination of cities for which an airline wants to provide fares, according to an exemplary embodiment.

Data Requirements

In order to create Constructed Fares, it may be essential to know the following, according to an exemplary embodiment:

a Market to be constructed;
   a Geographic scope of the Constructed Fare being created;
   International Passenger Fares;
   International Passenger Add-ons; and/or
   Any associated information used to match Fares and Add-ons (i.e., fare classes, zones, etc.)

Basic Processing Overview

There are at least two reasons for constructing fares, according to an exemplary embodiment; each may have a different approach, according to an exemplary embodiment:
   create a Constructed Fare for a specific market; and/or
   create a database of Constructed Fares based on Specified Fares and Add-ons.

Specific Market Approach

This approach, according to an exemplary embodiment, may create a Constructed Fare for a specific market. First step, according to an exemplary embodiment, is to identify the specific market and its geographic scope (i.e., travel is via the Atlantic (AT), etc) that need a Constructed Fare, according to an exemplary embodiment. This is known as the Constructed Fare Market, according to an exemplary embodiment. How this Constructed Fare Market is determined and its geographic scope is up to the subscriber, according to an exemplary embodiment. Once the Constructed Fare Market has been identified, according to an exemplary embodiment:

the Specified Fares and Add-ons may be selected, according to an exemplary embodiment—see sections 4.1.1 through 4.1.3 for details; and
   then the process may proceed with the compatibility checks outlined in section 4.1.4, according to an exemplary embodiment.

Constructed Fares Database Approach

This approach, according to an exemplary embodiment, may compare each fare with all Add-ons and when a match is found a Constructed Fare may be created, according to an exemplary embodiment. This process, according to an exemplary embodiment, does not have a specific market before the process starts. The process, according to an exemplary embodiment, may select all Specified Fares and may check for possible combinations with all Add-on records. If creating a database of Constructed Fares is desired, according to an exemplary embodiment, then the Specified Fares and Add-ons may be selected from compatible tariffs (this step will also identify the geographic scope of the Constructed Fare), according to an exemplary embodiment—see sections 4.1.1 through 4.1.3 for details; and/or
   then, according to an exemplary embodiment, the process may proceed with the compatibility checks outlined in section 4.1.4.

Basic Steps in Fare Construction for the Specific Market Approach

The flow chart of FIG. 4G may outline the basic steps in creating Constructed Fares and may identify their section within the ATPCO subscription published documentation, according to an exemplary embodiment. The flow diagram 4C is for illustration purposes only and may not reflect the order that compatibility checks are done (for example, one way/round trip, fare class, cities/airports, directionality, zones), according to an exemplary embodiment. Generally, however, according to an exemplary embodiment, if a specific order needs to be followed within a process, an example order may be provided, according to an exemplary embodiment.

Definitions and Assumptions

Definitions

Refer to the "Glossary of Terms" section above for additional definitions.

Constructed Fare Gateway City, according to an exemplary embodiment, may refer to—In the Specified Fare Record, the Origin City or Destination City that is an exact match to the Origin City in the Add-on Record with which the Specified Fare Record is being combined to create a Constructed Fare.

IATA Rate of Exchange (IROE), according to an exemplary embodiment, may refer to—The rates of exchange notified by IATA to convert a local currency fare to NUC and to convert total NUC amounts to the currency of the country of commencement of transportation NUC The Neutral Unit of Construction.

Generic Fare Class A six asterisk (****) or alpha five asterisk (A***) fare class in an Add-on Record, according to an exemplary embodiment.

Assumptions

Assumptions may include, e.g., any of the following:

Constructed Fares may be the result of combining a Specified Fare record with one or two Add-on records, according to an exemplary embodiment. When matches are not found, a Constructed Fare may not apply, according to an exemplary embodiment.

Add-ons may be added to one or both ends of a Specified Fare but may not be used consecutively, according to an exemplary embodiment.

Add-ons may NOT be sold separately as sector fares, according to an exemplary embodiment.

The origin city and destination city of an Add-on may be in the same country or in different countries, according to an exemplary embodiment.

The Constructed Fare assumes the fare class, tariff and rule of the Specified Fare, according to an exemplary embodiment.

All footnote provisions of the Add-on applies in addition to footnote provisions of the Specified Fare, according to an exemplary embodiment.

All routing provisions of the Add-on apply in addition to routing provisions of the Specified Fare, according to an exemplary embodiment.

A Specified Fare can be used to construct a fare unless it's Category 23 doesn't permit it, according to an exemplary embodiment.

Exemplary Fare by Rule Process

FIG. 4H depicts an exemplary fare by rule automated rules process flow diagram 485 for an exemplary fare data and fare related data exemplary graph database data model for an exemplary but not limiting airline passenger fare environment, according to an exemplary embodiment.

According to an exemplary embodiment, Fare By Rule (FBR) flow diagram 485 may include an exemplary process which may begin with 486.

In 486, fare by rule automated rule flow diagram 485 may include identifying eligibility, which may include, in an exemplary embodiment, identifying a passenger type, etc. From 486, fare by rule automated rule flow diagram 485 may continue with 486, according to an exemplary embodiment.

In 487, fare by rule automated rule flow diagram 485 may include coding a fare by rule index, which may include, in an exemplary embodiment, coding record 8 and/or may including coding fare by rule category 25, according to one exemplary embodiment. From 487, fare by rule automated rule flow diagram 485 may continue with 488, according to an exemplary embodiment.

In 488, fare by rule automated rule flow diagram 485 may include determining a fare by rule amount, according to one exemplary embodiment. From 488, fare by rule automated rule flow diagram 485 may continue with 473, according to an exemplary embodiment.

In 473, fare by rule automated rule flow diagram 485 may include determining whether the fare is specified or calculated, according to one exemplary embodiment. From 473, fare by rule automated rule flow diagram 485 may continue with 490 if specified, or if determined to be calculated may continue with 489, according to an exemplary embodiment.

In 490, fare by rule automated rule flow diagram 485 may include defining an amount in category 25 and resulting fare information, according to one exemplary embodiment. From 490, fare by rule automated rule flow diagram 485 may continue with 491, according to an exemplary embodiment.

In 489, fare by rule automated rule flow diagram 485 may include identifying base fare in category 25 base fare table 989, according to one exemplary embodiment. From 489, fare by rule automated rule flow diagram 485 may also continue with 491, according to an exemplary embodiment.

In 491, fare by rule automated rule flow diagram 485 may include identifying any category overrides, according to one exemplary embodiment. From 491, fare by rule automated rule flow diagram 485 may continue with 492, according to an exemplary embodiment.

In 492, fare by rule automated rule flow diagram 485 may include determining whether the fare is specified or calculated, according to one exemplary embodiment. From 492, fare by rule automated rule flow diagram 485 may continue with 495 if specified, or if determined to be calculated may continue with 493, 495, and 494, according to an exemplary embodiment.

In 493, fare by rule automated rule flow diagram 485 may include identifying any category overrides, according to one exemplary embodiment. From 493, fare by rule automated rule flow diagram 485 may continue with 496, according to an exemplary embodiment.

In 494, fare by rule automated rule flow diagram 485 may include applying base fare and fare by rule categories, according to one exemplary embodiment. From 494, fare by rule automated rule flow diagram 485 may continue with 496, according to an exemplary embodiment.

In 495, fare by rule automated rule flow diagram 485 may include applying fare by rule categories, according to one exemplary embodiment. From 495, fare by rule automated rule flow diagram 485 may continue with 496, according to an exemplary embodiment.

In 496, fare by rule automated rule flow diagram 485 may include coding new categories in FBR rule, according to one exemplary embodiment. From 491, fare by rule automated rule flow diagram 485 may continue with 492, according to an exemplary embodiment.

Exemplary Fare by Rule (Category 25) and Fare by Rule Index (Record 8)—Private Fares According to an exemplary embodiment, Fare By Rule (FBR) may be included in ATPCO's core business process of collection and distribution of fares and fare-related data and may provide, according to an exemplary embodiment, key data elements for both public and private Fare By Rule tariffs.

ATPCO's Fare By Rule, according to an exemplary embodiment, may also complement ATPCO's Negotiated Fares product by facilitating the creation of multiple Negotiated Fares expressed as percentages or flat discounts off existing fares, in an exemplary embodiment.

Fare By Rule may be unlike the traditional method of filing fares through ATPCO because there may be neither a beginning fare record nor a Fare Class Application, according to an exemplary embodiment. The fare may be created by the Pricing Engine processing data from an existing fare rule, according to an exemplary embodiment. According to an exemplary embodiment, a common example of a Fare By Rule fare may include a Seaman's Fare where the fare is not published but created by using an existing published or private fare rule.

Fare by Rule Tariffs

According to an exemplary embodiment, FBR rules may be held in unique tariffs that may be for Fare By Rule use only. The FBR rules may be organized, according to an exemplary embodiment, by whether the data is public or private and, according to an exemplary embodiment, whether it is coded by a carrier or non-carrier entity.

Fare by Rule Index (Record 8)

The Fare By Rule Index may include, according to an exemplary embodiment, the primary link between the itinerary of the fare needed and the data used to create the fare. The FBR Index, according to an exemplary embodiment, may be the starting point for creating Fare By Rule data and may identify specific information about the passenger and the passenger's itinerary. The Pricing Engine, according to an exemplary embodiment, may use the FBR index, according to an exemplary embodiment, to link to the corresponding Fare By Rule Category Control because there may be no starting fare, according to an exemplary embodiment.

Fare by Rule Category Control (Sequence List or Record 2)

The Fare By Rule Category Control record may link the Fare By Rule Index to the Fare By Rule data table (provision). Because of the nature of Fare By Rule, the Fare By Rule Category Control record data elements may not contain traditional fare-related data fields and therefore may be unique to this category, according to an exemplary embodiment.

Fare by Rule Data Provision (Detail or Record 3)

The FBR provision, according to an exemplary embodiment, may be made up of one or more data tables that may specify who qualifies for the fare and may define the characteristics for creating a specified or calculated Fare By Rule, according to an exemplary embodiment. The primary data components, according to an exemplary embodiment, may include, e.g., but are not be limited to, as follows:

Passenger itinerary data
Fare calculation data
Fare comparison data
Resulting fare data
Category override data Base Fare Table (Table 989)

The Base Fare Table, or table 989, as it may be referred to by ATPCO, according to an exemplary embodiment, may be used to specify the types of fares to be used for fare comparisons and/or computing discounts, according to an exemplary embodiment. According to an exemplary embodiment, the table may be a subset of the Fare By Rule data provision table.

Zone Table (Table 978)

The Zone Table, or table 978, as it is referred to by ATPCO, according to an exemplary embodiment, may provide the ability to define a list of geographic points based on an individual data provider's business needs, according to an exemplary embodiment. The zone table, according to an exemplary embodiment, may be commonly referred to as user-defined zones, according to an exemplary embodiment. According to an exemplary embodiment, a zone table may not need to be created if current ATPCO-defined zone codes are equivalent to the geographical locations needed, according to an exemplary embodiment. The exemplary zone table, according to an exemplary embodiment, may be available in the Fare By Rule Index, according to an exemplary embodiment.

According to an exemplary embodiment, an exemplary Zone Table must include at least one positive entry specifying where the fare is applicable, otherwise it may not applicable anywhere, according to an exemplary embodiment. If a positive entry is not specified, then the Pricing Engine may not be able to determine where the fare is applicable, according to an exemplary embodiment.

Exemplary Automated Rules Overview Process

FIG. 4I depicts an exemplary data application automated rules overview process 430 for an exemplary fare data and fare related data exemplary graph database for an exemplary but not limiting airline passenger fare environment, according to an exemplary embodiment.

As depicted in flow diagram 430, the data application automated rules may begin with a fare 432, which may be published and constructed, and may then proceed to 434 for record 1, and/or 436 for footnote record 2, according to an exemplary embodiment.

In 434, for record 1, the process 430 may match to the fare and may retrieve the indicators that may be used to match to record 2, according to an exemplary embodiment. From 434, flow diagram 430 may continue with 440 and/or 438, according to an exemplary embodiment.

In 436, footnote record 2 may be derived for each footnote category, according to an exemplary embodiment. From 436, flow diagram 430 may continue with 444.

In 438, for record 2, for each category, the process 430 may match to the fare and indicators from record 1, according to an exemplary embodiment. From 438, flow diagram 430 may continue with 444 and/or by alternate general rule to 442, according to an exemplary embodiment.

In 440, for record 0, may derive an indication of source tariff and rule numbers of the general rule, according to an exemplary embodiment. From 440, flow diagram 430 may continue with 442, according to an exemplary embodiment.

In 442, for record 2, may derive for the tariff, rule and categories specified in the record 0, a match be identified, according to an exemplary embodiment. From 442, flow diagram 430 may continue with 444, according to an exemplary embodiment.

In 444, for record 3, may derive for a data string referenced by the record 2, a match may be identified, according to an exemplary embodiment. From 444, flow diagram 430 may continue with 446 according to an exemplary embodiment.

In 446, resulting provisions from each of the data sources may be obtained including, e.g., but not limited to, fare rule, footnote, and general rule, etc., according to an exemplary embodiment, From 446, flow diagram 430 may end, according to an exemplary embodiment.

In 448, as noted, 900 series tables may be referenced from record 1, 2, or 3, according to an exemplary embodiment.

Data Application—Automated Rules Overview—Overview

ATPCO may offer an exemplary four Automated Rules products, according to an exemplary embodiment. According to an exemplary embodiment, these products may include:

Encoded Rule/Footnote
Full Text
Abbreviated Text
General Rule Text

According to an exemplary embodiment, there may be offered an Encoded Rule/Footnote Product. The Encoded Rule/Footnote Product may include a bits/bytes supply of the rules and footnotes, according to an exemplary embodiment. The Encoded Rules product may be made up of nine different Record types, according to an exemplary embodiment.

Record 0—General Rule Application

A General Rule Application Record exists in the database for each unique Rules Tariff, Rule Number, and Effective Date, according to an exemplary embodiment. Record 0 may contain one of two types of information, according to an exemplary embodiment:

1. Provides the tariff and rule number of the associated general rule provisions to be applied in conjunction with a fare rule. Example: Fare rule tariff—001, CXR-BA will indicate that for the stopover provisions General Rule IPRG, Rule 0135 applies; or 2. Designates each rule number in the database as fare rule, general rule, fare by rule or industry rule.

Record 1—Fare Class Application

For each occurrence of Rules Tariff, Carrier, Rule Number, Fare Class, and Effective/Discontinue Date, at least one Record 1 may convey the data pertinent to the Fare Class, such as passenger type code and primary RBDs, according to an exemplary embodiment. In addition, this Record may have indicators for the type of fare and the type of fare display in which the fare should be placed as well as indicators used to match to other Records in the Encoded Rule/Footnote product, according to an exemplary embodiment. This record may also indicate RBD exceptions, according to an exemplary embodiment.

Record 2—Category Control

This Record type may contain the identification criteria that may be matched to determine the proper rule or footnote provisions for the individual fare records, according to an exemplary embodiment. There may be many sequences of Category Control records for any given Tariff, Carrier, Rule (Footnote), and Category. In addition, each record may contain a "string" of data table numbers that may serve as pointers to the records (data tables) that may physically house the rule or footnote provisions. Each occurrence of data table in the string may contain a "relational indicator" that may specify the relationship to the other data tables present in the string, according to an exemplary embodiment.

Record 3—Category Data Tables

This Record type may contain the actual data which may state the provisions for a fare/footnote. The Record 3 may be shared and may be pointed to from any Record 2/6 across any Tariff, Carrier, Rule and/or Footnote, according to an exemplary embodiment. In the case of 900 series tables, these are Record 3s that may be pointed to from a Record 3, according to an exemplary embodiment.

Record 4—Renumber Category Control

This Record type may indicate to the subscriber that a Record 2 in the Encoded Rules/Footnote product is to be renumbered, according to an exemplary embodiment. The Record 4 may show the existing sequence number and the new sequence number for the specified Tariff, Carrier, Rule/Footnote, and Category, according to an exemplary embodiment. The intent of a Record 4 may be to expand the Record 2 file and not to change the relative placement or order, according to an exemplary embodiment.

Record 5—Renumber Fare Application

This Record type may indicate to the subscriber that a Record 1 in the Encoded Rules/Footnote product is to be renumbered, according to an exemplary embodiment. The Record 5 may show the existing sequence number and the new sequence number for the specified Tariff, Carrier, Rule, and Fare Class, according to an exemplary embodiment. The intent of a Record 5 is to expand the Record 1 file and not to change the relative placement or order, according to an exemplary embodiment.

Record 6—RBD Application

This Record type may be a source of RBD information, according to an exemplary embodiment. The Record may contain the identification criteria that may be matched to determine the proper RBD data for that fare, according to an exemplary embodiment. The Record 6 may indicate whether the RBD data being referenced apply for the fare being processed or when transportation is provided by the carrier, according to an exemplary embodiment.

Record 7—to be Developed

Record 8—Fare-by-Rule

This Record type may indicate the passenger type code and the Fare by Rule that may be created. The Record may contain identification criteria that may be matched to determine the proper provisions to create the Fare by Rule, according to an exemplary embodiment.

Basic Processing Overview

Records 0 through 3 may be used to build the provisions that support a Fare Record, according to an exemplary embodiment. Records 4 and 5 may be used for database maintenance and may be described in that section, according to an exemplary embodiment. Record 6 (RBD Application Record) and Record 8 (Fare by Rule Application) may have their own unique processing paths, according to an exemplary embodiment. Each may have a separate section that describes their processing, according to an exemplary embodiment. The flow chart of FIG. 4D may illustrate the basic "rule building" processing path used in the ATPCO Fare Record with ATPCO encoded Rule Records 0-3, according to an exemplary embodiment. The processing flow chart may reflect the relationship of the data and may not necessarily reflect how any subscriber should apply the data, according to an exemplary embodiment.

Figure 4J:
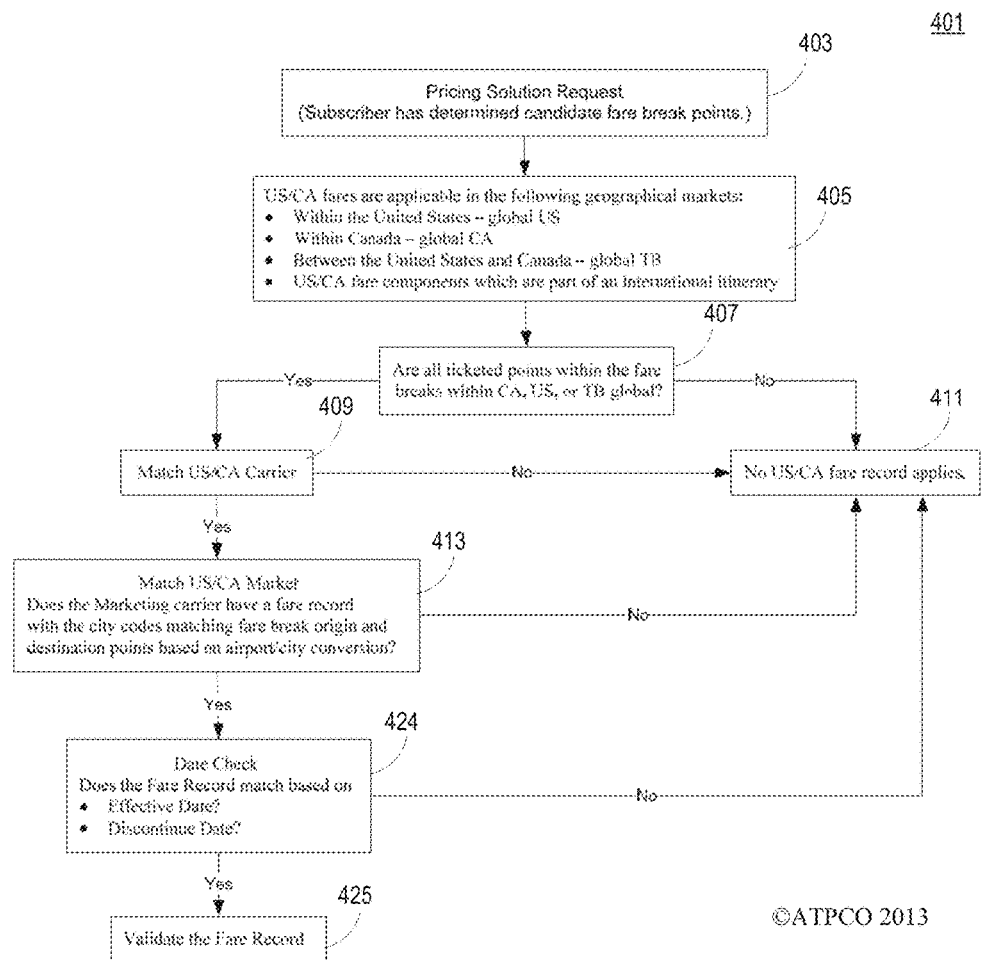
FIG. 4J depicts an exemplary process flow diagram illustrating an exemplary process of matching exemplary domestic fares from an exemplary graph database for an exemplary United States (US) or Canada (CA) exemplary air passenger fare, according to an exemplary embodiment.

FIG. 4J depicts an exemplary process flow diagram 401 illustrating an exemplary process of matching exemplary domestic fares, pricing solution request, from an exemplary graph database for an exemplary United States (US) or Canada (CA) exemplary air passenger fare, according to an exemplary embodiment.

As depicted in flow diagram 401, the exemplary process of matching domestic fares for an exemplary pricing solution request, may begin with 403.

In 403, flow diagram 401 may include beginning with, e.g., but not limited to, receiving an exemplary domestic fare pricing solution request, which may be received by the one or more exemplary computer processor(s), according to an exemplary embodiment. In an exemplary embodiment, an exemplary fare and fare related data provider's subscriber may have determined an exemplary candidate fare break point(s), according to an exemplary embodiment. From 403, flow diagram 401 may continue with 405, according to an exemplary embodiment.

In 405, flow diagram 401 may include, e.g., but may not be limited to, determining fares applicable to a given geographic market, in this case, e.g., but not limited to, a United States (US)/Canada (CA) market, according to an exemplary embodiment. In an exemplary embodiment, an exemplary US/CA market may include fares within the US (global US), fares within Canada (global CA), between the US and CA—(global transborder (TB)), and/or US/CA fare components which are part of an International itinerary, according to an exemplary embodiment. From 405, flow diagram 401 may continue with 407, according to an exemplary embodiment.

In 407, flow diagram 401 may include, e.g., but may not be limited to, determining whether all the ticketed points within the fare breaks are within the exemplary geographic areas of CA, US, or TB Global, according to an exemplary embodiment. In an exemplary embodiment, from 405, flow diagram 401 may continue with 409 if all the ticketed points were determined to be within the exemplary geographic area, or may continue with 411 if the ticketed points are determined not to be within the exemplary geographic areas, according to an exemplary embodiment.

In 409, flow diagram 401 may include, e.g., but may not be limited to, determining whether the exemplary pricing solution request matches an exemplary US/CA carrier, according to an exemplary embodiment. In an exemplary embodiment, from 409, flow diagram 401 may continue with 413 if a match with the US/CA carrier was determined, or may continue with 411 if there was no match determined, according to an exemplary embodiment.

In 411, flow diagram 401 having determined that no US/CA fare record applies, the exemplary flow diagram may then proceed to end, according to an exemplary embodiment.

In 413, flow diagram 401 may include, e.g., but may not be limited to, determining whether the exemplary request matches an exemplary US/CA market, according to an exemplary embodiment. According to an exemplary embodiment, the determination of a match may be based on determining whether the marketing carrier has a fare record with the city code(s) matching the fare break origin and destination points based on an exemplary airport to city conversion. In an exemplary embodiment, from 413, flow diagram 401 may continue with 424 if there is a match, or may continue with 411 if there is not a match, according to an exemplary embodiment.

In 424, flow diagram 401 may include, e.g., but may not be limited to, determining whether the exemplary date check is a match, according to an exemplary embodiment. According to an exemplary embodiment, the date check match determination may include, e.g., but may not be limited to, determining whether the fare record is a match based on an exemplary effective date and/or a discontinue date, according to an embodiment. In an exemplary embodiment, from 424, flow diagram 401 may continue with 425 if there is a match, or may continue with 411 if there is not a match, according to an exemplary embodiment.

In 425, flow diagram 401 may include, e.g., but may not be limited to, validating the fare record, according to an exemplary embodiment. In an exemplary embodiment, from 425, flow diagram 401 may immediately end, according to an exemplary embodiment.

Data Application for US/CA Passenger Fares

Overview—US/CA Passenger Fares

This portion describes the application of the US/CA Passenger Fare Record within an itinerary pricing environment, according to an exemplary embodiment. When all travel on a fare component on the candidate itinerary is US/CA, processing may select the appropriate US/CA fares per this portion, according to an exemplary embodiment. If the origin and/or destination points of a fare component are not US/CA, International fares may also be used, according to an exemplary embodiment.

US/CA fares may be applicable in the following geographical markets, according to an exemplary embodiment:
  Within the United States—global US, according to an exemplary embodiment
  Within Canada—global CA, according to an exemplary embodiment
  Between the United States and Canada—global TB, according to an exemplary embodiment
  Wholly within the US/CA fare components that are part of an International itinerary, according to an exemplary embodiment The United States may be defined as the 48 continental states, Alaska, Hawaii, the District of Columbia, Puerto Rico, and the U.S. Virgin Islands (consisting of St. Thomas, St. Croix, and St. John), according to an exemplary embodiment. Other U.S. possessions, such as Guam and U.S. Samoa, are part of the International Passenger Fares product, according to an exemplary embodiment.

The purpose of this portion is to address the pricing of a passenger's itinerary based on the data fields within the fare record, according to an exemplary embodiment.

Processing may first determine the fare record availability for pricing, according to an exemplary embodiment. Processing may continue by matching the itinerary to the match fields on the fare record, according to an exemplary embodiment.

This document may not address match and processing for Routings or Automated Rules/Footnote Records other than the application of fares with footnotes F or T and Categories that support the fare record, according to an exemplary embodiment. Refer to Data Application documentation for those records and categories for more information, according to an exemplary embodiment.

Data Requirements

In order to validate the fare record available for pricing, according to an exemplary embodiment, it may be helpful to know the following:
  The sale/ticketing date of the itinerary being priced, according to an exemplary embodiment.
  Date/time of departure from the origin of the fare component, pricing unit, and journey, according to an exemplary embodiment.

In order to validate the fare record against an itinerary, it may be helpful, according to an exemplary embodiment, to know the following:
  The marketing carrier on each segment of the itinerary, according to an exemplary embodiment.
  All potential fare break points, including the origin and destination points of the itinerary, according to an exemplary embodiment.
  The date/time of departure of the flight(s) within the itinerary, according to an exemplary embodiment.

Definitions and Assumptions—Definitions—Term Definition

Directional Footnotes—'F' and 'T'

Directional Footnote characters—'F' and 'T' may always have a fixed meaning, according to an exemplary embodiment, such as, e.g., in an exemplary embodiment:
  If 'F' or any combination of characters that includes 'F' is present in the Footnote field of the fare record, the fare record may apply only for transportation from the first city shown and return where shown in connection with published round-trip fares, according to an exemplary embodiment.
  If 'T' or any combination of characters that includes 'T' is present in the Footnote field of the fare record, the fare record may apply only for transportation to the first city shown and return where shown in connection with published round-trip fares, according to an exemplary embodiment.
  Blank or any other combination of footnotes not including 'F' or 'T' may indicate, according to an exemplary embodiment, that the fare record may be valid for fares 'between/and' the Origin City and Destination City and the fare may be applied in either direction.

EDOT—may indicate "Effective Date of Today" (also known as 'Same Day Effective Date') process, which may be used to indicate when fares are either available for sale or discontinued immediately on the same date they are transmitted in subscriptions, according to an exemplary embodiment.

Market—As used within this document, market may apply to two fare break points for which the fare is assessed (Bytes 7-11 and 12-16), according to an exemplary embodiment.

For US/CA Passenger Fares terms use in this portion not listed above, refer to the Glossary of Terms, according to an exemplary embodiment.

For definitions applicable to rule/footnote records and categories supporting US/CA Passenger Fares, refer to the Glossary of Terms and/or Definitions in the specific product's Data Application document for each record/category available from ATPCO.net, according to an exemplary embodiment.

Assumptions

A fare record is available for sale/ticketing as soon as it is released by ATPCO unless otherwise restricted by any footnote, fare rule, general rule data that resolves to the fare, according to an exemplary embodiment.

Fares wholly within US/CA created in Fare By Rule (Category 25) are governed by conditions in the Category 25 Data Application, according to an exemplary embodiment.

In the absence of a fare record resolving to match criteria, no US/CA fare applies to the market being validated, according to an exemplary embodiment.

Figure 4K:
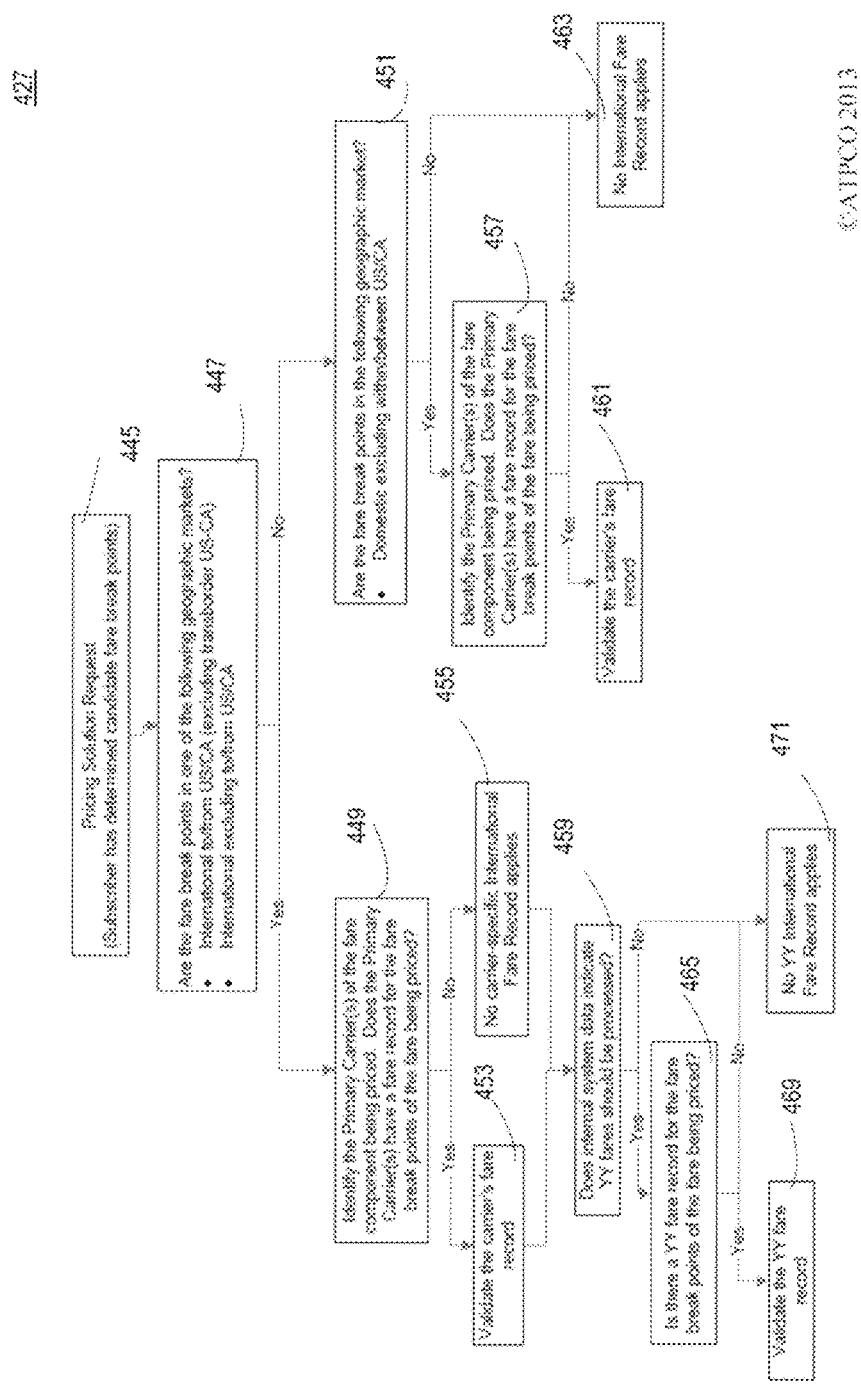
FIG. 4K depicts an exemplary process flow diagram illustrating an exemplary process of matching exemplary international fares from an exemplary graph database for an exemplary International exemplary air passenger fare, according to an exemplary embodiment.

FIG. 4K depicts an exemplary process flow diagram 427 illustrating an exemplary process of matching exemplary international fare(s) pricing solution request from an exemplary graph database for an exemplary International exemplary air passenger fare, according to an exemplary embodiment.

As depicted in flow diagram 427, the exemplary process of matching international fares for an exemplary pricing solution request, may begin with 445.

In 445 flow diagram 427 may include beginning with, e.g., but not limited to, receiving an exemplary international fare pricing solution request, which may be received by the one or more exemplary computer processor(s), according to an exemplary embodiment. In an exemplary embodiment, an exemplary fare and fare related data provider's subscriber may have determined an exemplary candidate fare break point(s), according to an exemplary embodiment. From 445, flow diagram 427 may continue with 447, according to an exemplary embodiment.

In 447, flow diagram 427 may include, e.g., but may not be limited to, determining whether fares in an applicable given geographic market, in this case, e.g., but not limited to, an exemplary international to and/or from United States (US)/Canada (CA) market (excluding transborder US-CA), according to an exemplary embodiment. In another exemplary embodiment, an exemplary international excluding to and/or from the US/CA market may also be determined, according to an exemplary embodiment. From 447, flow diagram 427 may continue with 449 if a match is determined in 447, or may continue with 451 if no match is determined in 447, according to an exemplary embodiment.

In 449, flow diagram 427 may include, e.g., but may not be limited to, identifying a primary carrier(s) of the fare component being priced, and whether the primary carrier(s) have a fare record for the fare break points of the fare being priced, according to an exemplary embodiment. In an exemplary embodiment, from 449, flow diagram 427 may continue with 453 if the process has identified and determined that the primary carrier(s) have a fare record for the fare break points, or may continue with 455 if the process has not identified and determined the primary carrier(s) has a fare record for the fare break points, according to an exemplary embodiment.

In 453, flow diagram 427 may include, e.g., but may not be limited to, validating the carrier's fare record, according to an exemplary embodiment. In an exemplary embodiment, from 453, flow diagram 427 may continue with 459, according to an exemplary embodiment.

In 455, flow diagram 427 may include, e.g., but may not be limited to, determining that no carrier-specific international fare record applies, according to an exemplary embodiment. In an exemplary embodiment, from 455, flow diagram 427 may continue with 459, according to an exemplary embodiment.

In 459, flow diagram 427 may include, e.g., but may not be limited to, determining whether internal system data indicates YY fares should be processed, according to an exemplary embodiment. In an exemplary embodiment, from 459, flow diagram 427 may continue with 465 if it was determined that internal system data indicates YY fares should be processed, or may continue with 471 if it was determined that internal system data does not indicate that YY fares should be processed, according to an exemplary embodiment.

In 465, flow diagram 427 may include, e.g., but may not be limited to, determining if there is a YY fare record for the fare break points of the fare being priced, according to an exemplary embodiment. In an exemplary embodiment, from 465, flow diagram 427 may continue with 469 if it was determined that there is a YY fare record for the fare break points of the fare being priced, or may continue with 471 if it was determined that there was not a YY fare record for the fare break points of the fare being priced, according to an exemplary embodiment.

In 469, flow diagram 427 may include, e.g., but may not be limited to, determining the YY fare record is validated, according to an exemplary embodiment. In an exemplary embodiment, from 469, flow diagram 427 may immediately end, according to an exemplary embodiment.

In 471, flow diagram 427 may include, e.g., but may not be limited to, determining that no YY International fare record applies, according to an exemplary embodiment. In an exemplary embodiment, from 471, flow diagram 427 may immediately end, according to an exemplary embodiment.

In 451, flow diagram 427 may include, e.g., but may not be limited to, determining whether the fare break points fall within domestic excluding within and/or between US and CA, according to an exemplary embodiment. In an exemplary embodiment, from 451, flow diagram 427 may continue with 457 if the break point is found to have the fare break points in the geographic market of domestic excluding within and/or between US and CA, or may continue with 463 if the fare break points are not in the geographic market of domestic excluding within and/or between US and CA, according to an exemplary embodiment.

In 457, flow diagram 427 may include, e.g., but may not be limited to, identifying the primary carrier(s) of the fare component being priced, and determining whether the primary carrier(s) have a fare record for the fare break points of the fare being priced, according to an exemplary embodiment. In an exemplary embodiment, from 457, flow diagram 427 may continue with 461 if process 427 determines the primary carrier(s) does have a fare record, or may continue with 463 if the process determines the primary carrier(s) does not have a fare record, according to an exemplary embodiment.

In 461, flow diagram 427 may validate the carrier's fare record, according to an exemplary embodiment, and may end thereafter, according to an exemplary embodiment.

In 463, flow diagram 427 may determine that no international fare record applies, according to an exemplary embodiment, and may end thereafter, according to an exemplary embodiment.

Overview—Data Application for International Fare Record—International Fares

The following describes the application of the International Passenger Fare Record within an itinerary pricing environment, according to an exemplary embodiment.

When pricing an itinerary, it may be assumed individual pricing systems may determine the scope of the pricing solutions being attempted to price, according to an exemplary embodiment. Once systems determine the possible pricing solutions, the systems may attempt to process the individual fare components against the applicable fares and applicable rules/footnotes/routings records, according to an exemplary embodiment. The purpose of this section is to address the pricing of a passenger's itinerary based on the data fields within the International Fare Record, according to an exemplary embodiment. The record may be separated into two subscription products available from ATPCO.net, according to an exemplary embodiment:

Fares to/from North America. This may include:
International fares between the United States and any point outside the United States or Canada, according to an exemplary embodiment
International fares between Canada and any point outside the United States or Canada, according to an exemplary embodiment All Fares. This may include:
International fares between any country excluding the United States or Canada, according to an exemplary embodiment
Domestic fares within any country excluding the United States or Canada, according to an exemplary embodiment.

NOTE: Although the title of this record is "International Fares," the subscription record does include domestic fares (sometimes referred to as "All Fares Domestic"), provided such domestic fares are not within or between the US and CA, according to an exemplary embodiment.

Processing may first determine the fare record availability for pricing, according to an exemplary embodiment. Processing may continue by matching the fare component to the fare record, according to an exemplary embodiment. When the origin and destination points on a fare component on the candidate pricing solution are within the geographic application specified above, processing may select the appropriate International fares per this document, according to an exemplary embodiment. If the origin and/or destination points of a fare component are not within the geographic application specified above (i.e. if the origin and/or destination points are within or between the US and CA), the US/CA Passenger Fare Record may be processed, according to an exemplary embodiment. (Data Application for the US/CA Passenger Fare Record may be referred to for further information about those fares, according to an exemplary embodiment.)

This portion describes the match process and the application of the International Fare record for itinerary pricing, according to an exemplary embodiment. When a match is made to an International Fare Record, processing may validate the fare record and all supporting data which may govern the fare, including the Fare Class (Record 1), Fare Rule (Category Record 2s/3s), General Rule (Category Record 2s/3s), Footnote/s (Category Record 2s/3s) and Routing, according to an exemplary embodiment. This section may not address processing this record for Constructed Fares, Automated Rules/Footnote Records, or Routings, according to an exemplary embodiment. Refer to Data Application documentation elsewhere herein for those records and categories for more information, according to an exemplary embodiment.

Data Requirements

In order to validate the fare record available for pricing, according to an exemplary embodiment, it may be helpful to know the following
The sale/ticketing date of the itinerary being priced, according to an exemplary embodiment.
Date of departure from the origin of the journey, according to an exemplary embodiment.

In order to validate the fare record against an itinerary, according to an exemplary embodiment, it may be helpful to know the following:
The sale/ticketing date of the itinerary being priced, according to an exemplary embodiment.
Date of departure from the origin of the journey, according to an exemplary embodiment.
The marketing carrier on each sector of the fare component (in order to identify the primary carrier), according to an exemplary embodiment.
The origin and destination point of the fare component being priced, according to an exemplary embodiment.
The pricing solution in which the fare component is being priced (in order to identify the direction of fare selection), according to an exemplary embodiment Definitions and Assumptions Definitions Exemplary definitions may include the following terms, according to an exemplary embodiment:
Market—As used within this portion, market applies to two fare break points for which the fare is assessed (Bytes 7-11 and 14-18), according to an exemplary embodiment.
Domestic Fare—Fares in the International Fare Record where the fare break points are in the same country code, according to an exemplary embodiment. Exception: Fares between country codes XU and RU are domestic, according to an exemplary embodiment.
International Fare—Fares in the International Fare Record where the fare break points are in different country codes, according to an exemplary embodiment. Exception: Fares between country codes XU and RU are not international, according to an exemplary embodiment 1.
Owning Carrier—The Carrier Code specified in bytes 4-6 on the International Fare Record, according to an exemplary embodiment. (Also referred to as Publishing Carrier)
Primary Carrier—The marketing carrier on the primary portion of travel for the fare component being priced. For carrier fares (non-YY fares), this may be the carrier whose fare may be assessed for the fare component being priced, according to an exemplary embodiment.
For international fares, determination of the primary portion of travel and the primary carrier is based on guidelines set forth in IATA Resolutions, according to an exemplary embodiment. (Also referred to as Significant Carrier.)

For domestic fares, the primary carrier can be any marketing carrier on the fare component, according to an exemplary embodiment.

Refer to the Glossary of Terms for a definition of any other applicable term.

Assumptions

A fare record may be available for sale/ticketing as soon as it is released by ATPCO unless otherwise restricted by any footnote, fare rule, and/or general rule data that resolves to the fare, according to an exemplary embodiment.

Fares created in Fare By Rule (Category 25) may be governed by conditions in Data Application for Category 25, according to an exemplary embodiment.

In the absence of a fare record resolving to match criteria, no International fare may apply to the carrier and market being validated, according to an exemplary embodiment.

Exemplary Embodiment of an Improved Journey Server

According to one exemplary embodiment, an improved journey server may be provided that advantageously provides substantial performance improvements over conventional journey servers.

According to one exemplary embodiment, an exemplary method to process a request for a valid travel itinerary, may include, e.g., but not limited to, according to an exemplary embodiment: a. receiving the request; b. processing an origin and a destination of the request which may include, according to an exemplary embodiment, i. calculating all permutations to get from the origin to the destination using a graph database; ii. determining a shortest line distance using an A* calculation using at least one business rule; iii. applying a Haversine algorithm to determine distances between the origin and the destination; and iv. using directionality logic to analyze directions of potential itineraries; and finally c. providing a response to the request based on the processing, according to one exemplary embodiment.

According to one exemplary embodiment, an exemplary method, may include where the processing may include, e.g., but not be limited to, dynamically processing the request, at a time of a travel request query, using said graph database.

According to one exemplary embodiment, an exemplary method, may include where the processing may include, e.g., but not be limited to, processing based upon at least one of: i. at least one location; ii. at least one travel schedule; or iii. at least one minimum connection time (MCT), at a connection point data node where a passenger is required to transfer from one mode of travel to another mode of travel; where a data node is a representation of a location comprising at least one of: an airport; or a port; and where a relationship is a representation of at least one flight schedule between two locations, according to an exemplary embodiment.

According to one exemplary embodiment, an exemplary method, may include where the directionality logic may include, e.g., but not limited to, one or more of the following: determining directions; or analyzing potential itineraries in wrong directions.

A* Algorithm

A* uses a best-first search and finds a least-cost path from a given initial node to one goal node (out of one or more possible goals). As A* traverses the graph, it follows a path of the lowest known heuristic cost, keeping a sorted priority queue of alternate path segments along the way.

It uses a distance-plus-cost heuristic function of node x (usually denoted f(x)) to determine the order in which the search visits nodes in the tree. The distance-plus-cost heuristic is a sum of two functions:

the path-cost function, which is the cost from the starting node to the current node x (usually denoted g(x))

an admissible "heuristic estimate" of the distance from x to the goal (usually denoted h(x)).

The h(x) part of the f(x) function must be an admissible heuristic; that is, it must not overestimate the distance to the goal. Thus, for an application like routing, h(x) might represent the straight-line distance to the goal, since that is physically the smallest possible distance between any two points or nodes.

If the heuristic h satisfies the additional condition $h(x) \leq d(x,y)+h(y)$ for every edge x, y of the graph (where d denotes the length of that edge), then h is called monotone, or consistent. In such a case, A* can be implemented more efficiently—roughly speaking, no node needs to be processed more than once (see closed set below)—and A* is equivalent to running Dijkstra's algorithm with the reduced $d(x,y):=d(x,y)-h(x)+h(y)$.

Haversine Formula

The haversine formula is an equation important in navigation, giving great-circle distances (GCD) between two points on a sphere from longitudes and latitudes of the two points.

The great-circle or orthodromic distance is the shortest distance between any two points on the surface of a sphere measured along a path on the surface of the sphere (as opposed to going through the sphere's interior). Because spherical geometry is different from ordinary Euclidean geometry, the equations for distance take on a different form. The distance between two points in Euclidean space is the length of a straight line from one point to the other. On the sphere, however, there are no straight lines. In non-Euclidean geometry, straight lines are replaced with geodesics. Geodesics on the sphere are the great circles (circles on the sphere whose centers are coincident with the center of the sphere).

Through any two points on a sphere which are not directly opposite each other, there is a unique great circle. The two points separate the great circle into two arcs. The length of the shorter arc is the great-circle distance between the points. A great circle endowed with such a distance is the Riemannian circle.

Between two points which are directly opposite each other, called antipodal points, there are infinitely many great circles, but all great circle arcs between antipodal points have the same length, i.e. half the circumference of the circle, or, where r is the radius of the sphere.

Because the Earth is nearly spherical (see Earth radius) equations for great-circle distance can be used to roughly calculate the shortest distance between points on the surface of the Earth (as the crow flies), and so have applications in navigation.

According to one exemplary embodiment, an exemplary method to process a request for a valid travel itinerary, may include, e.g., but not limited to, according to an exemplary embodiment:

a. receiving the request;
b. processing an origin and a destination of the request comprising:
    i. calculating all permutations to get from the origin to the destination using a graph database;

ii. determining a shortest line distance using an A* calculation using at least one business rule;
iii. applying a Haversine algorithm to determine distances between the origin and the destination; and
iv. using directionality logic to analyze directions of potential itineraries; and
c. providing a response to the request based on said processing.

According to one exemplary embodiment, an exemplary method, may include wherein said processing comprises dynamically processing the request, at a time of a travel request query, using said graph database.

According to one exemplary embodiment, an exemplary method, may include wherein said processing comprises:
processing based upon at least one of:
i. at least one location;
ii. at least one travel schedule; or
iii. at least one minimum connection time (MCT), at a connection point data node where a passenger is required to transfer from one mode of travel to another mode of travel;
wherein a data node is a representation of a location comprising at least one of:
an airport; or
a port; and
wherein a relationship is a representation of at least one flight schedule between two locations.

According to one exemplary embodiment, an exemplary method, may include wherein said directionality logic comprises at least one of:
determining directions; or
analyzing potential itineraries in wrong directions.

Various other exemplary functionality may be included in various embodiments, according to various exemplary embodiments, as supported by the examples provided herein in outlined exemplary form, in the below exemplary claims, in the Figures, and/or appendices.

Exemplary Computer System Hardware Architecture

Figure 5:
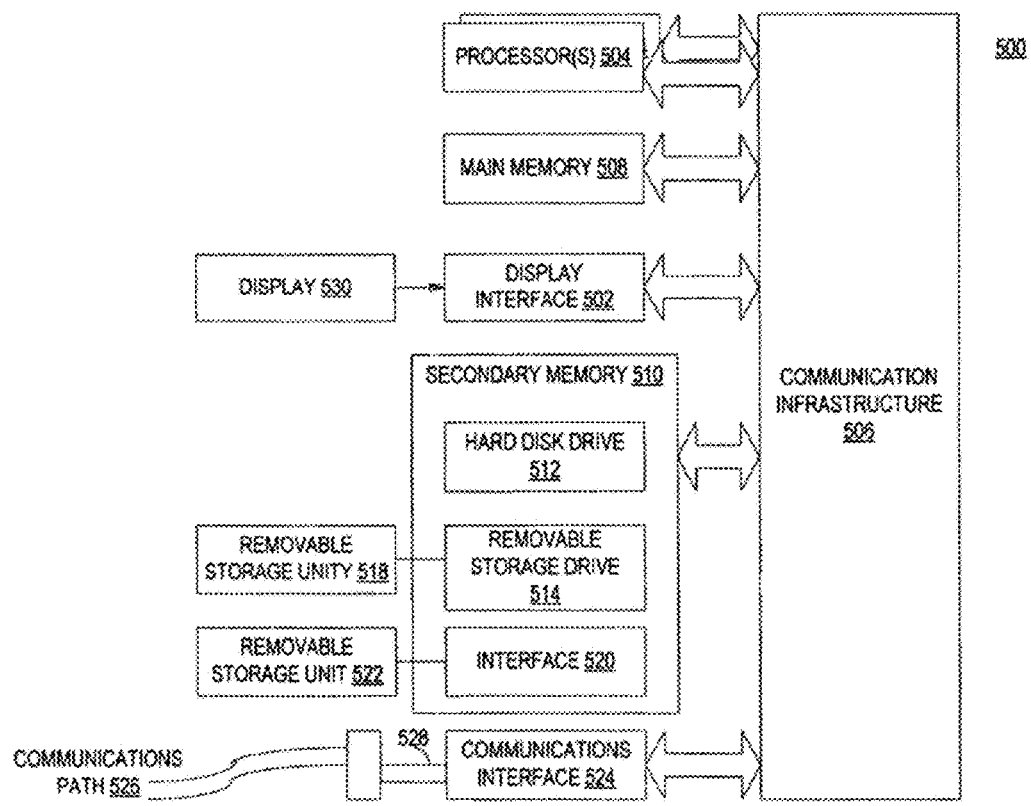
FIG. 5 depicts an exemplary diagram illustrating an exemplary computer/communications device hardware architecture as may be used in various components of exemplary embodiments of the present invention, according to an exemplary embodiment.

FIG. 5 depicts an exemplary diagram 500 illustrating an exemplary computer/communications device hardware architecture as may be used in various components of exemplary embodiments of the present invention. FIG. 5 depicts an exemplary diagram 500 illustrating an exemplary computer/communications device hardware architecture as may be used in various components of exemplary embodiments of the present invention. FIG. 5 depicts an exemplary view 500 of an exemplary computer system 102, 104, 112 as may be used in implementing an exemplary embodiment of the present invention. FIG. 5 depicts an exemplary embodiment of a computer system that may be used in computing devices such as, e.g., but not limited to, user devices 102, 102a, 102b, service provider devices 108, 108a, 108b, and/or web server 108a and/or application server 108b, travel planning system service provider computing device(s) 112 of entity 110, other application user devices 116, 116a, 116b of other entity 114, network components 104, etc. according to an exemplary embodiment of the present invention. FIG. 5 depicts an exemplary embodiment of a computer system that may be used as client device 108, or a server device (not shown), etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 500 is shown in FIG. 5, depicting an exemplary embodiment of a block diagram of an exemplary computer system useful for implementing the present invention. Specifically, FIG. 5 illustrates an example computer 500, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/7/8 . . . , etc. available from MICROSOFT® Corporation of Redmond, Wash., U.S.A., SOLARIS® from SUN® Microsystems of Santa Clara, Calif., U.S.A, OS/2 from IBM® Corporation of Armonk, N.Y, U.S.A, Mac/OS, OS/X, iOS from APPLE® Corporation of Cupertino, Calif., U.S.A, etc, or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 500 is shown in FIG. 5. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, a tablet, a phone, a mobile phone, a cellular phone, a communications device, an iPod, an iPhone, a smartphone, an iPad, a tablet based device, a smart phone, an ANDROID OS device, an iOS device, a Symbian OS based device, a Windows 8 OS based device, etc., may also be implemented using a computer such as that shown in FIG. 5.

The computer system 500 may include one or more processors, such as, e.g., but not limited to, processor(s) 504. The processor(s) 504 may be connected to a communication infrastructure 506 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 500 may include a display interface 502 that may forward, e.g., but not limited to, graphics, text, and other data, etc., from the communication infrastructure 506 (or from a frame buffer, etc., not shown) for display on the display unit 530.

The computer system 500 may also include, e.g., but may not be limited to, a main memory 508, random access memory (RAM), and a secondary memory 510, etc. The secondary memory 510 may include, for example, (but not limited to) a hard disk drive 512 and/or a removable storage drive 514, representing a floppy diskette drive, a magnetic tape drive, an optical disk drive, a compact disk drive CD-ROM, etc. The removable storage drive 514 may, e.g., but not limited to, read from and/or write to a removable storage unit 518 in a well known manner. Removable storage unit 518, also called a program storage device or a computer program product, may represent, e.g., but not limited to, a floppy disk, magnetic tape, optical disk, compact disk, etc. which may be read from and written to by removable storage drive 514. As will be appreciated, the removable storage unit 518 may include a computer usable storage medium having stored therein computer software and/or data.

In alternative exemplary embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 522 and interfaces 520, which may allow software and data to be transferred from the removable storage unit 522 to computer system 500.

Computer 500 may also include an input device such as, e.g., (but not limited to) a mouse or other pointing device such as a digitizer, and a keyboard or other data entry device (none of which are labeled).

Computer 500 may also include output devices, such as, e.g., (but not limited to) display 530, and display interface 502. Computer 500 may include input/output (I/O) devices such as, e.g., (but not limited to) communications interface 524, cable 528 and communications path 526, etc. These devices may include, e.g., but not limited to, a network interface card, and modems (neither are labeled). Communications interface 524 may allow software and data to be transferred between computer system 500 and external devices. Examples of communications interface 524 may include, e.g., but may not be limited to, a modem, a network interface (such as, e.g., an Ethernet card), a communications port, a Personal Computer Memory Card International Association (PCMCIA) slot, PC Card, SDRAM, universal serial bus (USB), solid state device (SSD), and card, etc. Software and data transferred via communications interface 524 may be in the form of signals 528 which may be electronic, electromagnetic, optical or other signals capable of being received by communications interface 524. These signals 528 may be provided to communications interface 524 via, e.g., but not limited to, a communications path 526 (e.g., but not limited to, a channel). This channel 526 may carry signals 528, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 514, a hard disk installed in hard disk drive 512, and signals 528, etc. These computer program products may provide software to computer system 500. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 508 and/or the secondary memory 510 and/or removable storage units 514, also called computer program products. Such computer programs, when executed, may enable the computer system 500 to perform the features of the present invention as discussed herein. In particular, the computer programs, when executed, may enable the processor 504 to provide a method to resolve conflicts during data synchronization according to an exemplary embodiment of the present invention. Accordingly, such computer programs may represent controllers of the computer system 500.

In another exemplary embodiment, the invention may be directed to a computer program product comprising a computer readable medium having control logic (computer software) stored therein. The control logic, when executed by the processor 504, may cause the processor 504 to perform the functions of the invention as described herein. In another exemplary embodiment where the invention may be implemented using software, the software may be stored in a computer program product and loaded into computer system 500 using, e.g., but not limited to, removable storage drive 514, hard drive 512 or communications interface 524, etc. The control logic (software), when executed by the processor 504, may cause the processor 504 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11 compliant wireless local area network (LAN), 802.16-compliant wide area network (WAN), and ultrawideband (UWB), etc.

Bluetooth is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g, (including, e.g., but not limited to IEEE 802.11g-2003, etc.), etc.

FIG. 6A is discussed above following the description of FIG. 4E.

FIG. 6B is discussed above following the description of FIG. 4E.

FIG. 7A is discussed above with reference to Table 1, and depicts an exemplary illustration 700 of an example United States/Canada air passenger exemplary embodiment of exemplary travel itinerary types, according to an exemplary embodiment.

Selecting Directional Fares

US/CA Fares may apply between the Origin City (bytes 7-11) and the Destination City (bytes 12-16) as follows:
  from the Origin City to the Destination City and from the Destination City to the Origin City when Footnote (bytes 65-66) does not contain an F or T;
  from the Origin City to the Destination City when Footnote (byte 65 or 66) contains an F;
  to the Origin City from the Destination City when Footnote (byte 65 or 66) contains a T.

When selecting fares with directional footnotes (i.e., F or T) for itinerary pricing, the type of pricing unit may first be determined and then directionality requirements may be applied, according to an exemplary embodiment. In FIG. 7A, Pricing Unit origins are shown in bold type. Bold arrows indicate fares selected in an opposite direction of travel.

FIG. 7B is discussed above with reference to Table 1, and depicts an exemplary illustration 710 of an example International air passenger exemplary embodiment of exemplary travel itinerary types, according to an exemplary embodiment. In FIG. 7B, Pricing Unit origins are shown in bold type. Bold arrows indicate fares selected in an opposite direction of travel.

Directional Indicator (Byte 111)

Data in this field may be required and may specify the directional application of the fare applicable to this fare record, according to an exemplary embodiment. Following is an explanation of applicable values, according to an exemplary embodiment:

Value F: From Origin City. The fare may apply from the Origin City (bytes 7-11) to the Destination City (bytes 14-18).

Value T: To Origin City. The fare may apply from the Destination City (bytes 14-18) to the Origin City (bytes 7-11).

The directional application may be dependent upon the pricing solution in which the fare is being priced, according to an exemplary embodiment, as follows:

International Pricing Unit

If the fare is being priced in a pricing unit that may contain at least one international fare, then the directional application may be dictated based on standards set forth in IATA resolutions, according to an exemplary embodiment. Refer to applicable resolutions for guidelines on determining the directional application, according to an exemplary embodiment.

Wholly Domestic Pricing Unit

If the fare is being priced in a pricing unit that may contain only domestic fares (does not contain any international fares), then the directional application may be dependent upon the type of pricing unit in which the fare is being priced, according to an exemplary embodiment, as follows:

OW Pricing Unit: Select fares in the direction of travel.

RT/CT/OJ Pricing Unit: Select fares in the direction of travel. Exception: Fares on the last fare component of the pricing unit are selected in the opposite direction of travel.

While various embodiments of the present invention have been described above, it should be understood that they have been presented by way of example only, and not limitation. Thus, the breadth and scope of the present invention should not be limited by any of the above described exemplary embodiments, but should instead be defined only in accordance with the following claims and their equivalents.

What is claimed is:

1. A computer-implemented method of creating a fare analytic electronic computer database of electronic fare data indicative of fares and fare related data, the method comprising:
   a) electronically receiving, by at least one electronic computer processor, electronic fare data indicative of at least one fare and at least one fare related data; wherein said electronic fare data indicative of said at least one fare and said at least one fare related data comprise at least one of:
   fare restriction data;
   fare discount data;
   fare surcharge data;
   facility charge data;
   routing restriction data;
   tax data;
   scheduling data;
   geographic information data;
   ancillary data; or
   fare data; and
   b) electronically creating, by said at least one electronic computer processor, a computerized graph database of said electronic fare data indicative of said at least one fare and said at least one fare related data;
   wherein said electronically creating of said computerized graph database comprises:
   i. electronically creating, by said at least one electronic computer processor, at least one node of said computerized graph database representing at least one component of said electronic fare data indicative of said at least one fare and said at least one fare related data;
   ii. electronically creating, by said at least one electronic computer processor, at least one relationship between a plurality of said at least one nodes;
   iii. electronically applying, by said at least one computer processor, at least one property to said at least one node and said at least one relationship;
   iv. automatically electronically generating, by said at least one electronic computer processor, at least one executable byte code routine for at least one of:
   said at least one relationship,
   said at least one node, or
   said at least one property, of a fare related data component of said computerized graph database;
   said automatically electronically generating comprising:
   a. electronically analyzing, by said at least one electronic computer processor, at least one restriction rules data;
   b. electronically analyzing, by said at least one electronic computer processor, at least one business based data to process said at least one restriction rules data;
   c. electronically creating, by said at least one electronic computer processor, said at least one executable byte code routine comprising
   1) electronically implementing, by said at least one electronic computer processor, said at least one restriction rules data, and said at least one business based data into a byte code instruction; and
   2) electronically compiling, by said at least one electronic computer processor, said byte code instruction into an optimized set of said at least one executable byte code routine;
   d. electronically maintaining, by said at least one electronic computer processor, said optimized set of said at least one executable byte code routine for use in performing at least one query; and
   v. electronically compiling, by said at least one electronic computer processor, including electronically resolving said at least one restriction rules data and said at least one business based data using functional programming comprising electronically calculating all permutations of said at least one fare, and said at least one fare related data comprising:
   electronically evaluating, by said at least one electronic computer processor, at least one expression comprising a plurality of fare and fare related data to determine which of said all calculated permutations of said at least one fare and said at least one fare related data are valid;
   wherein said automatically electronically generating said executable byte code routine is in response to said electronically compiling; and
   wherein said electronically compiling including said electronically resolving said at least one restriction rules data and said at least one business based data occurs prior to said performing said at least one query;
   c) electronically storing, by said at least one electronic computer processor, said computerized graph database as the fare analytic electronic computer database of said at least one fare and said at least one fare related data, on at least one electronic computer memory coupled to said at least one electronic computer processor; and
   d) electronically implementing, by said at least one electronic computer processor, a fare analytic engine using said fare analytic electronic computer database, comprising:
   i) electronically receiving, by said at least one electronic computer processor, said at least one query for said electronic fare data indicative of said at least one fare and said at least one fare related data;
   ii) electronically parsing, by said at least one electronic computer processor, said at least one query for said electronic fare data indicative of said at least one fare and said at least one fare related data;

iii) electronically traversing, by said at least one electronic computer processor, said computerized graph database for said at least one query to obtain at least one result; and iv) electronically providing, by said at least one electronic computer processor, said at least one result in response to said at least one query.

2. The computer-implemented method according to claim 1, further comprising:

e) electronically maintaining, by said at least one electronic computer processor, said electronic fare data indicative of said fare and said fare related data in said computerized graph database comprising at least one of:

i. electronically adding, by said at least one electronic computer processor, new electronic fare data indicative of at least one new fare and new at least one fare related data;

ii electronically deleting, by said at least one electronic computer processor, said electronic fare data indicative of said at least one fare and said at least one fare related data; or iii. electronically updating, by said at least one electronic computer processor, an existing of said electronic fare data indicative of said at least one fare and said at least one fare related data.

3. The method according to claim 1, wherein said electronically creating of said (b) further comprises:

v. electronically regenerating, by said at least one electronic computer processor, said at least one executable byte code routine for at least one of: said at least one relationship, said at least one node, or said at least one property, of said fare related data component of said electronic computer graph database.

4. The method according to claim 2, wherein said maintaining further comprises:

iv. generating or regenerating, by said at least one electronic computer processor, said at least one executable byte code routine for at least one of: said at least one relationship, said at least one node, or said at least one property, of said fare related data component of said computerized graph database.

5. The method according to claim 1, wherein said receiving said electronic fare data indicative of said at least one fare and said at least one fare related data comprises: receiving airline fare related data, and wherein said electronic fare data indicative of said at least one fare and said fare related data comprises at least one of:

said at least one restriction rules data;
said at least one business based data; or
footnote data.

6. The method according to claim 1, wherein said electronically creating of said at least one relationship between said plurality of said at least one nodes of said (b)(ii) comprises:

creating a relationship between said electronic fare data indicative of a given fare and a given fare related data of said given fare, comprising:

associating said at least one fare data, with said at least one fare related data, and wherein said at least one fare related data comprises at least one of:
said fare restriction data;
said routing restriction data;
said tax data;
said fare discount data;
said fare surcharge data;
said facility charge data;
at least one currency conversion rate data;
said scheduling data;
said geographic information data; or
said ancillary data.

7. The method according to claim 6, wherein said fare related data comprises airline fare related data, and wherein said fare restriction data comprises at least one of:
at least one rule data;
at least one fare by rule; or
at least one footnote data.

8. The method according to claim 7, wherein said electronic fare data indicative of said at least one airline fare related data comprises at least one of:
at least one fare data;
at least one routing restriction data;
at least one constructed fare data comprising at least one of:
at least one fare add-on; or
at least one constructed data table comprising at least one of:
at least one tariff;
at least one carrier;
at least one fare class; or
at least one zone;
at least one directory data comprising at least one of:
at least one geography data comprising at least one of:
at least one city;
at least one country;
at least one zone; or
at least one area;
at least one air carrier code or description data;
at least one airline tariff publishing (ATP) tariff translation;
at least one fare class data; or
at least one carrier city fare class (CCF) data;
at least one currency conversion rate data comprising at least one of:
a neutral unit of construction (NUC);
at least one passenger facility charge data;
at least one answer table comprising at least one of:
a frequent flyer account;
a reservation booking code (RBC); or
a bank identification number (BIN); or
at least one ancillary data comprising at least one of:
at least one branded fare;
at least one carrier imposed fee;
at least one baggage charge;
at least one optional service fee, comprising at least one of:
at least one meal,
at least one entertainment, or
at least one seat assignment; or
at least one ticketing fee.

9. The method according to claim 1, wherein said automatically electronically generating of said b (iv) comprises:
implementing at least one applicable data restriction using at least one functional programming technique; and
evaluating at least one Boolean response for each of said at least one executable byte code routine.

10. The method according to claim 3, wherein said electronically regenerating comprises:
implementing at least one applicable data restriction using at least one functional programming technique; and
evaluating at least one Boolean response for each of said at least one executable byte code routine.

11. The method according to claim 1, wherein said electronically creating of said b) comprises at least one of:
   i. adding, by said at least one electronic computer processor, new electronic fare data indicative of at least one new fare and new at least one fare related data comprising at least one of:
      a. creating electronically at least one additional of said at least one node;
      b. creating electronically at least one additional of said at least one relationship; or
      c. creating electronically at least one additional of said at least one property.

12. The method according to claim 2, wherein said electronically maintaining of said (e) comprises at least one of:
   i. wherein said electronically adding, by said at least one electronic computer processor, said electronic fare data indicative of said new at least one fare and said new at least one fare related data comprises at least one of:
      a. creating at least one additional of said at least one node;
      b. creating at least one additional of said at least one relationship; or
      c. creating at least one additional of said at least one property;
   ii. wherein said electronically deleting, by said at least one electronic computer processor, said electronic fare data indicative of said at least one fare and said at least one fare related data comprises at least one of:
      a. breaking said at least one relationship between a pair of said at least one node; or
      b. deleting said at least one node; or
   iii. wherein said electronically updating said existing of said electronic fare data indicative of said at least one fare and said at least one fare related data comprises at least one of:
      a. breaking said at least one relationship between a pair of said at least one nodes;
      b. creating said at least one relationship; or
      c. updating said at least one property.

13. The method according to claim 2, wherein said electronically updating of said (e)(iii), comprises:
   electronically maintaining a history of said electronic fare data indicative of said fare or said fare related data comprising:
      updating by 'down dating' electronic fare data indicative of existing of said at least one fare or said at least one fare related data due to an introduction of at least one replacement electronic fare data indicative of said electronic fare data indicative of said at least one fare or said at least one fare related data.

14. The method according to claim 1, wherein said electronically implementing of said (d) further comprises:
   v) electronically interrogating said computerized graph database comprising laying logic over said computerized graph database for handling at least one query.

15. The method according to claim 1, wherein said electronically receiving said at least one query of said (d)(i) comprises at least one of:
   receiving at least one valid itinerary request;
   receiving at least one organization request; or
   receiving at least one market request.

16. The method according to claim 15, wherein said electronically receiving comprises receiving said at least one organization request, further comprising receiving at least one transportation organization request, wherein said transportation organization comprises at least one of:
   a shipping line;
   a sea carrier;
   an air carrier;
   a rail operator;
   a space line;
   a rental line; or
   an automobile leasing line.

17. The method of claim 1, wherein said electronically receiving said at least one query of said (d)(i) comprises at least one of:
   receiving a request for applying at least one filter of said at least one result; or
   receiving a request for sorting at least one sort of a plurality of said at least one result.

18. The method according to claim 1, wherein said electronically providing said at least one result of said (d)(iv) comprises at least one of:
   providing at least one pricing solution;
   providing at least one fare;
   providing at least one fare in a market;
   providing at least one fare or fare related data;
   providing at least one fare or fare related data in a market; or
   providing no fare.

19. The method of claim 1, wherein said fare analytic engine of said (d) comprises wherein said at least one query comprises at least one of:
   at least one shopping search request;
   at least one pricing request;
   at least one booking request;
   at least one repricing request;
   at least one reissue request;
   at least one fare management request;
   at least one revenue management request;
   at least one revenue accounting request;
   at least one fare audit request;
   at least one auditing request;
   at least one fare analysis request;
   at least one fare reporting request; or
   at least one fare monitoring request.

20. The method of claim 1, wherein said at least one fare comprises at least one of:
   a passenger fare;
   an air passenger fare;
   a commercial air passenger fare;
   a private air passenger fare;
   a space travel passenger fare;
   a cruiseline passenger fare;
   a rail passenger fare;
   a bus fare;
   a hovercraft fare;
   a transportation fare;
   a cargo fare;
   a commercial air cargo fare;
   a private air cargo fare;
   a space travel cargo fare;
   a space travel fare;
   a cruising cargo fare;
   a rail cargo fare;
   a transportation fare; or
   a manned or unmanned fare.

21. The method of claim 1, wherein said at least one fare comprises at least one air passenger fare.

22. The method of claim 1, wherein said at least one fare comprises air fare.

23. The method according to claim 1, wherein said computerized graph database comprises a clustered graph database.

24. The method according to claim 23, wherein said computerized clustered graph database comprises a primary computerized graph database system accessed by at least one secondary computerized graph database system.

25. The method according to claim 24, further comprising at least one of:
at least one cluster management component; or
at least one transaction propagation component.

26. The method according to claim 23, further comprising:
a plurality of user computer devices coupled via at least one communications network to said at least one computerized graph database;
at least one application server coupled to said at least one communications network, and
at least one web server coupled to said at least one communications network.

27. The method according to claim 26, wherein said computerized graph database is embedded in said at least one application server.

28. The method of claim 1, wherein said fare analytic engine of said (d) comprises wherein said at least one query comprises at least one revenue accounting request.

29. The method according to claim 1, wherein said fare data comprises at least one of:
a specified fare;
a constructed fare; or
a fare by rule fare.

30. The method according to claim 1, wherein said fare restriction data comprises at least one of:
an advance purchase restriction,
a minimum stay restriction,
a maximum stay restriction,
a seasonal restriction,
a blackout or non-blackout restriction,
a point of sale restriction,
a rule,
a rule override,
a footnote,
footnote data, or
a fare by rule.

31. The method according to claim 1, wherein said ancillary data comprising at least one of:
additional legroom requirement,
cancellation rights,
carrier imposed fees, or
additional bags.

32. A system of maintaining a fare analytic electronic computer database comprising:
at least one computer memory; and
at least one electronic computer processor coupled to said at least one computer memory,
wherein said at least one electronic computer processor is configured to:
receive electronically electronic fare data indicative of at least one fare and at least one fare related data; and
create electronically a computerized graph database of said electronic fare data indicative of said at least one fare and said at least one fare related data, comprising:
wherein said electronic fare data indicative of said at least one fare and said at least one fare related data comprise at least one of:
fare restriction data;
fare discount data;
fare surcharge data;
facility charge data;
routing restriction data;
tax data;
scheduling data;
geographic information data;
ancillary data; or
fare data, and
wherein said at least one computer processor is configured to:
create electronically at least one node of said computerized graph database representing at least one component of said electronic fare data indicative of said at least one fare and said at least one fare related data;
create electronically at least one relationship between a plurality of said at least one node; and
apply electronically at least one property to said at least one node and said at least one relationship;
automatically electronically generate at least one executable byte code routine for at least one of:
said at least one relationship,
said at least one node, or
said at least one property, of a fare related data component of said computerized graph database;
said automatically electronically generate comprising:
analyze at least one restriction rules data;
analyze at least one business based data to process said at least one restriction rules data;
create said at least one executable byte code routine comprising
electronically implement said at least one restriction rules data, and said at least one business based data into a byte code instruction; and
electronically compile said byte code instruction into an optimized set of said at least one executable byte code routine;
electronically maintain said optimized set of said at least one executable byte code routine for use to perform at least one query; and
electronically compile including electronically resolve said at least one restriction rules data and said at least one business based data using functional programming comprising electronically calculate all permutations of said at least one fare, and said at least one fare related data comprising:
electronically evaluate at least one expression comprising a plurality of fare and fare related data to determine which of said all calculated permutations of said at least one fare and said at least one fare related data are valid;
wherein said automatically electronically generate said executable byte code routine is in response to said electronically compile; and
wherein said electronically compile including said electronically resolve said at least one restriction rules data and said at least one business based data occurs prior to said perform of said at least one query;
store electronically said computerized graph database as the fare analytic electronic computer database of said at least one fare and said at least one fare related data, on the at least one electronic computer memory coupled to the at least one electronic computer processor; and implement electronically a fare analytic engine using said fare analytic electronic computer database, comprising:
  i) electronically receive at least one query for said electronic fare data indicative of said at least one fare and said at least one fare related data;
  ii) electronically parse said at least one query for said electronic fare data indicative of said at least one fare and said at least one fare related data;
  iii) electronically traverse said computerized graph database for said at least one query to obtain at least one result; and
  iv) electronically provide said at least one result in response to said at least one query.

33. A nontransitory computer program product embodied on a nontransitory computer accessible medium, comprising computer program logic, which when said computer program logic is executed on at least one electronic computer processor performs a computer implemented method comprising:
  a) receiving electronically, by said at least one electronic computer processor, electronic fare data indicative of at least one fare and at least one fare related data;
  wherein said electronic fare data indicative of said at least one fare and said at least one fare related data comprise at least one of:
  fare restriction data;
  fare discount data;
  fare surcharge data;
  facility charge data;
  routing restriction data;
  tax data;
  scheduling data;
  geographic information data;
  ancillary data; or
  fare data; and
  b) creating electronically, by said at least one electronic computer processor, a computerized graph database of said electronic fare data indicative of said at least one fare and said at least one fare related data;
  wherein said creating electronically of said computerized graph database comprises:
  i. creating electronically, by said at least one electronic computer processor, at least one node of said computerized graph database representing at least one component of said electronic fare data indicative of said at least one fare and said at least one fare related data;
  ii. creating electronically, by said at least one electronic computer processor, at least one relationship between a plurality of said at least one nodes; and
  iii. applying electronically, by said at least one electronic computer processor, at least one property to said at least one node and said at least one relationship;
  iv. automatically electronically generating, by said at least one electronic computer processor, at least one executable byte code routine for at least one of:
  said at least one relationship,
  said at least one node, or
  said at least one property, of a fare related data component of said computerized graph database;
  said automatically electronically generating comprising:
  a. electronically analyzing, by said at least one electronic computer processor, at least one restriction rules data;
  b. electronically analyzing, by said at least one electronic computer processor, at least one business based data to process said at least one restriction rules data;
  c. electronically creating, by said at least one electronic computer processor, said at least one executable byte code routine comprising
    1) electronically implementing, by said at least one electronic computer processor, said at least one restriction rules data, and said at least one business based data into a byte code instruction; and
    2) electronically compiling, by said at least one electronic computer processor, said byte code instruction into an optimized set of said at least one executable byte code routine;
  d. electronically maintaining, by said at least one electronic computer processor, said optimized set of said at least one executable byte code routine for use in performing at least one query; and
  v. electronically compiling, by said at least one electronic computer processor, including electronically resolving said at least one restriction rules data and said at least one business based data using functional programming comprising electronically calculating all permutations of said at least one fare, and said at least one fare related data comprising:
  electronically evaluating, by said at least one electronic computer processor, at least one expression comprising a plurality of fare and fare related data to determine which of said all calculated permutations of said at least one fare and said at least one fare related data are valid;
  wherein said automatically electronically generating said executable byte code routine is in response to said electronically compiling; and
  wherein said electronically compiling including said electronically resolving said at least one restriction rules data and said at least one business based data occurs prior to said performing said at least one query;
  c) electronically storing, by said at least one electronic computer processor, said computerized graph database as a fare analytic electronic computer database of said at least one fare and said at least one fare related data, on at least one electronic computer memory coupled to said at least one electronic computer processor; and
  d) electronically implementing, by said at least one electronic computer processor, a fare analytic engine using said fare analytic electronic computer database, comprising:
  i) electronically receiving, by said at least one electronic computer processor, at least one query for said electronic fare data indicative of said at least one fare and said at least one fare related data;
  ii) electronically parsing, by said at least one electronic computer processor, said at least one query for said electronic fare data indicative of said at least one fare and said at least one fare related data;

iii) electronically traversing, by said at least one electronic computer processor, said computerized graph database for said at least one query to obtain at least one result; and iv) electronically providing, by said at least one electronic computer processor, said at least one result in response to said at least one query.

\* \* \* \* \*